United States Patent
Kuramoto

(10) Patent No.: US 10,353,705 B2
(45) Date of Patent: Jul. 16, 2019

(54) ARITHMETIC PROCESSING DEVICE FOR DEEP LEARNING AND CONTROL METHOD OF THE ARITHMETIC PROCESSING DEVICE FOR DEEP LEARNING

(71) Applicant: FUJITSU LIMITED, Kawasaki-shi, Kanagawa (JP)

(72) Inventor: Masahiro Kuramoto, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 107 days.

(21) Appl. No.: 15/651,651

(22) Filed: Jul. 17, 2017

(65) Prior Publication Data

US 2018/0046458 A1    Feb. 15, 2018

(30) Foreign Application Priority Data

Aug. 12, 2016 (JP) .................. 2016-158379

(51) Int. Cl.
| | | |
|---|---|---|
| *G06F 9/30* | (2018.01) | |
| *G06F 17/16* | (2006.01) | |
| *G06N 3/04* | (2006.01) | |
| *G06N 3/063* | (2006.01) | |
| *G06F 9/38* | (2018.01) | |
| *G06N 3/08* | (2006.01) | |

(52) U.S. Cl.
CPC ........ *G06F 9/3001* (2013.01); *G06F 9/30036* (2013.01); *G06F 17/16* (2013.01); *G06N 3/0454* (2013.01); *G06N 3/063* (2013.01); *G06F 9/3012* (2013.01); *G06F 9/30141* (2013.01); *G06F 9/3887* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,135,553 | B2* | 9/2015 | Kato .................. G06F 17/15 |
| 2004/0122887 | A1* | 6/2004 | Macy .................. G06F 17/16 |
| | | | 708/607 |
| 2008/0183792 | A1* | 7/2008 | Inoue .................. G06F 17/16 |
| | | | 708/520 |
| 2010/0223219 | A1 | 9/2010 | Kato et al. |
| 2010/0318591 | A1* | 12/2010 | Long .................. G06F 7/02 |
| | | | 708/212 |

(Continued)

FOREIGN PATENT DOCUMENTS

| | | |
|---|---|---|
| JP | 2008-310700 | 12/2008 |
| JP | 2010-134697 | 6/2010 |

(Continued)

*Primary Examiner* — Michael D. Yaary
(74) *Attorney, Agent, or Firm* — Fujitsu Patent Center

(57) ABSTRACT

A memory 11 stores therein first data and second data each of which has element data that forms a matrix. Arithmetic units 51 to 53 repeat, for each of a first predetermined row of the first data and a second predetermined row of the second data that are stored in the memory 11, by using the element data included in the first predetermined row and the element data included in the second predetermined row, a row portion operation based on the number of columns in the second data and performs, by using results of the row portion operations, an arithmetic operation process that acquires the operation results of the operation that uses the first data and the second data.

5 Claims, 32 Drawing Sheets

(56) References Cited

U.S. PATENT DOCUMENTS

| | | | |
|---|---|---|---|
| 2011/0239032 A1 | 9/2011 | Kato et al. | |
| 2012/0203815 A1* | 8/2012 | Yanagisawa | G06F 17/16 |
| | | | 708/607 |
| 2014/0337262 A1 | 11/2014 | Kato et al. | |
| 2015/0309961 A1 | 10/2015 | Ozaki et al. | |

FOREIGN PATENT DOCUMENTS

| | | |
|---|---|---|
| JP | 2012-205298 | 10/2012 |
| JP | 2015-210709 | 11/2015 |

* cited by examiner

ARITHMETIC PROCESSING DEVICE FOR DEEP LEARNING AND CONTROL METHOD OF THE ARITHMETIC PROCESSING DEVICE FOR DEEP LEARNING

CROSS-REFERENCE TO RELATED APPLICATION

This application is based upon and claims the benefit of priority of the prior Japanese Patent Application No. 2016-158379, filed on Aug. 12, 2016, the entire contents of which are incorporated herein by reference.

FIELD

The embodiments discussed herein are related to an arithmetic processing device and a control method of the arithmetic processing device.

BACKGROUND

A graphic processing unit (GPU) used for an arithmetic processing device is originally a processor used for image processing; however, the GPU is optimized for matrix calculation and thus is often used as a processor that performs a process for machine learning. Furthermore, in general, the GPU is also used in also a process of performing deep learning.

In deep learning, a process is usually performed by using neural networks. For example, in a case of deep learning in image recognition, there are two processes, i.e., a forward process of determining what the image provided is and a backward process of updating the parameters of the neural networks. The arithmetic processing device that performs deep learning performs the backward process by using a difference between each of the calculation results obtained in the forward process and an expected value and updates the parameters of the neural networks. Then, the arithmetic processing device improves the accuracy of the forward process by using the updated parameters.

The neural networks are constituted by a plurality of layers and, in each of the layers, an arithmetic operation process of, for example, extracting feature values is performed and the learning is repeated. In this way, neural networks have a multilayer structure in which a different arithmetic operation process is performed in each of the layers. Because of this structure, in order to update the parameters for each layer, learning is performed by obtaining a difference between the calculation result obtained in the last layer and an expected value, by propagating the difference to an immediately previous layer, and by further propagating the result of the calculated difference obtained from the subject layer. In a description here, immediately previous and immediately subsequent is described based on the forward direction of the forward process.

Furthermore, as the arithmetic operation process that is mainly used for image recognition in deep learning, there is a convolutional neural network. In the convolutional neural network, the operation referred to as convolution is frequently used. In a description below, this operation is called a "convolution operation". For example, if image recognition is performed, a weight frame that has, in an area in an input image, a previously set parameter that is used as each of the elements is arranged in the original image. Then, by summing the multiplication of each of the elements of the input image in which the weight frame is arranged and each of the elements of the weight frame, the feature values in the area in which the weight frame is arranged in the input image are calculated. The arrangement of the weight frame with respect to the original image is performed on the entire input image by using the predetermined movement width of the weight frame and the sum of the calculated feature values corresponds to an output image that is output as the result of the convolution operation. The weight frame is sometimes referred to as a "filter".

For example, consider, as an input image, an image having 8×8 elements, i.e., an image with 8×8-bit grayscale. In the following, this image is referred to as an 8×8 input image. Furthermore, a description will be given of a case of using a filter that has 4×4 elements and a case in which the filter is shifted for each column or each row in the input image. In the following, this filter is referred to as a 4×4 filter. Furthermore, in the following, the direction in which a row extends is referred to as "in the row direction" and the direction in which a column extends is referred to as "in the column direction". In this case, if the 4×4 filter arranged at one of the corners of the 8×8 input image in the row direction is moved 5 (=8−3) times in the row direction, the 4×4 filter reaches the other corner. Namely, an output image has five elements in the row direction. Similarly, if the 4×4 filter arranged at one of the corners of the 8×8 input image in the column direction is moved 8−3 times in the column direction, the 4×4 filter reaches the other corner. Namely, the output image also has five elements in the column direction. Thus, the output image becomes a 5×5 image. Then, each of the elements in the output image corresponds to a total value of the multiplication of each of the elements included in the filter that is in the state of being arranged in the input image and each of the elements included in the input image associated with the respective elements in the filter.

When performing the operation of summing up the multiplied value described above, the arithmetic processing device usually uses an instruction called fused multiply add (FMA). The FMA is an instruction to a floating-point product-sum operation represented by the form of (A×B)+C.

Furthermore, when performing such a convolution operation, in some cases, the single instruction, multiple data (SIMD) method of simultaneously obtaining a plurality of outputs by simultaneously applying, in parallel processing, a single instruction to a plurality of pieces of data is used. For example, a description will be given of a case of operation that uses SIMD that processes, in parallel, four pieces of data. In the following, the SIMD that processes, in parallel, n pieces of data is referred to as n SIMD. Namely, the arithmetic operation process in this case can be referred to as 4-way SIMD arithmetic operation process. Furthermore, in the following, the operation performed by using the SIMD is referred to as a SIMD operation.

In a case of convolution operation performed by using the 8×8 input image and the 4×4 filter described above, the arithmetic device can calculate, at a time, four values that are the results of the multiplication of one of the elements in the filter that is in each of the arrangement states in each of which the filter is shifted to each column four times and the associated element in the input images. Namely, when performing the 4-way SIMD operation, the arithmetic processing device can calculate, in parallel, the elements in the output image associated with the states of the filter arranged in the four different states.

When performing the arithmetic operation process using the SIMD described above, the arithmetic processing device stores, in registers that are used in the SIMD operation, the data used in the operation from among the pieces of the data on the input image stored in a memory and then performs a single operation. By repeating this process, the arithmetic processing device can perform the convolution operation. For example, in a case of the 4-way SIMD arithmetic operation process, the number of registers used for a single SIMD operation is four. When, in the SIMD operation, the arithmetic processing device stores data in the registers, the arithmetic processing device stores, at a time, the data in all of the registers that are used for the SIMD registers by using a load instruction of the SIMD.

Here, in the convolution operation, when a single element in the output image is calculated, each of the elements in the filter and each of the associated elements in the input image are used. Furthermore, in the convolution operation using the SIMD, because the operation is repeatedly performed by shifting the range of the filter, the same data is used many times in the convolution operation performed in parallel.

Conventionally, in the convolution operation, multiplication of each of the elements and summing the multiplication results are correctively obtained for each arrangement state of a single filter. Thus, when calculating, in parallel, a plurality of computing units, such as in a case of using the SIMD, in order to improve a processing speed, a method of avoiding the use of same data by adjusting the order of calculations or a method of simultaneously using the data by preparing a copy of the same data is used.

For example, as a technology related to the convolution operation, there is a conventional technology that provides a multiplier for each line, that provides shift registers that store therein a weight of each line, that sequentially performs multiplication by shifting a value, and that adds the multiplication results. Furthermore, there is a conventional technology that provides a multiplier by being associated with each line such that the adjacent lines commonly use the multiplier and that performs the convolution operation. Furthermore, there is a conventional technology that divides line data in a memory into an area for storing the data and an area for storing weight data, and that performs an operation by circulating the memory area. Furthermore, there is a conventional technology that performs an operation by passing an output of a multiplier to another multiplier.

Patent Document 1: Japanese Laid-open Patent Publication No. 2010-134697
Patent Document 2: Japanese Laid-open Patent Publication No. 2015-210709
Patent Document 3: Japanese Laid-open Patent Publication No. 2008-310700
Patent Document 4: Japanese Laid-open Patent Publication No. 2012-205298

However, when adjusting the order of calculations in order to avoid reading of the same data, multiplications or divisions are used to decide the data to be used. Because the multiplications or divisions consume a great number of cycles due to the operation when compared with the additions or subtractions, a calculation cost is high. Thus, during the operation of multiplications or divisions, there may be a case in which the computing units are not able to be operated for each cycle. Consequently, adjustment of the calculation order may possibly decrease the processing speed of the operation. Furthermore, when preparing a copy of data in order to avoid the reading of the same data, a sort order of pieces of data that are not probably used at the same time possibly becomes complicated or the number of pieces of data to be copied may possibly be increased. For example, if a moving distance of the filter at a time is equal to or greater than two columns and two rows, the data to be read varies in each of the computing units; therefore, the problem described above occurs. Namely, when using a processing method of correctively performing the operation for each arrangement state of a single filter, a calculation cost may possibly become high in order to improve the processing speed.

Furthermore, in also a case of using different data, depending on a method of moving data to the registers, there may be a state in which data is not able to be read from the registers. For example, if two computing units attempt to read data from the same register at the same timing, it may possibly be difficult to read the data. Thus, the processing speed of the operation may possibly be decreased.

SUMMARY

According to an aspect of an embodiment, an arithmetic processing device includes: a data storing unit that stores first data and second data each of which has element data that forms a matrix; and an arithmetic unit that repeats, for each of a first predetermined row of the first data and a second predetermined row of the second data that are stored in the data storing unit, by using the element data included in the first predetermined row and the element data included in the second predetermined row, a row portion operation based on the number of columns of the second data, and that performs, by using results of the row portion operations, an operation that uses the first data and the second data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the arithmetic processing device and the control method of the arithmetic processing device disclosed in the present invention are not limited to the embodiments described below.

[a] First Embodiment

Figure 1:
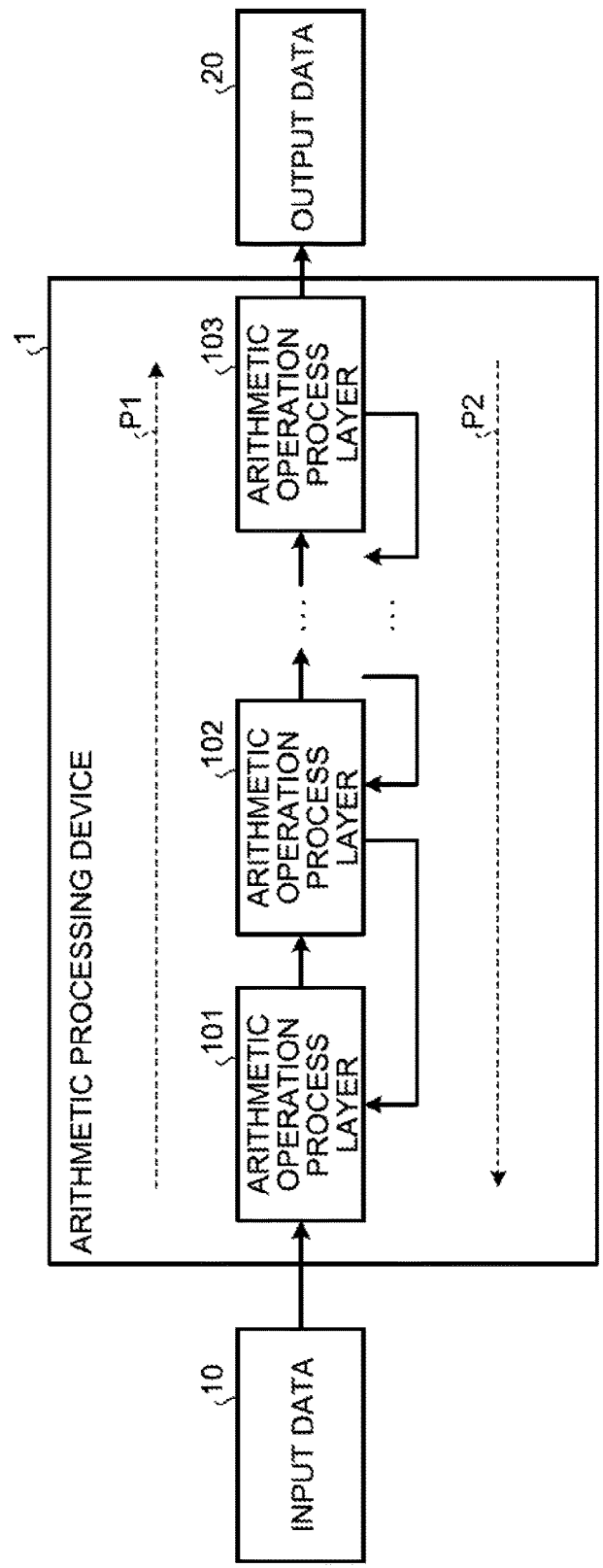
FIG. 1 is a schematic diagram illustrating the overall flow of deep learning.

FIG. 1 is a schematic diagram illustrating the overall flow of deep learning. Here, in the embodiment, deep learning for image recognition will be described. In the following, a description will be given of the convolution operation as an example; however, an operation other than the convolution operation may also be used by the operation performed in each layer in the neural network.

As illustrated in FIG. 1, an arithmetic processing device 1 receives an input of input data 10. Then, the arithmetic processing device 1 has a plurality of arithmetic operation process layers. In each of the arithmetic operation process layers, an arithmetic operation process of, for example, extracting different feature points is performed. The arithmetic processing device 1 uses weight data and performs the convolution operation on the acquired input data 10 in an arithmetic operation process layer 101 that is a first layer. Here, the weight data corresponds to a filter. Then, the arithmetic processing device 1 performs, by using the weight data, the convolution operation on output data 20, which is also the feature value from the arithmetic operation process layer 101, in an arithmetic operation process layer 102 that is a second layer. The arithmetic processing device 1 sequentially performs the arithmetic operation process in each of the layers and then outputs the operation results, as the output data 20 that is also the feature value, of the convolution operation that is performed by using the weight data and that is performed in an arithmetic operation process layer 103 that is the $n^{th}$ layer. In this way, for example, if the input data 10 is assumed to be an input image, the output data 20 in each of the layers can be acquired as the feature values used for the image recognition and, by performing deep learning that repeatedly updates the parameter by using the feature values acquired in each of the layers, the accuracy of the image recognition is improved and the arithmetic processing device 1 can perform the image recognition. Furthermore, for example, in a case of voice recognition, the input data 10 becomes audio data and, in a case of text mining, the input data 10 becomes a word. The arithmetic operation process performed, by the arithmetic processing device 1, in the convolution operation in the direction of an arrow P1 is sometimes referred to as a "convolution forward operation".

Furthermore, in order to improve the accuracy of extracting the feature points in each of the layers, the arithmetic processing device 1 changes the weight data by using a difference with an expected value. For example, the arithmetic processing device 1 has a predetermined expected value and compares the expected value with the output data 20 from the arithmetic operation process layer 103 that corresponds to the $n^{th}$ layer. Then, the arithmetic processing device 1 obtains a difference between the output data 20 and the expected value and obtains a difference with the expected value of the weight data by using the obtained difference and the input data received from the n−1 layer. Furthermore, the arithmetic processing device 1 corrects the weight data by using the obtained difference with the expected value of the weight data. Then, by using the difference between both the corrected weight data and the output data 20 and the expected value, the arithmetic processing device 1 obtains top difference data that is the data used to correct the weight data in an $n-1^{th}$ layer. Then, the arithmetic processing device 1 corrects, with respect to the input data received from an n−2$^{th}$ layer, weight data in the n−1$^{th}$ layer by using the obtained difference between the output data 20 in the n−1$^{th}$ layer and the output expected value in the n−1$^{th}$ layer.

Here, if the direction of the arrow P1 is the alignment direction of each of the layers, in the arithmetic operation process layer that is immediately previous to a specific arithmetic operation process layer, the arithmetic processing device 1 calculates the top difference data included in the specific arithmetic operation process layer. Then, by using both the calculated top difference data in the specific arithmetic operation process layer and the output data output from the immediately previous arithmetic operation process layer, the arithmetic processing device 1 obtains a difference with the expected value of the weight data in the specific arithmetic operation process layer. Furthermore, the arithmetic processing device 1 corrects the weight data by using the obtained difference with the expected value of the weight data in the specific arithmetic operation process layer. Then, by using a difference among the corrected weight data in the specific arithmetic operation process layer, the output data in the specific arithmetic operation process layer, and the expected value, the arithmetic processing device 1 calculates the top difference data in the arithmetic operation process layer that is immediately previous to the specific arithmetic operation process layer.

The arithmetic processing device 1 sequentially repeats the correction of the weight data in each of the arithmetic operation process layers and sequentially repeats the calculation of the top difference data in the immediately previous arithmetic operation process layer. Consequently, the arithmetic processing device 1 can correct the weight data in all of the layers, i.e., the arithmetic operation process layers 101 to 103, in an associated manner with the expected value of the output data in the arithmetic operation process layer 103. The arithmetic operation process of correcting the weight data in each of the arithmetic operation process layers in the direction of the arrow P2 performed by the arithmetic processing device 1 described above is sometimes referred to as a "convolution backward operation".

In the following, the input data in a specific arithmetic operation process layer is referred to as "bottom data". The bottom data corresponds to the output data output from the arithmetic operation process layer that is immediately previous to the specific arithmetic operation process layer. Furthermore, the data of a difference with the expected value of the weight data in the specific arithmetic operation process layer is referred to as "weight difference data". Furthermore, the data of the operation results of the convolution backward operation in the specific arithmetic operation process layer are referred to as "bottom difference data". Furthermore, the original data that is used for correcting the weight data in the convolution backward operation in the specific arithmetic operation process layer is referred to as "top difference data". Here, the calculation result of the convolution backward operation obtained in the specific arithmetic operation process layer is used as the original data of the convolution backward operation performed in the arithmetic operation process layer that is immediately previous to the specific arithmetic operation process layer. Namely, the bottom difference data calculated in the specific arithmetic operation process layer corresponds to the top difference data in the arithmetic operation process layer that is immediately previous to the specific arithmetic operation process layer.

Furthermore, in the convolution backward operation, the operation of obtaining the weight difference data by using both the top difference data and the bottom data is referred to as a "convolution backward weight difference operation". Furthermore, the operation of calculating the bottom difference data by using the corrected weight data and the top difference data is referred to as a "convolution backward bottom difference operation".

Furthermore, in the embodiment, a description will be given of a case in which each of the bottom data and the weight data has elements aligned as a square matrix. Accordingly, in a description below, the number of rows and the number of columns of the weight data are referred to as the "number of kernels" or the "kernel size" as a unit that is in accordance with the number of kernels. The number of kernels mentioned here corresponds to an example of a "predetermined number". However, each of the bottom data and the weight data may also be a rectangle. Furthermore, an amount of movement of the weight data in the convolution forward operation at a time is sometimes referred to as "the number of strides".

Figure 2:
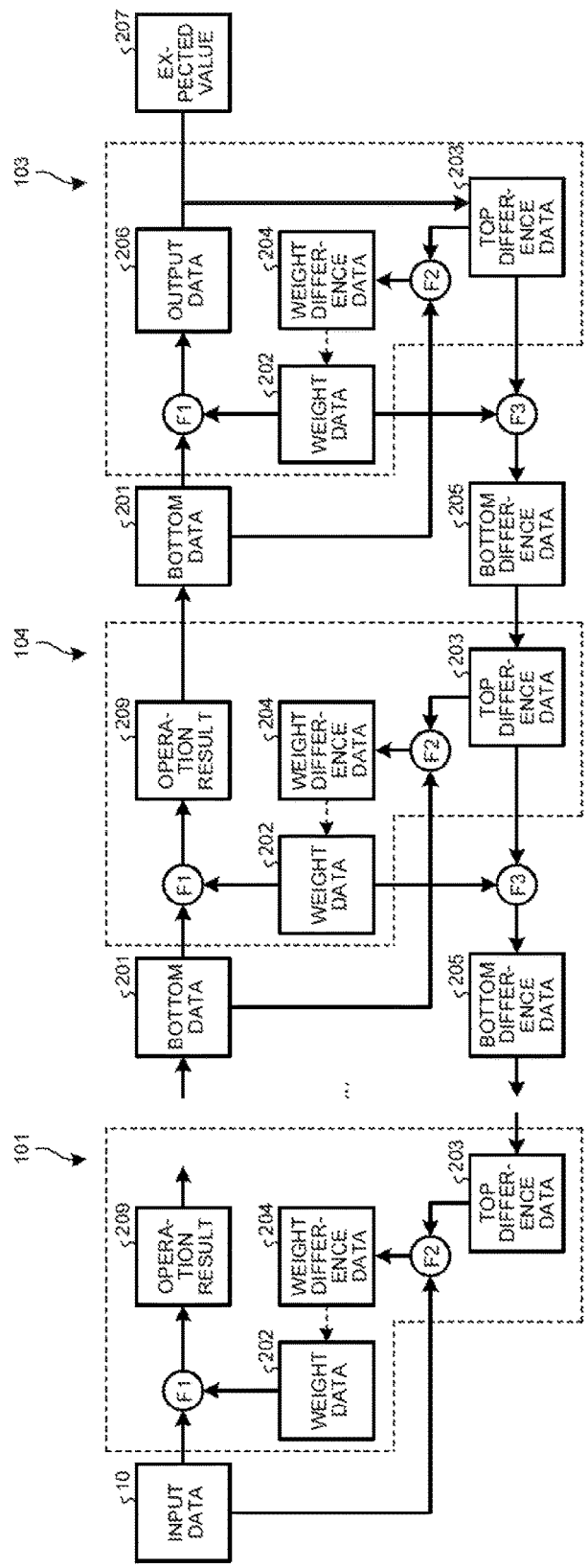
FIG. 2 is a schematic diagram illustrating a convolution forward operation and a convolution backward operation.

FIG. 2 is a schematic diagram illustrating a convolution forward operation and a convolution backward operation. FIG. 2 creates output data 206 from the first layer that starts the arithmetic operation process by using the input data 10 and creates top difference data 203 from an expected value 207. Here, FIG. 2 illustrates the arithmetic operation process layer 101 as the first layer, illustrates an arithmetic operation process layer 104 as the n−1$^{th}$ layer, and illustrates the arithmetic operation process layer 103 as the n$^{th}$ layer, and illustrates the operation performed, in each of the arithmetic operation process layers 101 to 104, from the first layer to the n$^{th}$ layer as an example. Furthermore, the processes illustrated by the circles in FIG. 2 represent the arithmetic operation processes. An arithmetic operation process F1 represents a convolution forward operation. An arithmetic operation process F2 represents a convolution backward weight difference operation. Furthermore, an arithmetic operation process F3 represents a convolution backward bottom difference operation.

The arithmetic processing device 1 performs, in the initial first layer, the convolution forward operation represented by the arithmetic operation process F1 on the input data 10 and on weight data 202 in the first layer and then calculates operation results 209. Then, although not illustrated, in a similar manner in the subsequent second layer, the arithmetic processing device 1 similarly performs the convolution forward operation represented by the arithmetic operation process F1 on the operation results 209 obtained in the previous layer and on the weight data 202 in the second layer. By repeatedly performing this operation, in the last n$^{th}$ layer, the arithmetic processing device 1 similarly performs the convolution forward operation represented by the arithmetic operation process F1 on the operation results 209 obtained in the previous layer and on the weight data 202 in the n$^{th}$ layer; however, in the last n$^{th}$ layer, the arithmetic processing device 1 further calculates the top difference data 203 by comparing the output data 206 with an expected value 207. Here, the input data 10 in the first layer corresponds to bottom data 201 in the second layer to the n$^{th}$ layer. Furthermore, the output data 20 in the n$^{th}$ layer corresponds to the operation results 209 in the first layer to the n−1$^{th}$ layer.

Subsequently, the backward operation will be described. The arithmetic processing device 1 performs a convolution backward weight difference operation represented by an arithmetic operation process F2 on the top difference data 203 and on the bottom data 201 and then calculates weight difference data 204. Furthermore, the arithmetic processing device 1 updates the weight data 202 by using the weight difference data 204. Here, the arrows with the dashed lines illustrated in FIG. 2 represent the process of updating the weight data 202. Specifically, the arithmetic processing device 1 multiplies a learning rate by the weight difference data 204 and calculates the new weight data 202.

Furthermore, the arithmetic processing device 1 performs the convolution backward bottom difference operation represented by an arithmetic operation process F3 on the weight data 202 and the top difference data 203 that were used in the forward operation and then calculates bottom difference data 205.

Here, FIG. 2 illustrates, as an example, the arithmetic operation process layer 103 that is the last layer; however, in also the other layers, the same operation is performed. However, in the other layers, the arithmetic processing device 1 uses the bottom difference data 205 that has been calculated as the top difference data 203 in the layer immediately subsequent to the subject layer.

Figure 3:
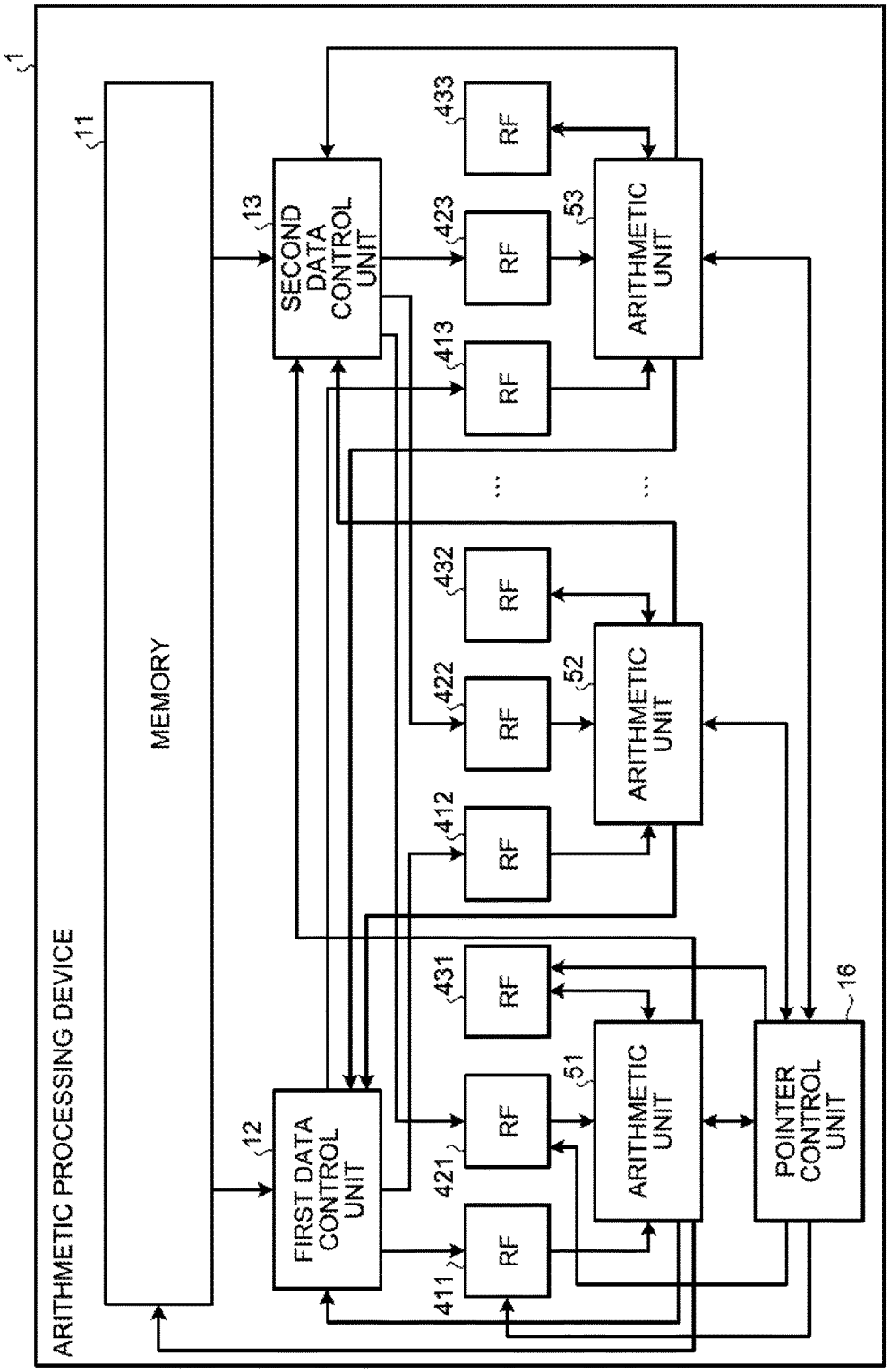
FIG. 3 is a block diagram illustrating an arithmetic processing device according to a first embodiment.

In the following, the arithmetic processing device 1 will be described in detail with reference to FIG. 3. FIG. 3 is a block diagram illustrating an arithmetic processing device according to a first embodiment. As illustrated in FIG. 3, the arithmetic processing device 1 includes a memory 11, a first data control unit 12, a second data control unit 13, register files (RF) 411 to 413, 421 to 423, and 431 to 433. Furthermore, the arithmetic processing device 1 includes arithmetic units 51 to 53 and a pointer control unit 16.

Here, the register files 411 to 413 have the same function. Thus, in a description below, if the register files 411 to 413 are not distinguished, the register files 411 to 413 are referred to as "register files 410". Furthermore, the register files 421 to 423 have the same function. Thus, in a description below, if the register files 421 to 423 are not distinguished, the register files 421 to 423 are referred to as "register files 420". Furthermore, the register files 431 to 433 have the same function. Thus, in a description below, if the register files 431 to 433 are not distinguished, the register files 431 to 433 are referred to as "register files 430". Furthermore, the arithmetic units 51 to 53 have the same function. Thus, in a description below, if the arithmetic units 51 to 53 are not distinguished, the arithmetic units 51 to 53 are referred to as "arithmetic units 50".

The memory 11 is a storage unit that stores therein various kinds of data used for calculation. For example, the memory 11 stores therein the bottom data 201 and the weight data 202. Furthermore, the memory 11 also stores therein the top difference data 203 and the weight difference data 204 calculated by the arithmetic units 51 to 53, which will be described later. The memory 11 mentioned here corresponds to an example of a "data storing unit".

The register files 410, 420, and 430 are storage units in each of which data used for an operation is temporarily stored at the time of the operation. The register files 410, 420, and 430 are allocated, in the embodiment, to each of the arithmetic units 50.

The register file 410 stores therein the data used by one of the convolution forward operation, the convolution backward weight difference operation, and the convolution backward bottom difference operation. Furthermore, the register file 420 stores therein the other one of the data used by the convolution forward operation, the convolution backward weight difference operation, and the convolution backward bottom difference operation. Furthermore, the register file 430 stores therein the operation results obtained by the convolution forward operation, the convolution backward weight difference operation, and the convolution backward bottom difference operation. The register file 410 mentioned here corresponds to an example of a "first operation purpose storage unit". Furthermore, the register file 420 mentioned here corresponds to an example of a "second operation purpose storage unit".

When the first data control unit 12 performs the convolution forward operation, the convolution backward weight difference operation, and the convolution backward operation, the first data control unit 12 reads data from the memory 11 for each predetermined row and stores the read data in the register files 410 associated with the respective arithmetic units 50.

For example, in a case of the convolution forward operation, the first data control unit 12 receives a designation of the top position of the row in which the reading is started. Then, the first data control unit 12 reads data in a row by an amount corresponding to the number of strides at a time from the memory 11, element data in the bottom data 201 from the designated top position to the row by an amount corresponding to the number of the arranged register files 410 and then stores the read element data in each of the register files 410 associated with the respective arithmetic units 50.

Here, when performing the convolution forward operation, in the weight data 202, the position of a single row and a single column of the weight data 202 is moved by an amount corresponding to the number of strides at a time in the row direction from the position that is aligned with the position of a single row and a single column of the weight data 202. In the following, in a case of performing an operation using two rows, the position matched with the single row and the single column of the subject row is referred to as the initial position. Then, the weight data 202 is moved by an amount corresponding to the number of strides at a time in the row direction from the initial position of the bottom data 201 to the position indicated by the number used for an integral multiple obtained in a case of the number that is obtained by adding an integral multiple of the number of strides to the number of kernels, that is greater than the number of rows of the bottom data 201, and that is the minimum number. In the following, the number used for an integral multiple obtained in a case of the number that is obtained by adding an integral multiple of the number of strides to the number of kernels, that is greater than the number of rows of the bottom data 201, and that is the minimum number is referred to as the "maximum number of movements".

The first data control unit 12 repeats the reading of the element data in the row in the bottom data 201 by an amount corresponding to the number of strides at a time and repeats the storing of the element data in the register files 410 the number of times corresponding to the number of the register files 410. However, if the number of the register files 410 is equal to or greater than the maximum number of movements, after having performed the process the number of times corresponding to the maximum number of movements, the first data control unit 12 stops reading the element data and storing the element data in the register file 410.

Then, after having performed the operation by using the element data stored in the register files 410, the first data control unit 12 receives a notification of the end of a row portion operation from the arithmetic unit 50. Then, the first data control unit 12 moves the top position by an amount corresponding to the number of strides in the column direction, reads the element data in the row in the bottom data 201 from the memory 11 by an amount corresponding to the number of strides at a time, and stores the element data in the register files 410. The first data control unit 12 repeatedly reads the element data in the row in the bottom data 201 by an amount corresponding to the number of strides at a time and stores the element data in the register files 410 the number of times corresponding to the maximum number of movements.

If the reading of the element data in the row in the bottom data 201 performed by an amount corresponding to the number of strides at a time and the storing of the element data in the register files 410 has not been completed the number of times corresponding to the maximum number of movements, the first data control unit 12 repeats the same process until the number of movements reaches the maximum number of movements.

Furthermore, in a case of the convolution backward weight difference operation, the first data control unit 12 receives a designation of the top position of the row in which the reading is started. Then, the first data control unit 12 reads, from the memory 11 for each row, the element data in the bottom data 201 from the designated top position and stores the element data in the register files 410 associated with the respective arithmetic units 50.

The first data control unit 12 repeats the reading of the element data in the bottom data 201 performed for each row and the storing of the element data in the register files 410 until the number of processes reaches the number of the register files 410. However, if the number of the register files 410 is equal to or greater than the maximum number of movements, the first data control unit 12 ends the reading of the element data and the storing of the element data in the register files 410 after having performed the process the number of times corresponding to the maximum number of movements.

Then, after the completion of the operation performed by using the element data stored in the register files 410, the first data control unit 12 receives a notification of the end of the row portion operation from the arithmetic unit 50. Then, the first data control unit 12 moves the top position by an amount corresponding to the number of strides in the column direction and performs the reading of the element data in the bottom data 201 from the memory 11 for each row and the storing of the element data in the register files 410. The first data control unit 12 repeats the reading of the element data in the bottom data 201 for each row and the storing of the element data in the register files 410 the number of times corresponding to the maximum number of movements.

If the reading of the element data in the bottom data 201 for each row and the storing of the element data in the register files 410 have not been completed the number of times corresponding to the maximum number of movements, the first data control unit 12 repeats the same process until the number of movements reaches the maximum number of movements.

Furthermore, in a case of the convolution backward bottom difference operation, the first data control unit 12 receives a designation of the top position of the row in which the reading is started. Then, the first data control unit 12 reads the element data in the top difference data 203 for each row and stores the element data in the register files 410 associated with the respective arithmetic units 50.

The first data control unit 12 repeats the reading of the element data in the top difference data 203 for each row and the storing of the element data in the register files 410 until the number of processes reaches the number of the register files 410. However, if the number of the register files 410 is equal to or greater than the number of rows of the top difference data 203, the first data control unit 12 ends the reading of the element data and storing of the element data in the register files 410 after having performed the process the number of times corresponding to the number of rows.

Then, after the completion of the operation performed by using the element data stored in the register files 410, the first data control unit 12 receives a notification of the end of the row portion operation from the arithmetic unit 50. Then, the first data control unit 12 downwardly moves the top position to the row by one and performs the reading of the element data in the top difference data 203 from the memory 11 for each row and the storing of the element data in the register files 410. The first data control unit 12 repeats the reading of the element data in the top difference data 203 for each row and the storing of the element data in the register files 410 the number of times corresponding to the number of rows of the weight data 202.

If the reading of the element data in the top difference data 203 for each row and the storing of the element data in the register files 410 have not been completed the number of times corresponding to the maximum number of movements, the first data control unit 12 repeats the same process until the number of movements reaches the maximum number of movements.

When the second data control unit 13 performs the convolution forward operation, the convolution backward weight difference operation, and the convolution backward, the second data control unit 13 reads data from the memory 11 for each predetermined number of rows and stores the data in the register files 420 associated with the respective arithmetic units 50.

For example, in a case of the convolution forward operation, the second data control unit 13 receives a designation of the top position of the row in which the reading is started. Then, the second data control unit 13 reads, from the designated top position of the memory 11, the element data in the weight data 202 having the number of rows corresponding to the number of strides by the number of the arranged register files 420. Then, the second data control unit 13 stores the read element data in the register files 420 associated with the respective arithmetic units 50. Namely, the second data control unit 13 stores the same element data in all of the register files 420 associated with the respective arithmetic units 50.

After the completion of the operation performed by using the element data stored in the register files 420, the second data control unit 13 receives a notification of the end of the row portion operation from the arithmetic unit 50. Then, the second data control unit 13 moves the read top position in the weight data 202 by an amount corresponding to the number of strides. Then, the second data control unit 13 reads, from the top position in the memory 11, the element data in the row in the weight data 202 by an amount corresponding to the number of strides the number of times corresponding to the arranged register files 420 and stores the element data in the register files 420. The second data control unit 13 repeats the reading of the element data in the row from the top position by an amount corresponding to the number of strides and the storing of the element data in the register files 420.

If the arithmetic operation process has not been ended when the reading of the element data and the storing of the element data in the register files 420 have been completed the maximum number of movements, the second data control unit 13 moves the read top position in the weight data 202 to the top of the weight data. Then, the second data control unit 13 repeats the same process until the arithmetic operation process is ended.

Furthermore, in a case of the convolution backward weight difference operation, the second data control unit 13 receives a designation of the top of the top difference data 203 as the read top position of the element data. Then, the second data control unit 13 reads, from the memory 11, the element data by an amount corresponding to a single row in the top difference data 203 from the designated top position by an amount corresponding to the number of the arranged register files 420. Then, the second data control unit 13 stores the read element data in the register files 420 associated with the respective arithmetic units 50. Namely, the second data control unit 13 stores the same element data in all of the register files 420 associated with the respective arithmetic units 50.

After the completion of the operation performed by using the element data stored in the register files 420, the second data control unit 13 receives a notification of the end of the row portion operation from the arithmetic unit 50. Then, the second data control unit 13 downwardly moves the read top position in the top difference data 203 to the top in the row by one. Then, the second data control unit 13 reads the element data in the top difference data 203 by an amount corresponding to a single row from the top position from the memory 11 by an amount corresponding the number of the arranged register files 420 and stores the element data in the register files 420. The second data control unit 13 repeats the reading of the element data from the top position by an amount corresponding to a single row and the storing of the element data in the register files 420.

If the arithmetic operation process has not been ended when the reading of the element data and the storing of the element data in the register files 420 have been completed the maximum number of movements, the second data control unit 13 moves the read top position in the top difference data 203 to the top of the top difference data 203. Then, the second data control unit 13 repeats the same process until the arithmetic operation process is ended.

Furthermore, in a case of the convolution backward bottom difference operation, the second data control unit 13 receives a designation of the top of the weight data 202 as the read top position of the element data. Then, the second data control unit 13 reads, from the memory 11, the element data in the weight data 202 by an amount corresponding to a single row from the designated top position by an amount corresponding to the number of the arranged register files 420. Then, the second data control unit 13 stores the read element data in the register files 420 associated with the respective arithmetic units 50. Namely, the second data control unit 13 stores the same element data in all of the register files 420 associated with the respective arithmetic units 50.

After the completion of the operation performed by using the element data stored in the register files 420, the second data control unit 13 receives a notification of the end of the row portion operation from the arithmetic unit 50. Then, the second data control unit 13 downwardly moves the read top position in the weight data 202 to the top in the row by one. Then, the second data control unit 13 reads, from the memory 11, the element data in the weight data 202 by an amount corresponding to a single row from the designated top position by an amount corresponding to the number of the arranged register files 420 and stores the element data in the register files 420. The second data control unit 13 repeats the reading of the element data by an amount corresponding to a single row from the top position and storing of the element data in the register files 420.

If the arithmetic operation process has not been ended when the reading of the element data and the storing of the element data in the register files 420 haven been completed the maximum number of movements, the second data control unit 13 moves the read top position in the weight data 202 to the top of the weight data 202. Then, the second data control unit 13 repeats the same process until the arithmetic operation process is ended.

The arithmetic unit 50 performs the convolution forward operation, the convolution backward weight difference operation, and the convolution backward operation by using the element data stored in the register files 410 and 420 and then stores the operation results in the register files 430.

For example, in a case of the convolution forward operation, the arithmetic unit 50 reads the element data in the row in the bottom data 201 by an amount corresponding to the number of strides of the weight data 202 from the position of the top pointer designated by the pointer control unit 16, which will be described later, in the register file 410. Furthermore, the arithmetic unit 50 reads the element data in the row by an amount corresponding to the number of strides of the weight data 202 stored in the register file 420. Then, the arithmetic unit 50 sequentially associates, from the top, the read element data in the bottom data 201 with the element data in the weight data 202 and then multiplies the associated element data. Furthermore, the arithmetic unit 50 sums the multiplication results. Hereinafter, in the convolution forward operation, the operation of multiplying the associated element data and summing the results of the multiplications is referred to as a "forward product-sum operation". Then, the arithmetic unit 50 stores the summed operation result in the position of the top pointer that is designated by the pointer control unit 16 and that is in the register file 430. Then, the arithmetic unit 50 notifies the pointer control unit 16 of the completion of the single forward product-sum operation.

Then, the arithmetic unit 50 reads the element data that is in the row in the bottom data 201 by an amount corresponding to the number of strides of the weight data 202 from the position of the top pointer that is moved by the pointer control unit 16 in the register file 410 by an amount corresponding to the number of strides. Then, the arithmetic unit 50 performs the forward product-sum operation by using both the element data in the weight data 202 already read by the previous calculation and the element data in the bottom data 201 read this time. Then, the arithmetic unit 50 stores the operation result at the position that is moved by one by the pointer control unit 16 in the register file 430. The arithmetic unit 50 repeats the same process until the forward product-sum operation has been performed on all the pieces of the element data in the row by an amount corresponding to the number of strides of the bottom data 201 stored in the register file 410.

If the forward product-sum operation has been performed on all of the pieces of the element data stored in the register file 410, the arithmetic unit 50 sends the completion of the row portion operation to both the first data control unit 12 and the second data control unit 13. Then, the arithmetic unit 50 repeats the forward product-sum operation by using the element data that is newly stored in the register files 410 and 420. Here, during the period of time in which the forward product-sum operation is performed by the maximum number of movements in the weight data 202, the arithmetic unit 50 sequentially adds the result of the forward product-sum operation performed by using the element data whose position from the top is the same in each of the pieces of the element data in the row by an amount corresponding to the number of strides to the value of the same position in the register file 430.

If the arithmetic unit 50 performs the forward product-sum operation the number of times corresponding to the maximum number of movements in the weight data 202, the arithmetic unit 50 stores the operation results in the top difference data 203 held by the memory 11. Then, if the calculation has not been completed for all of the pieces of the top difference data 203, the arithmetic unit 50 repeats the same process as the calculation of new element data in the top difference data 203. The bottom data 201 in the subject convolution forward operation mentioned here corresponds to an example of "first data" and the weight data 202 corresponds to an example of "second data". Furthermore, in a case of the convolution forward operation described here, the row of the number of strides corresponds to an example of a "first predetermined row" and a "second predetermined row".

Furthermore, in a case of the convolution backward weight difference operation, the arithmetic unit 50 reads the element data in the bottom data 201 by an amount corresponding to the number of kernels from the position of the top pointer in the register file 410 designated by the pointer control unit 16. Furthermore, the arithmetic unit 50 reads the element data in the top difference data 203 at the position of the top pointer in the register file 420 designated by the pointer control unit 16. Then, the arithmetic unit 50 multiplies each of the pieces of the read element data in the bottom data 201 and the element data in the top difference data 203. Then, the arithmetic unit 50 adds the multiplication results, as the element data associated with the weight data 202, to the values stored in the register files 430. Hereinafter, an operation that is performed in the convolution backward weight difference operation and that multiplies the associated element data, and that adds the result of the multiplication to the value in the register file 430 is referred to as a "weight difference product-sum operation". The arithmetic unit 50 notifies the pointer control unit 16 of the completion of the operation.

Then, the arithmetic unit 50 reads the element data stored in the bottom data 201 by an amount corresponding to the number of kernels from the position of the top pointer that is in the register file 410 and that is moved by an amount corresponding to the number of strides by the pointer control unit 16. Furthermore, the arithmetic unit 50 reads the element data in the top difference data 203 at the position of the top pointer that is in the register file 420 and that is moved by one by the pointer control unit 16. Then, the arithmetic unit 50 performs the weight difference product-sum operation by using both the read element data in the bottom data 201 and the element data in the top difference data 203. The arithmetic unit 50 repeats the same process until the weight difference product-sum operation has been performed on all of the pieces of the element data by an amount corresponding to a single row of the bottom data 201 stored in the register file 410.

If the weight difference product-sum operation has been performed on all of the pieces of the element data stored in the register file 410, the arithmetic unit 50 sends the completion of the row portion operation to the first data control unit 12 and the second data control unit 13. Then, the arithmetic unit 50 repeats the weight difference product-sum operation by using the element data that is newly stored in the register files 410 and 420. Here, during the period of time in which the forward product-sum operation is performed by an amount corresponding to the maximum number of movements, the arithmetic unit 50 sequentially adds the results of the weight difference product-sum operation performed by using the element data, in each of the rows, at the same position from the top to the values at the same position in the register file 430.

If the forward product-sum operation has been performed by an amount corresponding to the maximum number of movements, the arithmetic unit 50 stores the operation results in the weight difference data 204 held by the memory 11. Then, if the calculation of all of the weight difference data 204 has not been ended, the arithmetic unit 50 repeats the same process as the calculation of new element data in the weight difference data 204. The bottom data 201 in this convolution backward weight difference operation corresponds to an example of the "first data" and the top difference data 203 corresponds to an example of the "second data". Furthermore, in a case of the convolution backward weight difference operation described here, a single row in the bottom data 201 corresponds to an example of the "first predetermined row" and a single row in top difference data 203 corresponds to an example of the "second predetermined row".

Furthermore, in a case of the convolution backward bottom difference operation, the arithmetic unit 50 reads the element data in the top difference data 203 at the position of the pointer in the register file 410 designated by the pointer control unit 16. Furthermore, the arithmetic unit 50 reads the element data in the weight data 202 stored in the register file 410 by an amount corresponding to a single row. Then, the arithmetic unit 50 multiplies each of the pieces of the read element data in the weight data 202 by the selected element data in the top difference data 203. Then, the arithmetic unit 50 adds, as the element data associated with the bottom difference data 205, multiplication results to the respective values the number of which corresponds to the number of kernels from the top pointer in the register file 430 designated by the pointer control unit 16. Hereinafter, in the convolution backward bottom difference operation, the operation that multiplies the associated element data, and that adds the results of the multiplication to the respective values of the register file 430 is referred to as a "bottom difference product-sum operation". The arithmetic unit 50 notifies the pointer control unit 16 of the completion of the operation.

Then, the arithmetic unit 50 holds the element data in the weight data 202 by an amount corresponding to the read single row. Furthermore, the arithmetic unit 50 reads the element data in the top difference data 203 at the position of the top pointer that is in the register file 410 and that is moved by one by the pointer control unit 16. Then, the arithmetic unit 50 performs the bottom difference product-sum operation by using both the element data in the bottom data 201 and the element data in the top difference data 203. The arithmetic unit 50 repeats the same process until the weight difference product-sum operation has been performed on all of the pieces of the element data by an amount corresponding to a single row of the top difference data 203 stored in the register file 420.

If the bottom difference product-sum operation has been performed on all of the pieces of the element data stored in the register file 410, the arithmetic unit 50 sends the completion of the row portion operation to the first data control unit 12 and the second data control unit 13. Then, the arithmetic unit 50 repeats the bottom difference product-sum operation by using the element data that is newly stored in the register files 410 and 420.

If the forward product-sum operation has been performed by an amount corresponding to the number of rows in the weight data 202, the arithmetic unit 50 stores the operation results in the bottom difference data 205 held by the memory 11. Then, if the calculation has not been ended on all of the pieces of the bottom difference data 205, the arithmetic unit 50 repeats the same process as the calculation of the new element data in the bottom difference data 205. The top difference data 203 in this convolution backward bottom difference operation corresponds to an example of "first data" and the weight data 202 corresponds to an example of "second data". Furthermore, in a case of the convolution backward weight difference operation described here, a single row in the top difference data 203 corresponds to an example of the "first predetermined row" and a single row in the weight data 202 corresponds to an example of the "second predetermined row".

Furthermore, in a case of the arithmetic operation process layer 103 that is the last $n^{th}$ layer illustrated in FIG. 1, the arithmetic unit 50 outputs the output data to an output device (not illustrated), such as a monitor, or the like, and provides the operation results to a user. For example, in a case of image recognition, the arithmetic unit 50 outputs the recognition result to the output device.

When the pointer control unit 16 performs the convolution forward operation, the convolution backward weight difference operation, and the convolution backward bottom difference operation, the pointer control unit 16 designates the top pointer and a pointer with respect to the register files 410 to 430. In FIG. 3, for convenience of illustration, the arrows representing control performed by the pointer control unit 16 with respect to the register files 411, 421, and 431 are illustrated as an example; however, in practice, the pointer control unit 16 also performs control of the other register files 410, 420, and 430.

For example, in a case of the convolution forward operation, the pointer control unit 16 firstly sets the top pointer in the register file 410 to the top of the register file 410. Furthermore, the pointer control unit 16 firstly sets the pointer in the register file 430 to the top of the register file 430.

Every time the pointer control unit 16 receives a notification of the completion of a single operation, the pointer control unit 16 sets the top pointer in the register file 410 to the position that is moved by an amount corresponding to the number of strides. Furthermore, the pointer control unit 16 sets the pointer in the register file 430 to the position that is moved by one. Then, if the moving of the top pointer in the register file 410 has been performed by an amount corresponding to the maximum number of movements, the pointer control unit 16 sets the top pointer to the top of the register file 410. Namely, the top pointer in the register file 410 is set to the top of the subsequent row in the bottom data 201 by an amount corresponding to the number of strides. Furthermore, the pointer control unit 16 returns the pointer to the top of the register file 430. Namely, the pointer in the register file 430 is set to the top of the subsequent row in the top difference data 203. The pointer control unit 16 repeats the same process until the convolution forward operation performed by the arithmetic unit 50 is ended.

Furthermore, in a case of the convolution backward weight difference operation, the pointer control unit 16 firstly sets the top pointer in the register file 410 to the top of the register file 410. Furthermore, the pointer control unit 16 firstly sets the pointer in the register file 420 to the top of the register file 420.

Every time the pointer control unit 16 receives a notification of the completion of a single operation, the pointer control unit 16 sets the top pointer in the register file 410 to the position that is moved by an amount corresponding to the number of strides. Furthermore, the pointer control unit 16 sets the pointer in the register file 420 to the position that is moved by one. Then, if the moving of the top pointer in the register file 410 in the bottom data 201 in the row direction has been performed by an amount corresponding to the number of movements, the pointer control unit 16 returns the top pointer to the top of the register file 410. Namely, the top pointer in the register file 410 is set at the top of the subsequent row in the bottom data 201. Furthermore, the pointer control unit 16 returns the pointer in the register file 420 to the top of the register file 420. Namely, the pointer in the register file 420 is set to the top of the subsequent row in the top difference data 203. The pointer control unit 16 repeats the same process until the convolution backward weight difference operation performed by the arithmetic unit 50 is ended.

Furthermore, in a case of the convolution backward bottom difference operation, the pointer control unit 16 firstly sets the pointer in the register file 420 to the top of the register file 420. Furthermore, the pointer control unit 16 firstly sets the top pointer in the register file 430 to the top of the register file 430.

Every time the pointer control unit 16 receives a notification of the completion of a single operation, the pointer control unit 16 sets the top pointer in the register file 420 to the position that is moved by one. Furthermore, the pointer control unit 16 sets the pointer in the register file 430 to the position that is moved by an amount corresponding to the number of strides. Then, if the pointer control unit 16 moves the top pointer in the register file 420 by the number of times corresponding to the number of movements in the row direction in the top difference data 203, the pointer control unit 16 returns the top pointer to the top of the register file 420. Namely, the top pointer in the register file 420 is set at the top in the subsequent row in the top difference data 203. Furthermore, the pointer control unit 16 returns the pointer in the register file 430 to the top of the register file 430. Namely, the pointer in the register file 430 is set at the top in the subsequent row in the bottom difference data 205. The pointer control unit 16 repeats the same process until the convolution backward bottom difference operation performed by the arithmetic unit 50 is ended.

Furthermore, the convolution forward operation, the convolution backward weight difference operation, and the convolution backward bottom difference operation will be described in detail.

Figure 4:
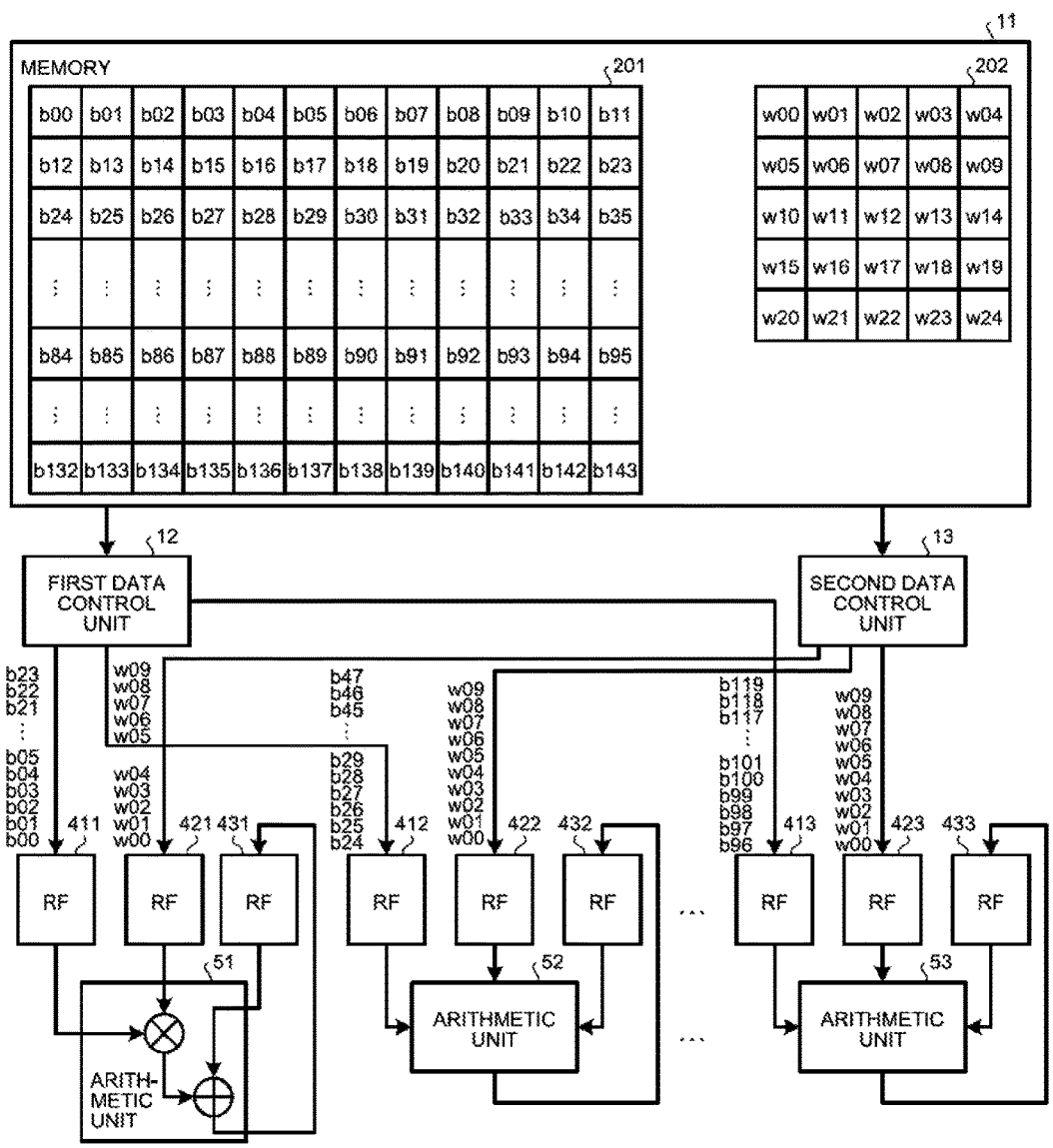
FIG. 4 is a schematic diagram illustrating a state of storing data into register files at the time of the convolution forward operation.

A case of performing the convolution forward operation will be described with reference to FIG. 4. FIG. 4 is a schematic diagram illustrating a state of storing data into register files at the time of the convolution forward operation. In FIG. 4, the arithmetic processing device 1 uses the bottom data 201 in which the element data is arranged in 12 rows and 12 columns and the weight data 202 in which the element data with the number of kernels of 5 is aligned in five rows (i.e., element data is arranged in five rows and five columns). The bottom data 201 includes element data b00 to b143. Furthermore, the weight data 202 includes element data w00 to w24.

The bottom data 201 is read in each of the register files 411, 412, and 413 that are used to store the bottom data via the first data control unit 12 (hereinafter, simply referred to as the register files 411, 412, and 413). Furthermore, the weight data 202 is read in each of the register files 421, 422, and 423 that are used to store the weight data via the second data control unit 13 (hereinafter, simply referred to as the register files 421, 422, and 423). Furthermore, the operation results are read in the register files 431, 432, and 433 that are used to store the operation results (hereinafter, simply referred to as the register files 431, 432, and 433).

Here, when the weight data 202 is moved on the bottom data 201 by an amount corresponding to the number of strides at a time, if the end portion overflows, i.e., if the number of rows of the bottom data 201 is not able to be represented by the number obtained by adding an integral multiple of the number of strides to the number of kernels, the first data control unit 12 and the second data control unit 13 perform the following process. The first data control unit 12 and the second data control unit 13 add the element data that is used to adjust the calculation to the circumference of the bottom data 201 in the row direction and the column direction of the bottom data 201 such that the value is the result of adding an integral multiple of the number of strides, is greater than the bottom data 201, and is the minimum. For example, if the number of strides is 2 in FIG. 4, the first data control unit 12 and the second data control unit 13 can use data obtained by adding the element data with an amount corresponding to one row and one column to the bottom data 201. The first data control unit 12 and the second data control unit 13 also perform this process in the convolution backward operation.

Furthermore, in the embodiment, the arithmetic units 50 the number of which corresponds to the maximum number of movements are used. For example, if the number of strides is 2 in FIG. 4, the five arithmetic units 50 are used.

The first data control unit 12 previously stores therein the size of the bottom data 201 and the weight data 202 that are used in the convolution forward operation. Furthermore, the first data control unit 12 previously stores therein the number of strides that is an amount of single movement of the weight data 202 in the convolution forward operation. For example, the first data control unit 12 acquires and stores the size of the bottom data 201, the size of the weight data 202 (or the number of kernels), and the number of strides by using a set value that is previously set by using a display device, such as a monitor, or the like, and an input device, such as a keyboard, or the like.

The first data control unit 12 reads, from the memory 11, the element data in the row in the bottom data 201 by an amount corresponding to the number of strides from the top position of the bottom data 201. For example, if the number of strides is 2, the first data control unit 12 reads the data of the element data b00 to b23. Then, the first data control unit 12 stores the element data b00 to b23 in the register file 411.

Furthermore, the first data control unit 12 reads, from the memory 11, the element data in the subsequent row in the bottom data 201 by an amount corresponding to the number of strides. Then, the first data control unit 12 stores the read element data in the register file 411. For example, if the number of strides is 2, the first data control unit 12 stores the pieces of the element data b24 to b47 in the register file 412.

In this way, the first data control unit 12 acquires the element data in the row in the bottom data 201 by an amount corresponding to the number of strides by sequentially shifting the top by an amount corresponding to the number of strides at a time and sequentially stores the element data in the different register files 411 to 413 (411, 412, and 413).

Then, the first data control unit 12 repeats, the maximum number of movement times, the reading of the element data in the row from the memory 11 by an amount corresponding to the number of strides and the storing of the element data in the register files 410. For example, if the number of strides is 2, the first data control unit 12 stores the element data b96 to b119 in the register file 413.

Furthermore, the second data control unit 13 reads, from the memory 11, the element data in the row in the weight data 202, which is in units designated by the number of kernels, by an amount corresponding to the number of strides from the top position of the weight data 202. For example, if the number of strides is 2 and if the number of kernels is 5, the second data control unit 13 reads the element data w00 to w04 and w05 to w09 from the memory 11. Then, the second data control unit 13 stores the element data w00 to w09 in the register files 421 to 423 (421, 422, and 423).

The arithmetic unit 51 performs the forward product-sum operation by using both the element data b00 to b23 stored in the register file 411 and the element data w00 to w09 stored in the register file 421. Then, the arithmetic unit 51 adds the result of the forward product-sum operation to the value that is at the position indicated by the pointer in the register file 431 that is used to store the operation results. Here, because the initial value is 0 in the register file 431 that is used to store the operation results, at the time of the first operation, the operation result obtained from the forward product-sum operation is stored in the register file 431 that is used to store the operation results without processing anything.

The arithmetic units 52 and 53 also perform the same forward product-sum operation as that performed by the arithmetic unit 51 and add the operation result to the value stored in each of the register files 432 and 433.

Then, the pieces of the element data b24 to b47 are stored in the first data control unit 12, the pieces of the element data b48 to b71 are stored in the register file 412, and the pieces of the element data b120 to b143 are stored in the register file 413. Furthermore, the pieces of the element data w10 to w19 are stored in the register files 421 to 423 by the second data control unit 13.

The arithmetic unit 51 performs the forward product-sum operation by using both the element data b24 to b47 stored in the register file 411 and the element data w10 to w19 stored in the register file 421. Then, the arithmetic unit 51 adds the result of the forward product-sum operation to the value that is stored in the position indicated by the pointer in the register file 431.

The arithmetic units 52 and 53 also perform the same forward product-sum operation that that performed by the arithmetic unit 51 and add the operation result to the value stored in each of the register files 432 and 433.

In this way, the first data control unit 12 and the second data control unit 13 stores the element data in the register files 410 and 420. Then, the arithmetic units 51 to 53 performs the forward product-sum operation by using the element data stored in the register files 410 and 420.

Figure 5:
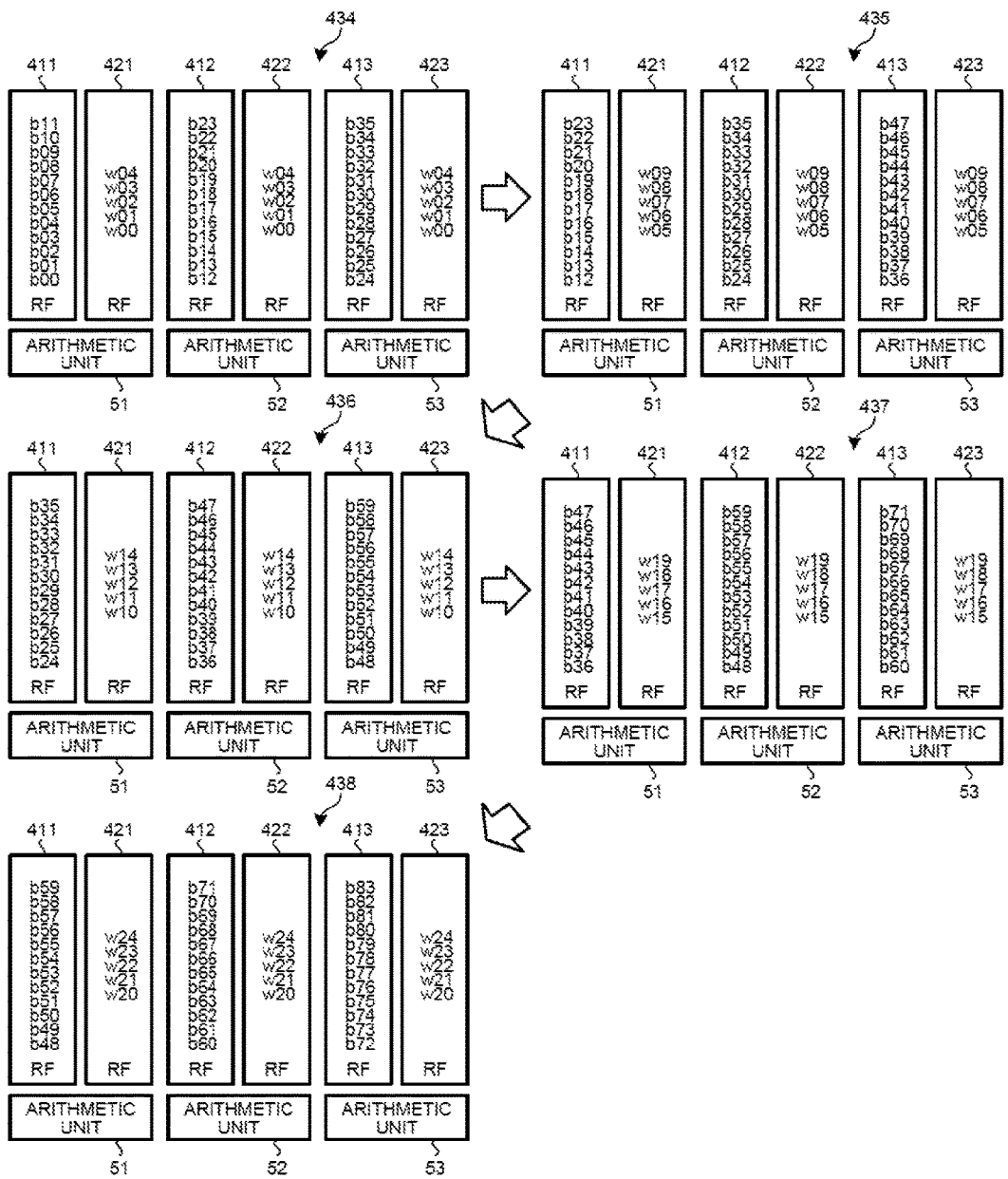
FIG. 5 is a schematic diagram illustrating the transition of element data stored when the number of strides in the convolution forward operation is 1.
Figure 6:
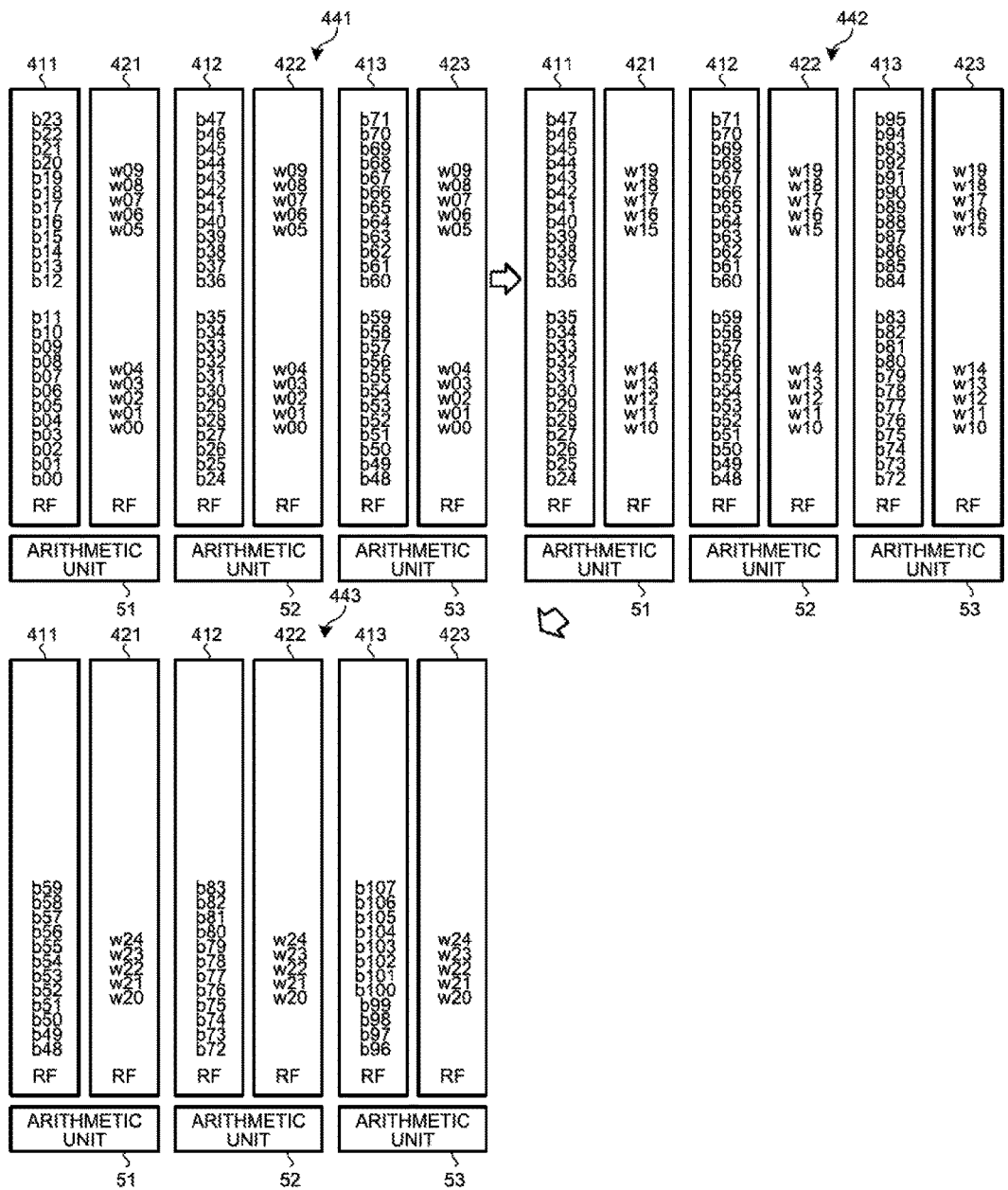
FIG. 6 is a schematic diagram illustrating the transition of element data stored when the number of strides in the convolution forward operation is 2.

Here, the transition of the element data stored in the register files 410 and 420 will be described with reference to FIGS. 5 and 6. FIG. 5 is a schematic diagram illustrating the transition of the element data stored when the number of strides in the convolution forward operation is 1. Furthermore, FIG. 6 is a schematic diagram illustrating the transition of the element data stored when the number of strides in the convolution forward operation is 2. Here, a description will be given of a case in which the three arithmetic units 51 to 53 are present. Furthermore, in also this case, the bottom data 201 and the weight data 202 illustrated in FIG. 4 are used.

If the number of strides is 1, first, as indicated by a state 434 illustrated in FIG. 5, the pieces of the element data b00 to b11 are stored in the register file 411. Furthermore, the pieces of the element data b12 to b23 are stored in the register file 412. Furthermore, the pieces of the element data b24 to b35 are stored in the register file 413. Furthermore, in the register files 421 to 423, the pieces of the element data w00 w04 in units designated by the number of kernels are stored.

Then, if the operation indicated by the state 434 is ended, as indicated by a state 435, in the register files 411 to 413, the element data with an amount corresponding to the subsequent single row of the element data stored in the state 434 is stored. In this way, until the end of the acquisition of the element data by an amount corresponding to five rows that is the number of rows of the weight data 202 designated by the number of kernels, in also states 436 to 438, the element data with an amount corresponding to the subsequent single row of the element data stored in the previous state is sequentially stored in the register files 411 to 413.

Then, at the time of the end of the operation performed by the arithmetic units 51 to 53 in the states 434 to 438, the convolution forward operation has been completed in a case of sequentially moving the weight data 202 in the row direction from the state in which the top of the weight data 202 is arranged in association with the top of the bottom data 201. However, in the operation performed in the states 434 to 438, the convolution forward operation is not performed in the state in which the weight data 202 is moved in the column direction. Thus, in order to complete all of the convolution forward operations, the arithmetic processing device 1 additionally performs the process of convolution forward operation performed by moving the weight data 202 in the direction of the overlapped row while moving the weight data 202 in the row direction seven times.

Furthermore, if the number of strides is 2, first, as indicated by a state 441 illustrated in FIG. 6, the pieces of the element data b00 to b23 are stored in the register file 411. Furthermore, the pieces of the element data b24 to b47 are stored in the register file 412. Furthermore, the pieces of the element data b48 to b71 are stored in the register file 413. Furthermore, the pieces of the element data w00 to w09 are stored in the register files 421 to 423.

Then, if the operation in the state 441 is ended, as indicated by a state 442, in the register files 411 to 413, the element data, which is subsequent to the element data stored in the state 441, in the row by an amount corresponding to the number of strides is stored. In also a state 443, the element data, which is subsequent to the element data stored in the state 442, by an amount corresponding to the subsequent single row is sequentially stored in the register files 411 to 413. However, because the number of rows in the weight data 202 is 5, if the number of strides is 2, when movement is performed twice, for example, because the arithmetic unit 51 has already acquired the element data of b00 to b11, b12 to b23, b24 to b35, and b36 to b47 corresponding to four rows, a single row remains. Thus, in the state 443 in which the movement is performed twice, the element data with an amount at least the single row in the bottom data 201 is stored in the register files 411 to 413 and the arithmetic operation process is similarly performed by the arithmetic unit by using the stored element data with an amount corresponding to the single row.

Then, at the time of the end of the operation performed by the arithmetic units 51 to 53 in the states 441 to 443, the convolution forward operation has been completed in a case of sequentially moving the weight data 202 in the row direction from the state in which the top of the bottom data 201 is arranged in association with the top of the weight data 202. However, in the operation performed in the states 441 to 443, the convolution forward operation is not performed in the state in which the weight data 202 is moved in the column direction. Thus, in order to complete all of the convolution forward operations, the arithmetic processing device 1 additionally performs the process of convolution forward operation of moving the weight data 202 in the row direction while moving the weight data 202 in the column direction for four times.

Figure 7:
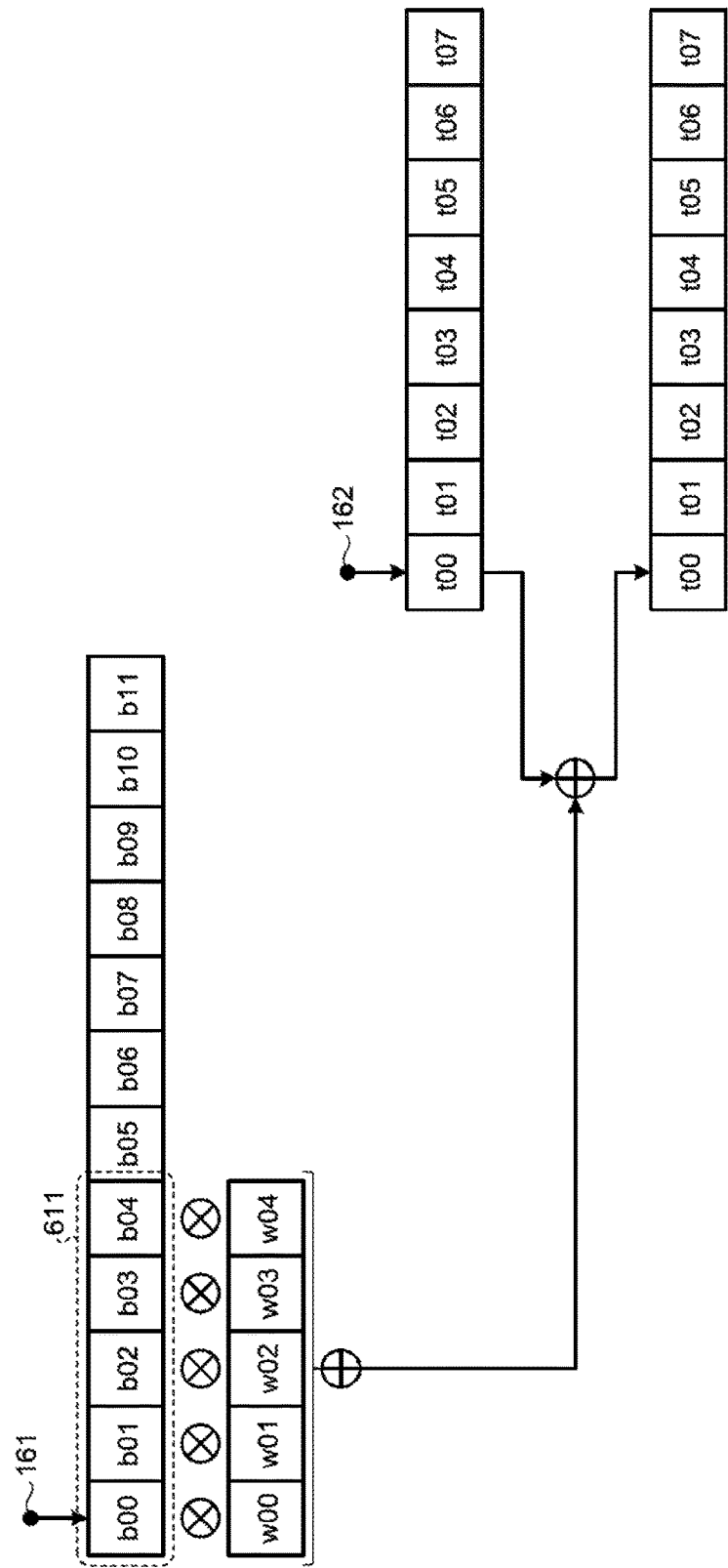
FIG. 7 is a schematic diagram illustrating a first state in the convolution forward operation.
Figure 8:
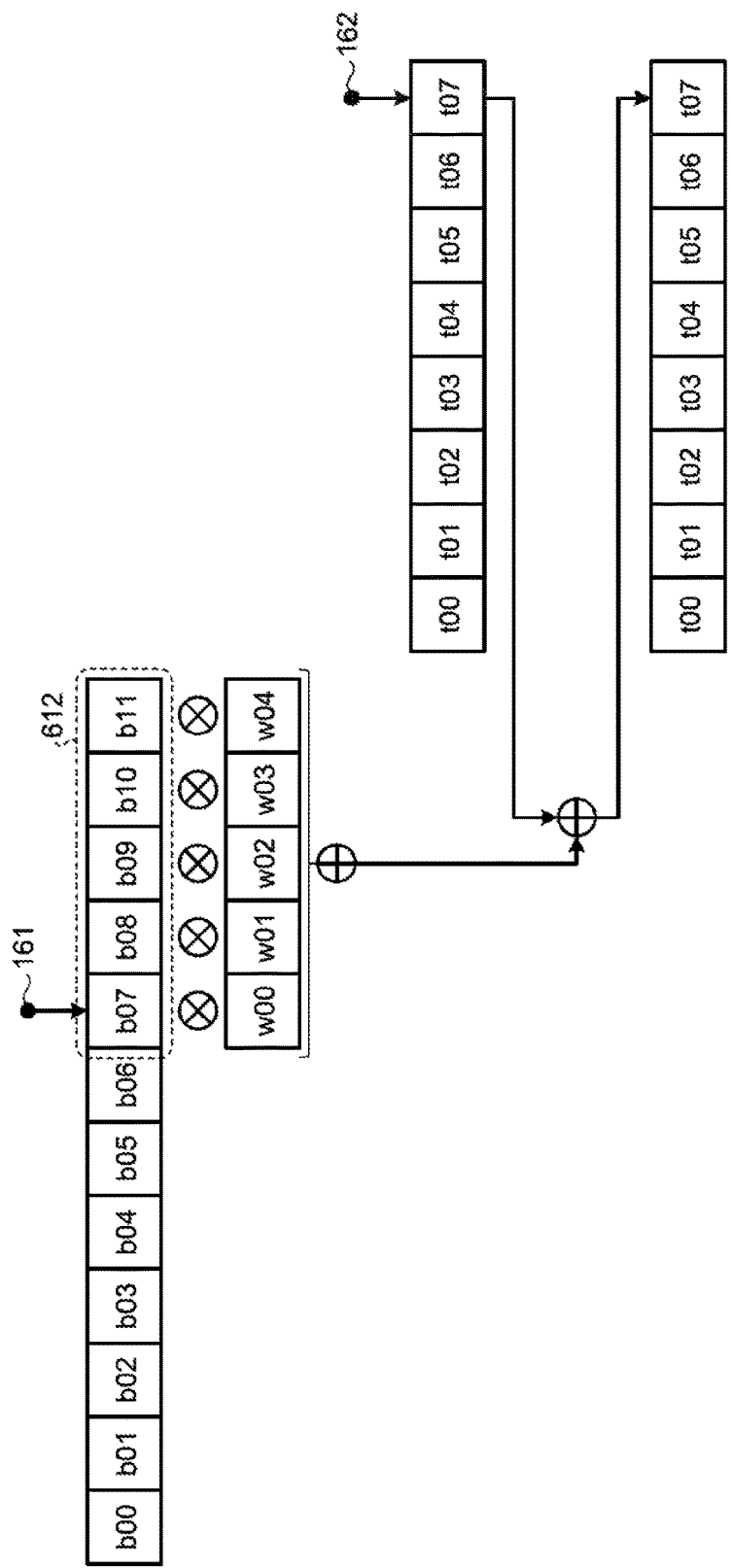
FIG. 8 is a schematic diagram illustrating the state of performing the last forward product-sum operation on the element data in a row by an amount corresponding to the number of strides stored in the register file.
Figure 9:
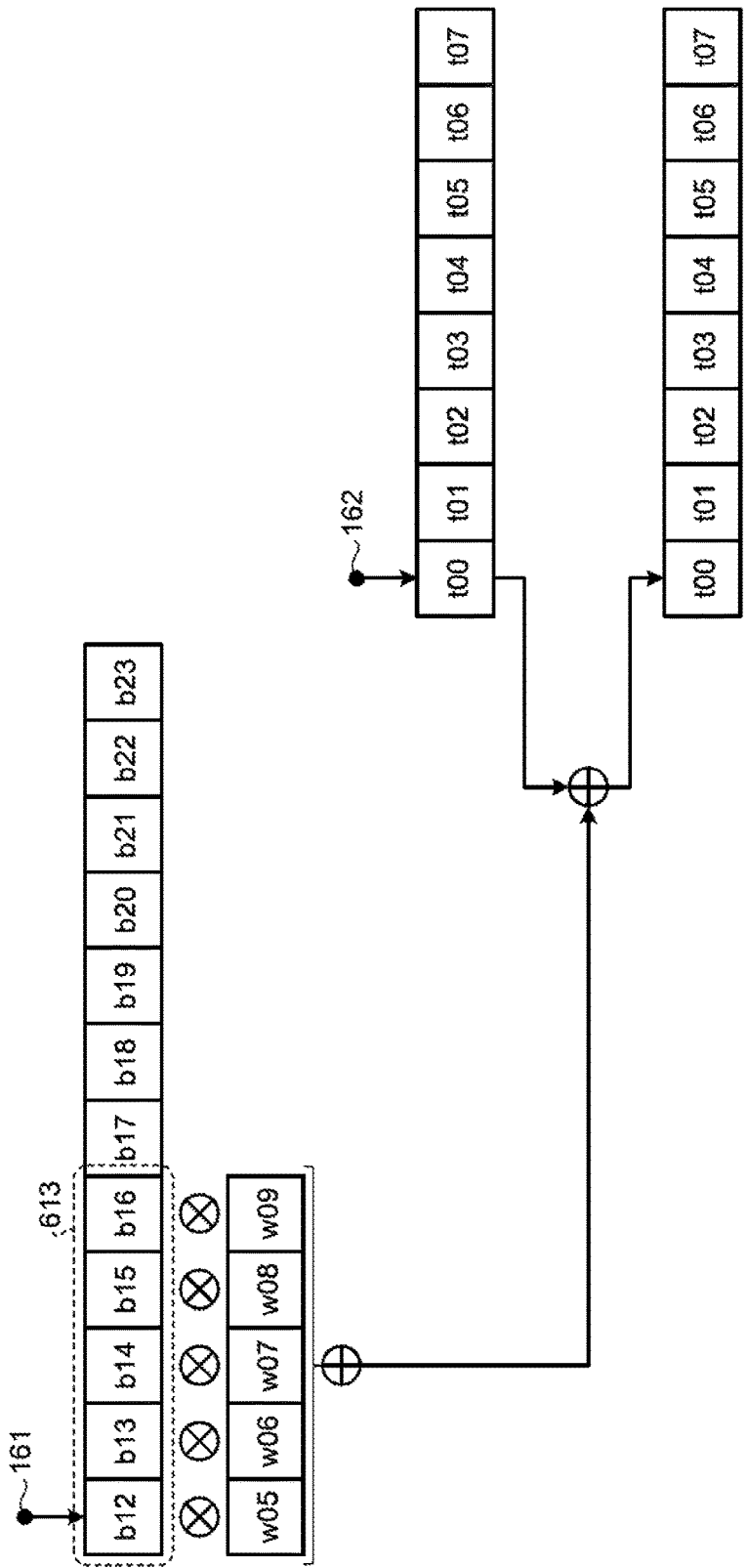
FIG. 9 is a schematic diagram illustrating the state of the movement to the subsequent row by an amount corresponding to the number strides.

In the following, the forward product-sum operation performed by the arithmetic unit 50 will be described in detail with reference to FIGS. 7 to 9. FIG. 7 is a schematic diagram illustrating a first state in the convolution forward operation. FIG. 8 is a schematic diagram illustrating the state of performing the last forward product-sum operation on the element data in a row by an amount corresponding to the number of strides stored in the register file. FIG. 9 is a schematic diagram illustrating the state of the movement to the subsequent row by an amount corresponding to the number strides. Here, a description will be given of a case of using the bottom data 201 and the weight data 202 illustrated in FIG. 4 and a case in which the number of strides is 1.

First, when starting the convolution forward operation, the pieces of the element data b00 to b11 are stored in the register file 410. Furthermore, the pieces of the element data w00 to w04 in the weight data 202 are stored in the register file 420.

The pointer control unit 16 sets a top pointer 161 in the register file 411 to the first element data b00 stored in the register file 411. Furthermore, the pointer control unit 16 sets a pointer 162 in the register file 430 to the top element data t00 of the top difference data 203 stored in the register file 430.

The arithmetic unit 50 acquires, from the position of the top pointer 161 in the register file 410, the element data b00 to b04 that is present in the portion enclosed by a dotted line 611 and the number of which corresponds to the number of kernels. Then, the arithmetic unit 50 multiplies the element data b00 to b04 by the element data w00 to w04, respectively, and sums the multiplication results. Then, the arithmetic unit 50 acquires the value of the element data t00 indicated by the pointer 162 in the register file 430. Here, the initial value of the element data t00 is zero. Then, the arithmetic unit 50 sums the result of the forward product-sum operation and the value of the element data t00 and stores the sum result as the element data t00 in the position indicated by the pointer 162 in the register file 430.

Thereafter, the pointer control unit 16 repeats the moving of the top pointer 161 by an amount corresponding to the number of strides seven times and obtains the state illustrated in FIG. 8. Furthermore, the pointer control unit 16 repeats the moving of the pointer 162 by one at a time and obtains the state illustrated in FIG. 8.

In the state illustrated in FIG. 8, the arithmetic unit 50 acquires, from the position of the top pointer 161 in the register file 410, the element data b07 to b11 that is present in the portion enclosed by a dotted line 612 and the number of which corresponds to the number of kernels. Then, the arithmetic unit 50 multiplies the element data b07 to b11 by the element data w00 to w04, respectively, and sums the multiplication results. Then, the arithmetic unit 50 acquires the value of the element data t07 indicated by the pointer 162 in the register file 430. Here, the initial value of the element data t07 is zero. Then, the arithmetic unit 50 sums the result of the forward product-sum operation and the value of the element data t07 and stores the sum result as the element data t07 in the position indicated by the pointer 162 in the register file 430.

If the forward product-sum operation in the state illustrated in FIG. 8 has been completed, the subsequent element data b12 to b23 in the row by an amount corresponding to the number of strides is newly stored in the register file 410. Furthermore, the element data w05 to w09 in the subsequent row in the weight data 202 is stored in the register file 420.

Then, the pointer control unit 16 initializes the top pointer 161 and sets, as illustrated in FIG. 9, the top pointer 161 to the first element data b12 stored in the register file 410. Furthermore, the pointer control unit 16 initializes the pointer 162 and sets the pointer 162 to the top element data t00 in the top difference data 203 stored in the register file 430.

The arithmetic unit 50 acquires, from the position of the top pointer 161 in the register file 410, the element data b12 to b16 that is present in the portion enclosed by a dotted line 613 and the number of which corresponds to the number of kernels. Then, the arithmetic unit 50 multiplies the element data b12 to b16 by the element data w00 to w04, respectively, and sums the multiplication results. Then, the arithmetic unit 50 acquires the value of the element data t00 indicated by the pointer 162 in the register file 430. Then, the arithmetic unit 50 sums the result of the forward product-sum operation and the value of the element data t00 and stores the sum result as the element data t00 in the position indicated by the pointer 162 in the register file 430.

In this way, every time a single operation has been completed, the pointer control unit 16 slides the top pointer 161 from the top of the register file 410 by an amount corresponding to a single stride at a time the number of times corresponding to the number of movements in the column direction of the bottom data 201. Thereafter, if the top pointer 161 reaches the rear end, the pointer control unit 16 initializes the top pointer 161 and returns the top pointer 161 to the top. Furthermore, every time a single operation has been completed, the pointer control unit 16 slides the pointer 162 from the top of the register file 430 by one at a time the number of times corresponding to the number of movements in the column direction of the weight data 202. Then, if the pointer 162 reaches the rear end, the pointer control unit 16 initializes the pointer 162 and returns the pointer 162 to the top.

The arithmetic unit 50 repeats the forward product-sum operation by using the top pointer 161 and the pointer 162 and sequentially obtains the top difference data 203.

Figure 10:
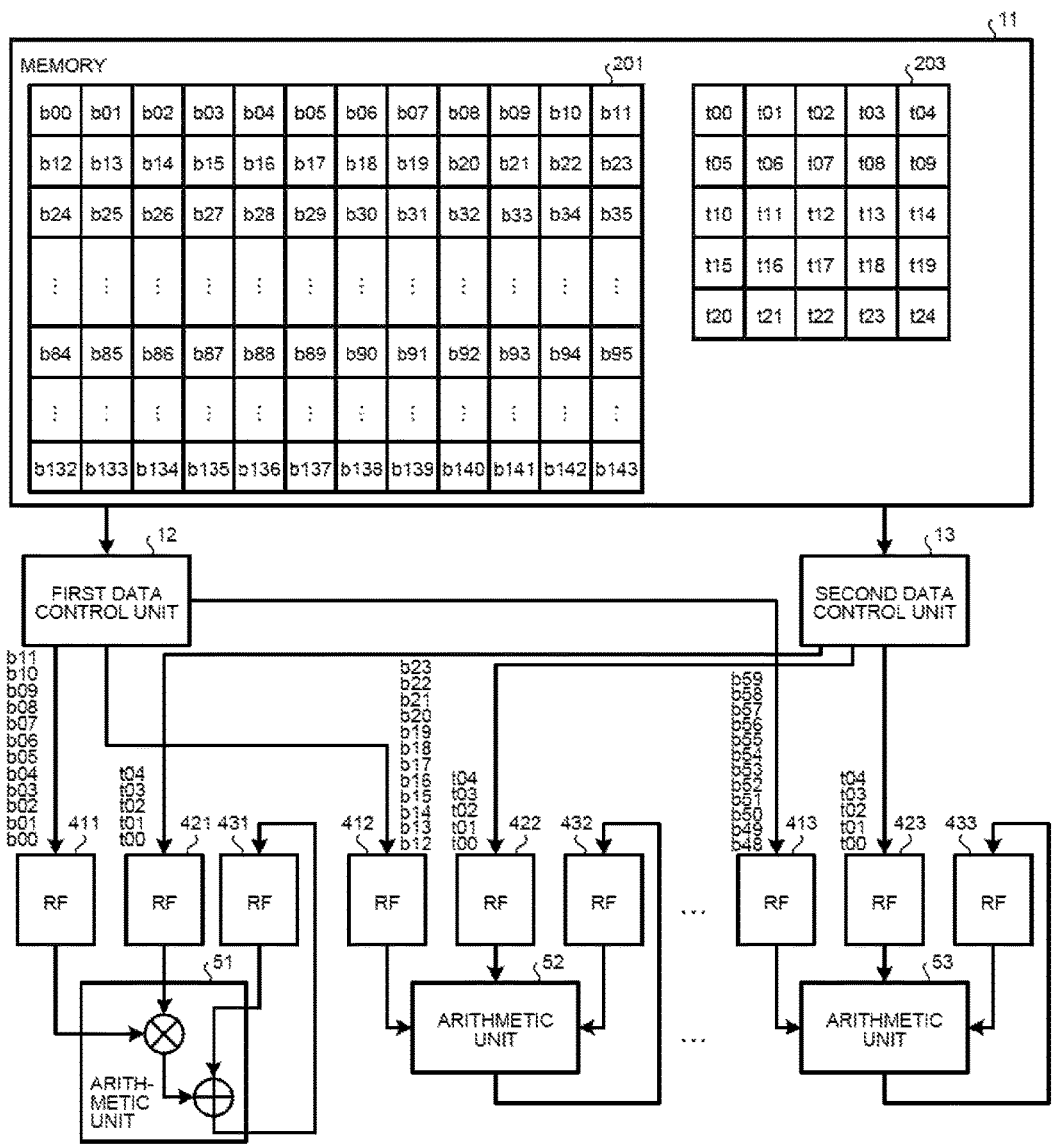
FIG. 10 is a schematic diagram illustrating the state of storing data in the register files at the time of a convolution backward weight difference operation.

In the following, a case of performing the convolution backward weight difference operation will be described with reference to FIG. 10. FIG. 10 is a schematic diagram illustrating the state of storing data in the register files at the time of a convolution backward weight difference operation. In FIG. 4, the arithmetic processing device 1 uses the bottom data 201 in which the element data is arranged in 12 rows and 12 columns and uses the top difference data 203 in which the element data is arranged in five rows and five columns. The bottom data 201 includes the element data b00 to b143. Furthermore, it is assumed that the top difference data 203 includes the element data t00 to t24 and is obtained in a case in which the number of strides is two by using the bottom data 201 and the weight data 202 that has five rows and five columns. Here, because the weight difference data 204 includes the same number of rows and columns as that included in the weight data 202, similarly to the weight data 202, also regarding the weight difference data 204, each of the pieces of the element data is represented by the form of w00.

Furthermore, in the embodiment, the arithmetic units 50 the number of which corresponds to the number of rows of the weight difference data 204 are used. Consequently, by moving in the row direction, the arithmetic units 50 can perform the convolution backward weight difference operation on all of the bottom data 201. For example, in FIG. 10, the five arithmetic units 50 are used.

The first data control unit 12 previously stores therein the size of the bottom data 201 and the top difference data 203 that are used in the convolution backward weight difference operation. For example, the first data control unit 12 acquires the size (or, the number of kernels) of the bottom data 201 and the top difference data 203 based on the set value that is set by using the display device and the input device and stores the acquired size.

The first data control unit 12 reads, from the memory 11, the element data by an amount corresponding to a single row from the top position of the bottom data 201. For example, the first data control unit 12 reads the data of the element data b00 to b11. Then, the first data control unit 12 stores the element data b00 to b11 in the register file 411 that is used to store the bottom data.

Furthermore, the first data control unit 12 reads, from the memory 11, the element data that is in the subsequent row in the bottom data 201. Then, the first data control unit 12 stores the read element data in the register file 412 that is used to store the bottom data. For example, the first data control unit 12 stores the element data b12 to b23 in the register file 412 that is used to store the bottom data.

The first data control unit 12 repeats, the number of times corresponding to the number of rows of the weight difference data 204, the reading of the element data from the memory 11 for each row and the storing of the element data in the different register files 411 to 413 that are used to store the bottom data (hereinafter, simply referred to as the register files 411, 412, and 413). For example, the first data control unit 12 stores the element data b48 to b59 in the register file 413.

Furthermore, the second data control unit 13 reads, from the memory 11, the element data by an amount corresponding to a single row from the top position in the top difference data 203. For example, the second data control unit 13 reads, from the memory 11, the element data t00 to t04 in the top difference data 203. Then, the second data control unit 13 stores the element data t00 to t04 in the register files 421 to 423 that are used to store the top difference data (hereinafter, simply referred to as the register files 421, 422, and 423).

The arithmetic unit 51 performs the weight difference product-sum operation by using the element data b00 to b11 stored in the register file 411 and using the element data t00 to t04 stored in the register file 421 and calculates the temporary values of the element data w00 to w05 in the weight difference data 204. Then, the arithmetic unit 51 stores the results of the weight difference product-sum operation as associated temporary values of the weight difference data 204 in the register file 431 that is used to store the operation results (hereinafter, simply referred to as the register file 431).

The arithmetic units 52 and 53 also perform the same weight difference product-sum operation as that performed by the arithmetic unit 51 and stores the temporary values of w06 to 09, . . . , and w20 to w24 that are the operation results in each of the register files 432 and 433 that are used to store the operation results (hereinafter, simply referred to as the register files 432 and 433).

Then, the element data b24 to b35 that is present in the row ahead by an amount corresponding to the number of strides is stored in the register file 411 by the first data control unit 12, element data b60 to b71 that is present in the row ahead by an amount corresponding to the number of strides is stored in the register file 412, and the element data b72 to b83 is stored in the register file 413. Furthermore, the element data t05 to t09 is stored in the register files 421 to 423 by the second data control unit 13.

The arithmetic unit 51 performs the forward product-sum operation by using both the element data b24 to b35 stored in the register file 411 and the element data t05 to t09 stored in the register file 421. By sequentially adding the associated values in the weight difference data 204 in the register file 431, the arithmetic unit 51 stores, in the register file 431, the temporary values of the element data w00 to w05 in the weight difference data 204.

Similarly, the arithmetic units 52 and 53 also perform the same weight difference product-sum operation as that performed by the arithmetic unit 51 and sequentially add the operation results, whereby the arithmetic units 52 and 53 store the temporary values of w06 to 09, . . . , and w20 to w24 in the weight difference data 204 as the operation results in the register files 432 and 433.

In this way, the first data control unit 12 sequentially stores, in the register file 410, the element data that is present in the row ahead by an amount corresponding to the number of strides from the top row of the bottom data 201. Furthermore, the second data control unit 13 sequentially stores, in the register file 420, the element data by an amount corresponding to a single row at a time from the top row of the top difference data 203. Similarly, the first data control unit 12 and the second data control unit 13 store each of the element data in the register files 411 to 413 and 421 to 423 by setting the row slid by a single row at a time to the top. Then, the arithmetic units 51 to 53 perform the weight difference operation by using the element data stored in the register files 411 to 413 and 421 to 423.

Figure 11:
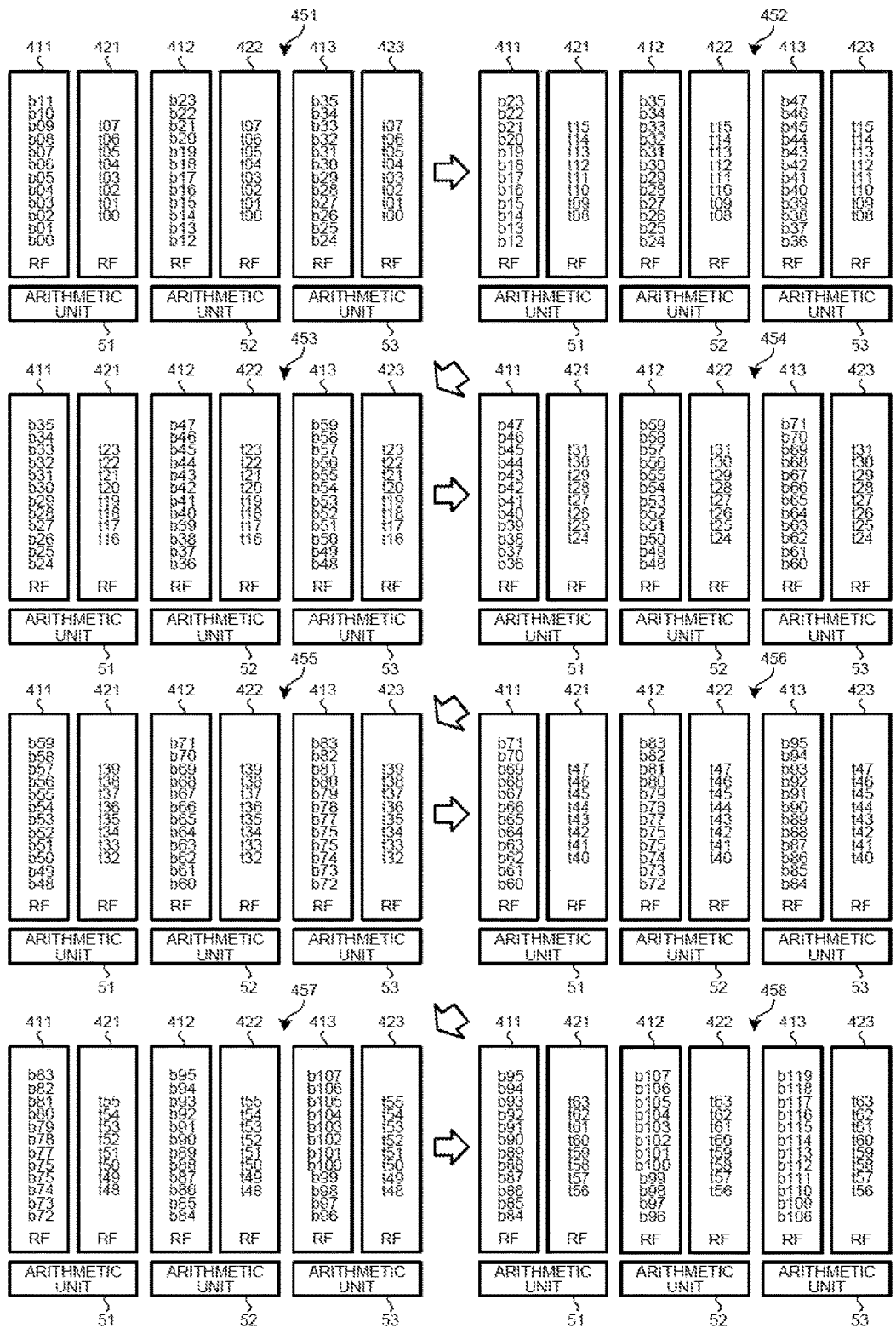
FIG. 11 is a schematic diagram illustrating the transition of element data stored when the number of strides in the convolution backward weight difference operation is 1.
Figure 12:
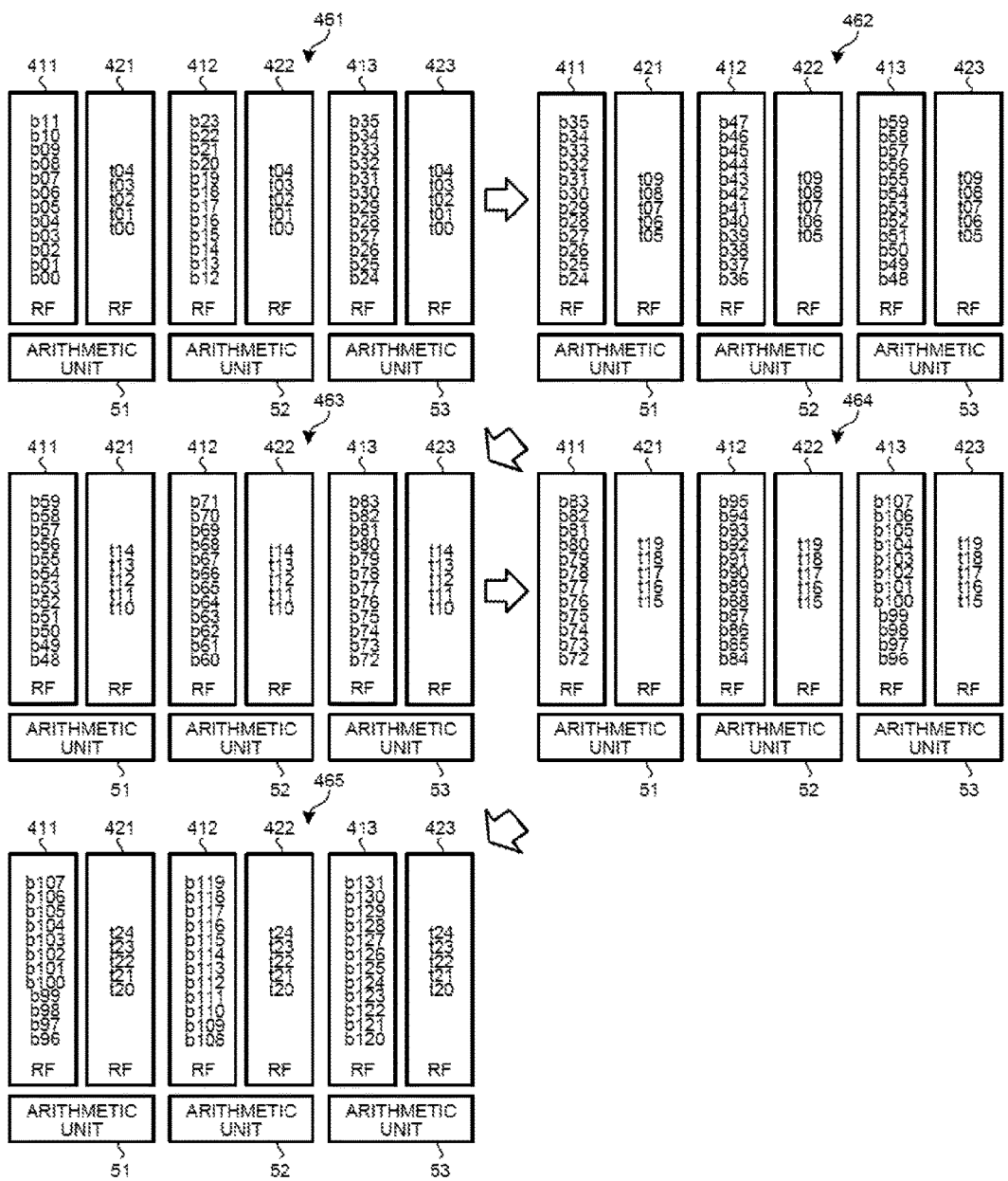
FIG. 12 is a schematic diagram illustrating the transition of element data stored when the number of strides in the convolution backward weight difference operation is 2.

Here, the transition of the element data stored in the register files 410 and 420 will be described with reference to FIGS. 11 and 12. FIG. 11 is a schematic diagram illustrating the transition of element data stored when the number of strides in the convolution backward weight difference operation is 1. Furthermore, FIG. 12 is a schematic diagram illustrating the transition of element data stored when the number of strides in the convolution backward weight difference operation is 2. In the following, a description will be given of a case in which the three arithmetic units 51 to 53 are present. In also this case, the top difference data 203 that is calculated by performing the convolution forward operation using the bottom data 201 having 12 rows and 12 columns and the weight data 202 having five rows and five columns.

If the number of strides is 1, first, as indicated by a state 451 illustrated in FIG. 11, the element data b00 to b11 is stored in the register file 411. Furthermore, the element data b12 to b23 is stored in the register file 412. Furthermore, the element data b24 to b35 is stored in the register file 413. Furthermore, the element data t00 to t07 is stored in the register files 421 to 423.

Then, if the operation indicated by the state 451 is ended, as indicated by a state 452, in the register files 411 to 413, the element data with an amount corresponding to the subsequent single row of the element data stored in the state 451 is stored. Furthermore, as indicated by the state 452, in the register files 421 to 423, the element data with an amount corresponding to the subsequent single row of the element data stored in the state 451 is stored. In this way, because the number of shifts of bottom data that is acquired in units designated by the number of kernels and that can be shifted by the number of strides of 1 in the same row is a maximum of eight, in also states 453 to 458, the element data with an amount corresponding to the subsequent single row of the element data that was stored in the previous state is sequentially stored in the register files 411 to 413 and 421 to 423.

Then, at the time of the end of the operation performed by the arithmetic units 51 to 53 in the states 451 to 458, the convolution backward weight difference operation in a case where the state of the arrangement by setting the top of the top difference data 203 to the top of the bottom data 201 is sequentially moved in the row direction is completed. However, in the operation in the states 451 to 458, the convolution backward weight difference operation that calculates w15 to w24 is not performed. Thus, to complete the whole convolution backward weight difference operation, the arithmetic processing device 1 performs the convolution backward weight difference operation by moving the top difference data 203 such that the top row is overlapped with the row of b36 to b47 while moving the top difference data 203 in the row direction.

Furthermore, if the number of strides is 2, first, as indicated by a state 461 illustrated in FIG. 12, the pieces of the element data b00 to b11 are stored in the register file 411. Furthermore, the pieces of the element data b12 to b23 are stored in the register file 412. Furthermore, the element data b24 to b35 are stored in the register file 413. Furthermore, in the register files 421 to 423, the pieces of the element data t00 to t04 in units designated by the number of kernels are stored.

Then, if the operation indicated by the state 461 is ended, as indicated by a state 462, in the register files 411 to 413, the element data that is stored in the row in the state 461 and that is present in the row ahead by an amount corresponding to the number of strides is stored. Namely, in the register file 411, the element data stored in the register file 413 in the state 461 is stored. Furthermore, as in the state 462, in the register files 421 to 423, the element data t05 to t09 in the subsequent row of the element data that was stored in the state 461 is stored.

If the number of strides is 2, because the maximum number of shifts of the bottom data 201 that are acquired in units designated by the number of kernels in the same row is five, in also states 463 to 465, the element data that was stored in the row in the immediately previous state and that is present in the row ahead by an amount corresponding to the number of strides is stored in the register files 411 to 413. Furthermore, as indicated by the states 463 to 465, in the register files 421 to 423, the element data in the subsequent row of the element data that is stored in the immediately previous state is stored.

Then, at the time of the end of the operation performed by the arithmetic units 51 to 53 in the states 461 to 465, the convolution backward weight difference operation performed on the three rows including the element data w00 to w04, w05 to w09, and w10 to w14 including the weight difference data 204 has been completed. Namely, the operation to be performed on the two rows including the element data t15 to t19 and t20 to t24 in the top difference data 203 has not been completed. Thus, to complete the whole convolution forward operation, the arithmetic processing device 1 performs the process of convolution forward operation in which the fourth and the fifth rows in the bottom data 201 are used as the top.

Figure 13:
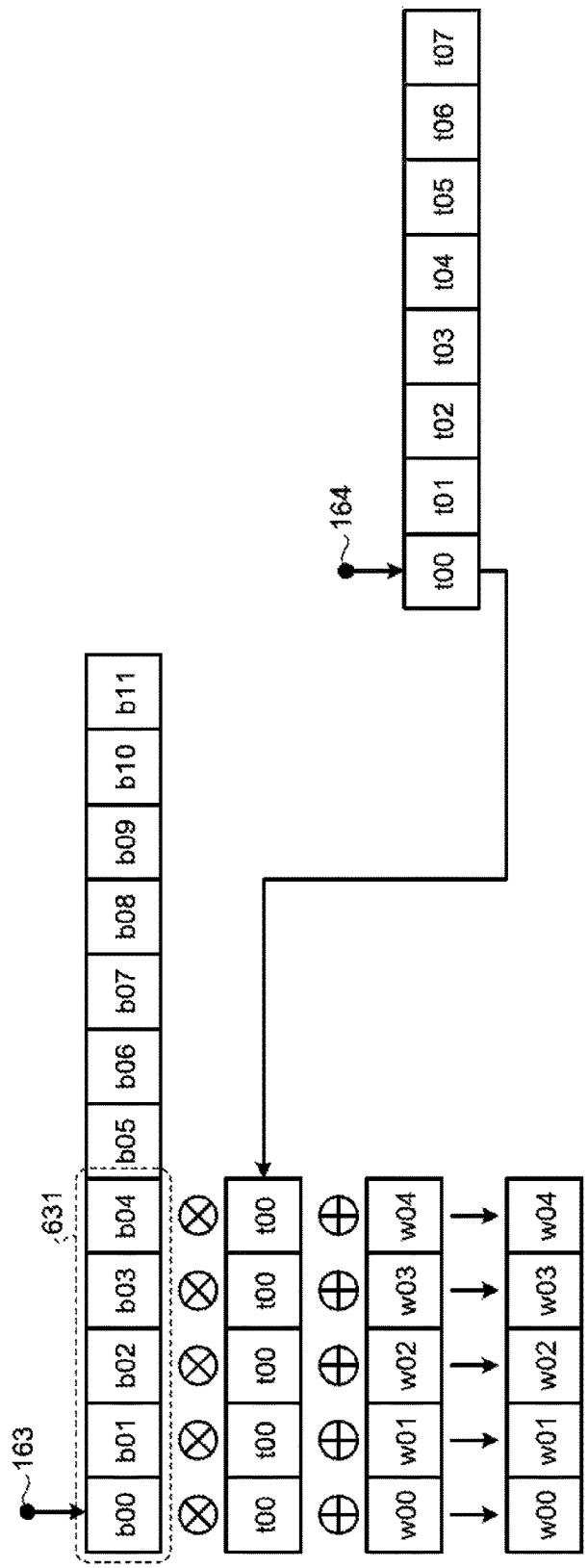
FIG. 13 is a schematic diagram illustrating a first state in the convolution backward weight difference operation.
Figure 14:
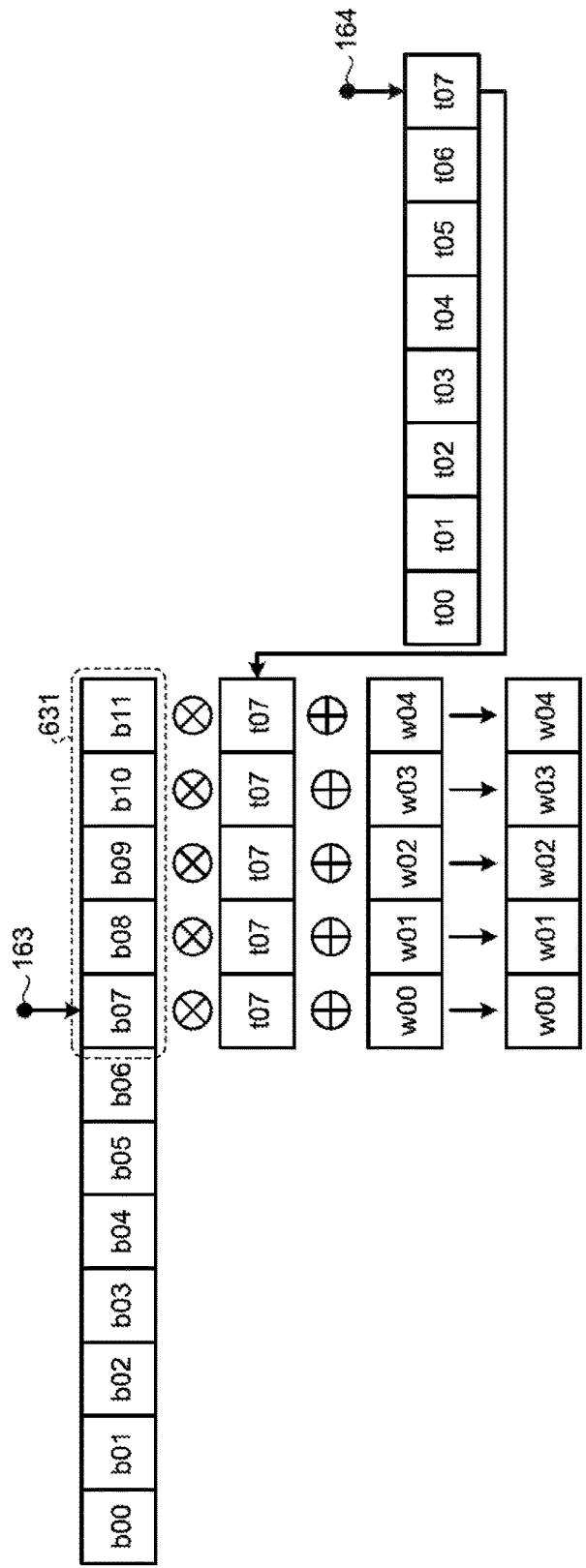
FIG. 14 is a schematic diagram illustrating the state of performing the last weight difference product-sum operation on the element data by an amount corresponding to a single row stored in the register file.
Figure 15:
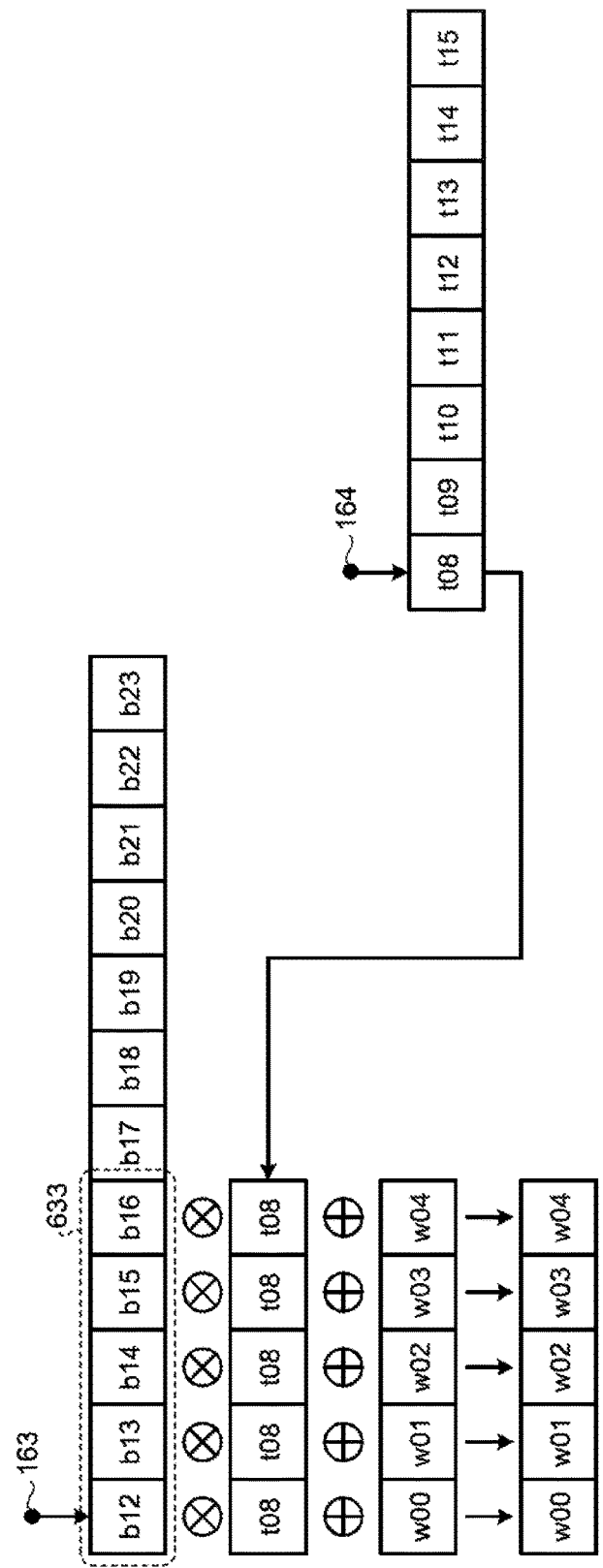
FIG. 15 is a schematic diagram illustrating the state of the element data moved to the subsequent row by an amount corresponding to the number of strides.

In the following, the weight difference product-sum operation performed by the arithmetic unit 50 will be described in detail with reference to FIGS. 13 to 15. FIG. 13 is a schematic diagram illustrating a first state in the convolution backward weight difference operation. FIG. 14 is a schematic diagram illustrating the state of performing the last weight difference product-sum operation on the element data by an amount corresponding to a single row stored in the register file. FIG. 15 is a schematic diagram illustrating the state of the element data moved to the subsequent row by an amount corresponding to the number of strides. Here, a description will be given of a case of using the bottom data 201 having 12 rows and 12 columns and the weight data 202 having five rows and five columns are used and in a case where the number of strides is 1. Namely, the top difference data 203 includes the element data t00 to t63 arranged in eight rows and eight columns.

First, when the convolution forward operation is started, the pieces of the element data b00 to b11 are stored in the register file 410. Furthermore, the pieces of the element data t00 to t07 in the top difference data 203 are stored in the register file 420.

The pointer control unit 16 sets a top pointer 163 stored in the register file 410 to the first element data b00 stored in the register file 410. Furthermore, the pointer control unit 16 sets a pointer 164 stored in the register file 420 to the top element data t00 in the top difference data 203 in the register file 420.

The arithmetic unit 50 acquires, from the position of the top pointer 163 in the register file 410, the element data b00 to b04 that is present in the portion enclosed by a dotted line 631 and the number of which corresponds to the number of kernels. Furthermore, the arithmetic unit 50 acquires the element data t00 indicated by the pointer 164 in the register file 420. Then, the arithmetic unit 50 multiplies each of the element data b00 to b04 by the element data t00. Then, the arithmetic unit 50 acquires the values of the element data w00 to w04 in the weight difference data 204 stored in the register file 430. Here, the initial value of the element data w00 to w04 is zero. Then, the arithmetic unit 50 sums each of the multiplication results and the respective values of the element data w00 to w04 stored in the register file 430 and then stores the sum results in the positions that indicate the element data w00 to w04 in the register file 430.

Thereafter, the pointer control unit 16 repeats the moving of the top pointer 163 by an amount corresponding to the number of strides seven times and obtains the state illustrated in FIG. 14. Furthermore, the pointer control unit 16 repeats the moving of the pointer 164 by one at a time seven times and obtains the state illustrated in FIG. 14.

In the state illustrated in FIG. 14, the arithmetic unit 50 acquires, from the position of the top pointer 163 in the register file 410, the pieces of the element data b07 to b11 that are present in the portion enclosed by the dotted line 631 and the number of which corresponds to the number of kernels. Furthermore, the arithmetic unit 50 acquires the element data t07 indicated by the pointer 164 in the register file 420. Then, the arithmetic unit 50 multiplies each of the element data b07 to b11 by the element data t07. Then, the arithmetic unit 50 acquires the values of the element data w00 to w04 in the weight data 202 stored in the register file 430. Then, the arithmetic unit 50 sums each of the multiplication results and the respective values of the element data w00 to w04 stored in the register file 430 and then stores the sum results in the positions that indicate the element data w00 to w04 in the register file 430.

If the weight difference product-sum operation in the state illustrated in FIG. 14 has been completed, the pieces of the element data b12 to b23 present in the subsequent row ahead by an amount corresponding to the number of strides are newly stored in the register file 410. Furthermore, the pieces of the element data t08 to t15 in the subsequent row in the top difference data 203 are stored in the register file 420.

Then, the pointer control unit 16 initializes the top pointer 161 and sets, as illustrated in FIG. 15, the top pointer 163 to the first element data b12 stored in the register file 410. Furthermore, the pointer control unit 16 initializes the pointer 164 and sets the pointer 164 to the top element data t08 stored in the top difference data 203 in the register file 430.

The arithmetic unit 50 acquires, from the position of the top pointer 163 in the register file 410, the element data b12 to b16 that is present in the portion enclosed by a dotted line 633 and the number of which corresponds to the number of kernels. Furthermore, the arithmetic unit 50 acquires the element data t08 indicated by the pointer 164 in the register file 420. Then, the arithmetic unit 50 multiplies each of the element data b12 to b16 by the element data t08. Then, the arithmetic unit 50 acquires the values of the element data w00 to w04 in the weight data 202 stored in the register file 430. Then, the arithmetic unit 50 sums the values of each of the multiplication result and the respective values of the element data w00 to w04 stored in the register file 430 and them stores the sum results in the position indicated by the element data w00 to w04 in the register file 430.

In this way, every time a single operation has been completed, the pointer control unit 16 slides the top pointer 163 from the top of the register file 410 by an amount corresponding to a single stride at a time by the number of times corresponding to the number of movements in the column direction of the bottom data 201. Thereafter, if the top pointer 163 reaches the rear end, the pointer control unit 16 initializes the top pointer 163 and returns the top pointer 163 to the top. Furthermore, every time a single operation has been completed, the pointer control unit 16 slides the pointer 164 from the top of the register file 430 by one at a time the number of times corresponding to the number of movements in the column direction of the top difference data 203. Then, if the pointer 164 reaches the rear end, the pointer control unit 16 initializes the pointer 164 and returns the pointer 164 to the top.

The arithmetic unit 50 repeats the weight difference product-sum operation by using the top pointer 163 and the pointer 164 and sequentially obtains the weight difference data 204.

Figure 16:
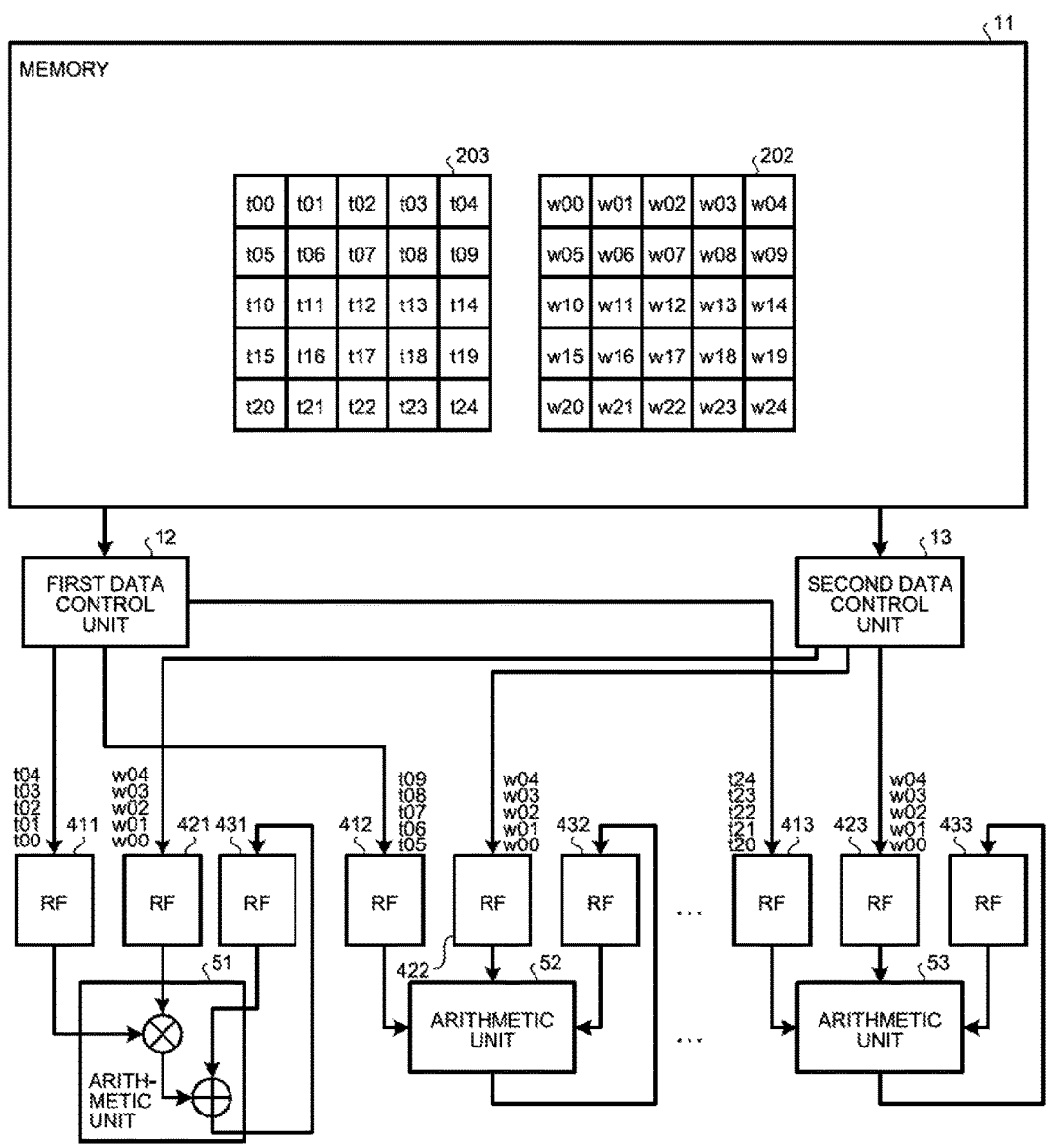
FIG. 16 is a schematic diagram illustrating the state of storing data in the register files at the time of a convolution backward bottom difference operation.

In the following, a case of performing the convolution backward bottom difference operation will be described with reference to FIG. 16. FIG. 16 is a schematic diagram illustrating the state of storing data in the register files at the time of a convolution backward bottom difference operation. In FIG. 16, the arithmetic processing device 1 uses the top difference data 203 in which the element data are arranged in five rows and five columns and uses the weight data 202 in which the element data are arranged in five rows and five columns. The weight data 202 includes the element data w00 to w24. Furthermore, the top difference data 203 is obtained when the stride is 2 by using both the bottom data 201 that has 12 rows and 12 columns and the weight data 202 and the top difference data 203 includes the element data t00 to t24.

Furthermore, in the embodiment, the arithmetic units 50 the number of which corresponds to the number of rows of the top difference data 203 are used. Consequently, the arithmetic units 50 can perform the convolution backward bottom difference operation on all of the bottom data 201 without replacing the data in the register file 410 that is used to store the top difference data (hereinafter, simply referred to as the register file 410). For example, in FIG. 16, five arithmetic units 50 are used.

The first data control unit 12 previously stores therein the size of the top difference data 203, the weight data 202, and the bottom data 201 that are used in the convolution backward weight difference operation. For example, the first data control unit 12 acquires the size (or, the number of kernels) of the weight data 202, the top difference data 203, the weight data 202, the size of the bottom data 201 based on an input of the set value that is set by using the display device and the input device.

The first data control unit 12 reads, from the memory 11, the element data with an amount corresponding to a single row from the top position in the top difference data 203. For example, the first data control unit 12 reads the data of the element data t00 to t04. Then, the first data control unit 12 stores the element data t00 to t04 in the register file 411 that is used to store the top difference data.

Furthermore, the first data control unit 12 reads, from the memory 11, the element data that in the subsequent row in the top difference data 203. For example, the first data control unit 12 reads the data of the element data t05 to t09. Then, the first data control unit 12 stores the element data t05 to t09 in the register file 412 that is used to store the top difference data.

The first data control unit 12 repeats, the number of times corresponding to the number of rows of the top difference data 203, the reading of the element data from the memory 11 for each row and the storing of the element data in the different register files 411 to 413 that are used to store the top difference data (hereinafter, simply referred to as the register files 411, 412, and 413). For example, the first data control unit 12 stores the element data b20 to b24 in the register file 413 that is used to store the top difference data.

Furthermore, the second data control unit 13 reads, from the memory 11, the element data by an amount corresponding to a single row from the top position of the weight data 202. For example, the second data control unit 13 reads the element data w00 to w04 from the memory 11. Then, the second data control unit 13 stores the element data w00 to w04 in the register files 421 to 423 that are used to store the weight data (hereinafter, simply referred to as the register files 421, 422, and 423).

The arithmetic unit 51 performs the bottom difference product-sum operation by using both the element data t00 to t04 stored in the register file 410 and the element data w00 to w04 stored in the register file 420 and calculates the temporary values of the element data w00 to w05 in the weight difference data 204. Then, the arithmetic unit 51 stores the values of the element data b01 to b23 in the bottom difference data 205 in the register file 430 that is used to store the operation results (hereinafter, simply referred to as the register file 430).

The arithmetic units 52 and 53 also perform the same bottom difference product-sum operation as that performed by the arithmetic unit 51 and stores the temporary values of element data b24 to b47, . . . , and b107 to b119 that are the operation results in the respective register files 432 and 433 that are used to store the operation results (hereinafter, simply referred to as the register files 432 and 433).

Then, the register files 411 to 413 retain the data to be held. Furthermore, pieces of the element data w05 to w09 are stored in the register files 421 to 423 by the second data control unit 13.

The arithmetic unit 51 performs the bottom difference product-sum operation by using both the element data t01 to t05 stored in the register file 411 and the element data w05 to w09 stored in the register file 421. The arithmetic unit 51 stores, in the register file 431, the values of the element data b48 to b71 in the bottom difference data 205 by sequentially adding the values in the bottom difference data 205 in the positions indicated by the pointer in the register file 431.

The arithmetic units 52 and 53 also perform the same weight difference product-sum operation as that performed by the arithmetic unit 51 and sequentially adds the operation results to the values of the register files 432 and 433. Then, the arithmetic units 51 to 53 end the bottom difference product-sum operation at the time of the operation performed in the state in which the pieces of the element data w20 to w24 that are in the last row in the weight data 202 are stored in the register file 420 and decides the value of each of the bottom difference data 205.

In this way, the first data control unit 12 sequentially stores, in the register files 411 to 413, the element data for each row from the top row of the top difference data 203. Furthermore, the second data control unit 13 sequentially stores the element data in the register files 421 to 423 while shifting a single row at a time for each operation from the top row of the top difference data 203. Then, the arithmetic units 51 to 53 end the operation after performing the operations the number of operations corresponding to the number of kernels.

Figure 17:
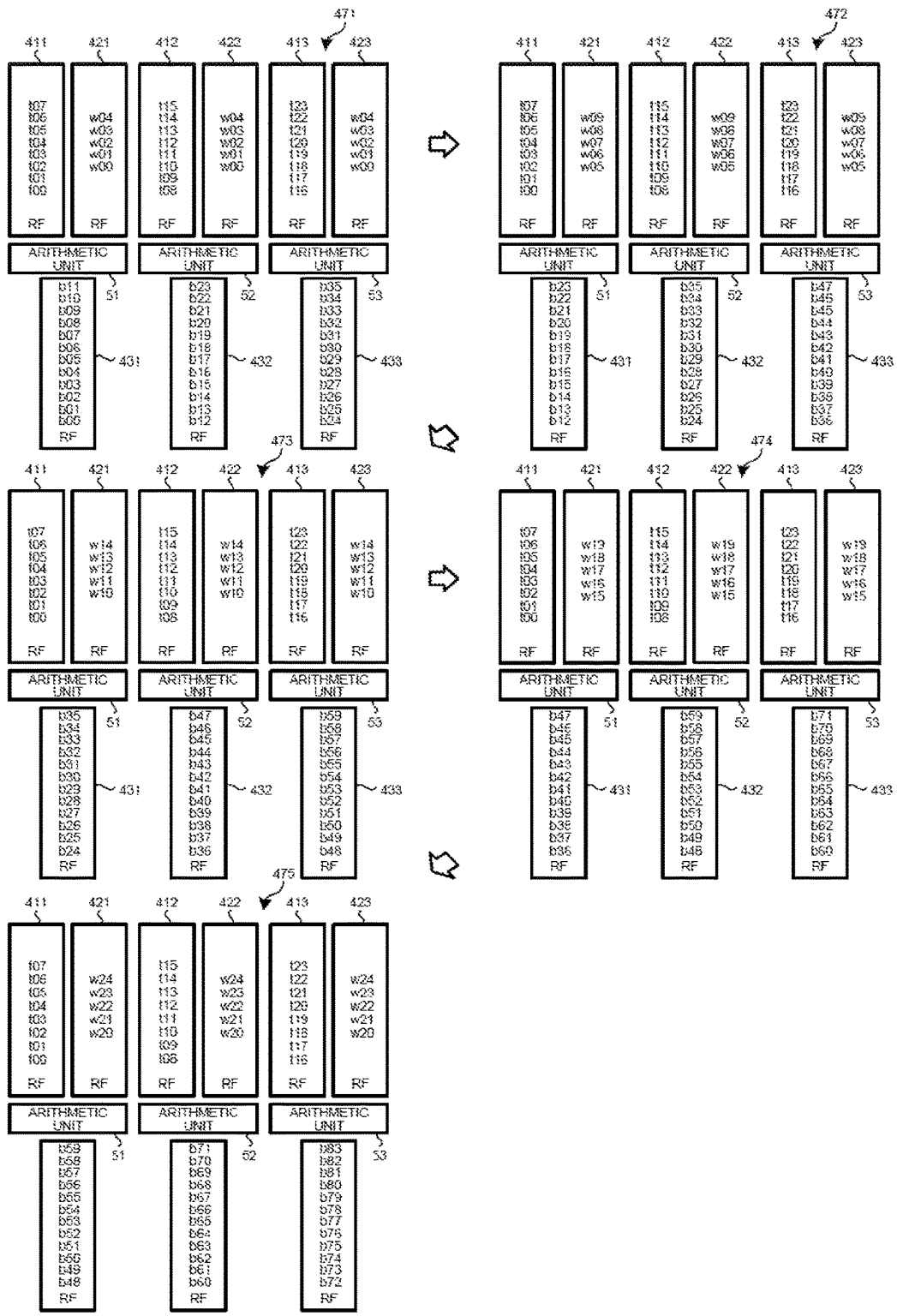
FIG. 17 is a schematic diagram illustrating the transition of element data stored when the number of strides in the convolution backward bottom difference operation is 1.
Figure 18:
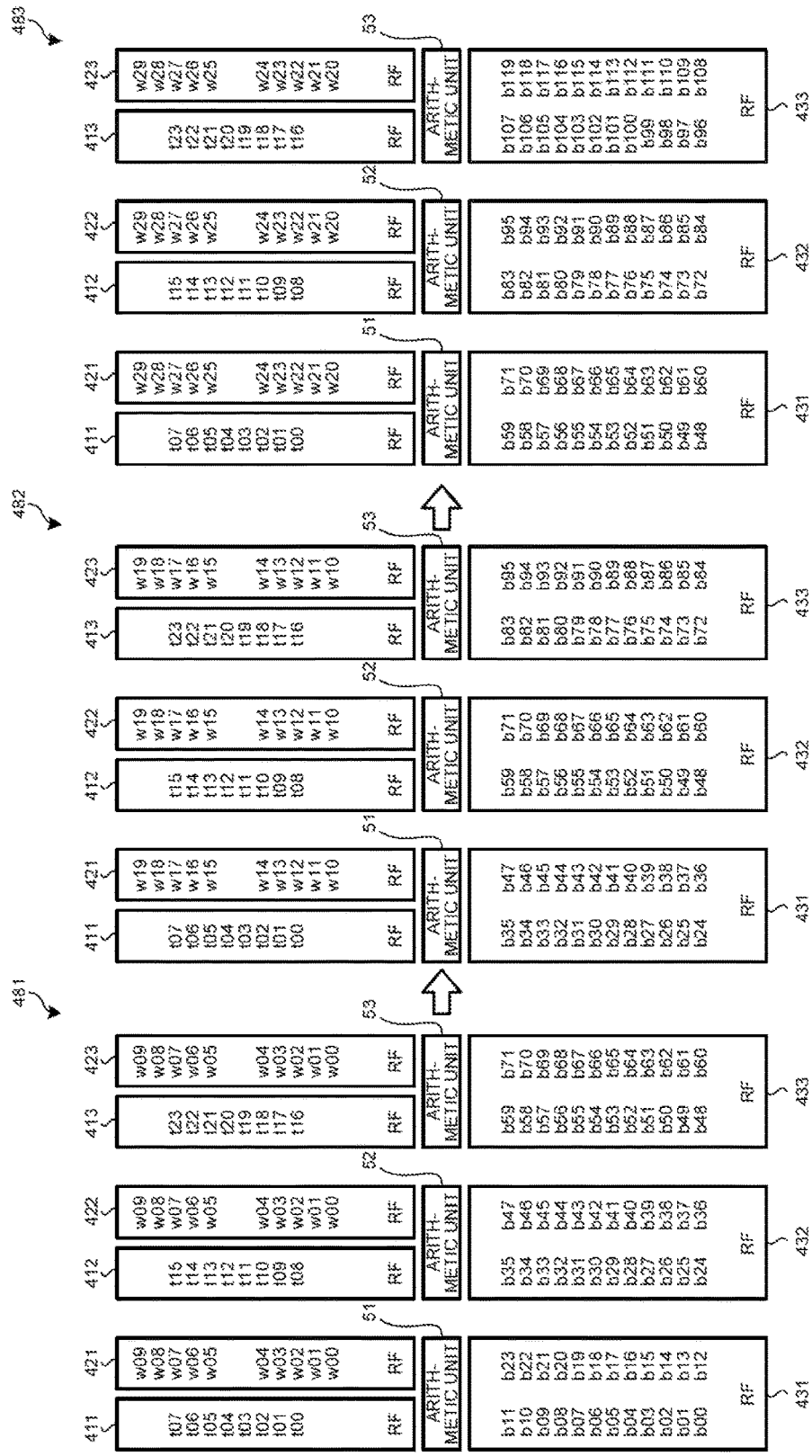
FIG. 18 is a schematic diagram illustrating the transition of element data stored when the number of strides in the convolution backward bottom difference operation is 2.

Here, the transition of the element data stored in the register files 410 and 420 will be described with reference to FIGS. 17 and 18. FIG. 17 is a schematic diagram illustrating the transition of element data stored when the number of strides in the convolution backward bottom difference operation is 1. Furthermore, FIG. 18 is a schematic diagram illustrating the transition of element data stored when the number of strides in the convolution backward bottom difference operation is 2. In the following, a description will be given of a case in which the three arithmetic units 51 to 53 are present. Furthermore, in also this case, the bottom data 201 having 12 rows and 12 columns, the weight data 202 having five rows and five columns, and the top difference data 203 that uses the bottom data 201 and the weight data 202 are used.

If the number of strides is 1, first, as indicated by a state 471 illustrated in FIG. 17, the pieces of the element data t00 to t07 are stored in the register file 411. Furthermore, the pieces of the element data t08 to t15 are stored in the register file 412. Furthermore, the pieces of the element data t16 to t23 are stored in the register file 413. Furthermore, the pieces of the element data w00 to w04 are stored in the register files 421 to 423. Because the same element data are stored in the register files 421 to 423, in FIG. 17, the register file 421 is illustrated as an example.

Then, if the operation indicated by the state 471 is ended, as indicated by a state 472, in the register files 411 to 413, the element data that was stored in the state 471 is held as it is. Furthermore, as indicated by the state 472, in the register files 421 to 423, the element data with an amount corresponding to the subsequent single row of the element data stored in the state 471 is stored. In this way, in also states 473 to 475, in the register files 411 to 413, the element data that was stored in the state 471 is held as it is. Furthermore, the element data with an amount corresponding to the subsequent single row of the element data that was stored in the previous state is sequentially stored in the register files 421 to 423.

At the time of the end of the operation performed by the arithmetic units 51 to 53 in the states 471 to 475, the convolution backward bottom difference operation is in the middle of the operation. In practice, by using the arithmetic units 50 the number of which is the same as the number of rows of the top difference data 203, if the operation is performed the number of times corresponding to the number of kernels, the convolution backward bottom difference operation is ended. Namely, if the three arithmetic units 51 to 53 are used as illustrated in FIG. 17, after the states 471 to 475, the first data control unit 12 and the second data control unit 13 perform the same remaining operations as those performed when the arithmetic units 50 the number of which is the same as the number of rows of the top difference data 203 are used.

Furthermore, if the number of strides is 2, as indicated by a state 481 illustrated in FIG. 18, the same values as those in a case where the number of strides is 1 are stored in the register file 410. Furthermore, in the register file 420, the pieces of the element data w00 to w04 and w05 to w09 are stored.

Then, the arithmetic unit 51 sequentially adds the operation results in the state 481 to the position of the element data b00 to b23 in the register file 431. Specifically, the arithmetic unit 51 sequentially adds the operation results obtained by using the element data t0 to t7 and the element data w00 to w04 to the positions of the element data b00 to b11. Furthermore, the arithmetic unit 51 sequentially adds the operation results obtained by using the element data t00 to t07 and the element data w05 to w09 to the positions of the element data b12 to b23.

Furthermore, the arithmetic unit 52 sequentially adds the operation results in the state 481 to the positions of the element data b24 to b47 in the register file 431. Specifically, the arithmetic unit 52 sequentially adds the operation results obtained by using the element data t08 to t15 and the element data w00 to w04 to the positions of the element data b24 to b35. Furthermore, the arithmetic unit 52 sequentially adds the operation results obtained by using the element data t08 to t15 and the element data w05 to w09 to the positions of the element data b36 to b47.

Furthermore, the arithmetic unit 53 sequentially adds the operation results in the state 481 to the positions of the element data b48 to b71 in the register file 433. Specifically, the arithmetic unit 51 sequentially adds the operation results obtained by using the element data t0 to t7 and the element data w00 to w04 to the positions of the element data b00 to b11. Furthermore, the arithmetic unit 51 sequentially adds the operation results obtained by using the element data t00 to t07 and the element data w05 to w09 to the positions of the element data b12 to b23.

Then, when the operation in the state 481 is ended, as indicated by a state 482, the pieces of the element data b24 to b47 in the register file 432 in the state 481 is shifted to the register file 431 at the position in which the operation results are sequentially added in the arithmetic unit 51. Furthermore, the pieces of the element data b48 to b71 in the register file 433 in the state 481 are shifted to the register file 432. Furthermore, the pieces of the element data b72 to b95 are newly stored in the register file 433. Here, the initial value of each of the element data b00 to b143 is zero.

In also the states 482 and 483, the pieces of the element data that were stored in the register file 432 in the immediately previous state are sequentially shifted to the register file 431 and the pieces of the element data that were stored in the register file 433 in the immediately previous state are sequentially shifted to the register file 432. Furthermore, in the register file 433, the pieces of the element data in the row by an amount corresponding to the number of strides are newly stored. Then, the arithmetic units 51 to 53 sequentially adds the operation results to the values of the element data associated with the register files 431 to 433 at that time.

Here, at the time of the end of the operation performed by the arithmetic units 51 to 53 in the states 481 to 483, the convolution backward bottom difference operation is in the middle of the operation. In practice, by using the arithmetic units 50 the number of which is the same as the number of rows of the top difference data 203, if the operation is performed the number of times corresponding to the number of kernels, the convolution backward bottom difference operation is ended. Namely, if the three arithmetic units 51 to 53 are used as illustrated in FIG. 18, in addition to the states 481 to 483, the arithmetic units 51 to 53, the first data control unit 12 and the second data control unit 13 perform the same remaining operations as those performed when the arithmetic units 50 the number of which is the same as the number of rows of the top difference data 203 are used.

Figure 19:
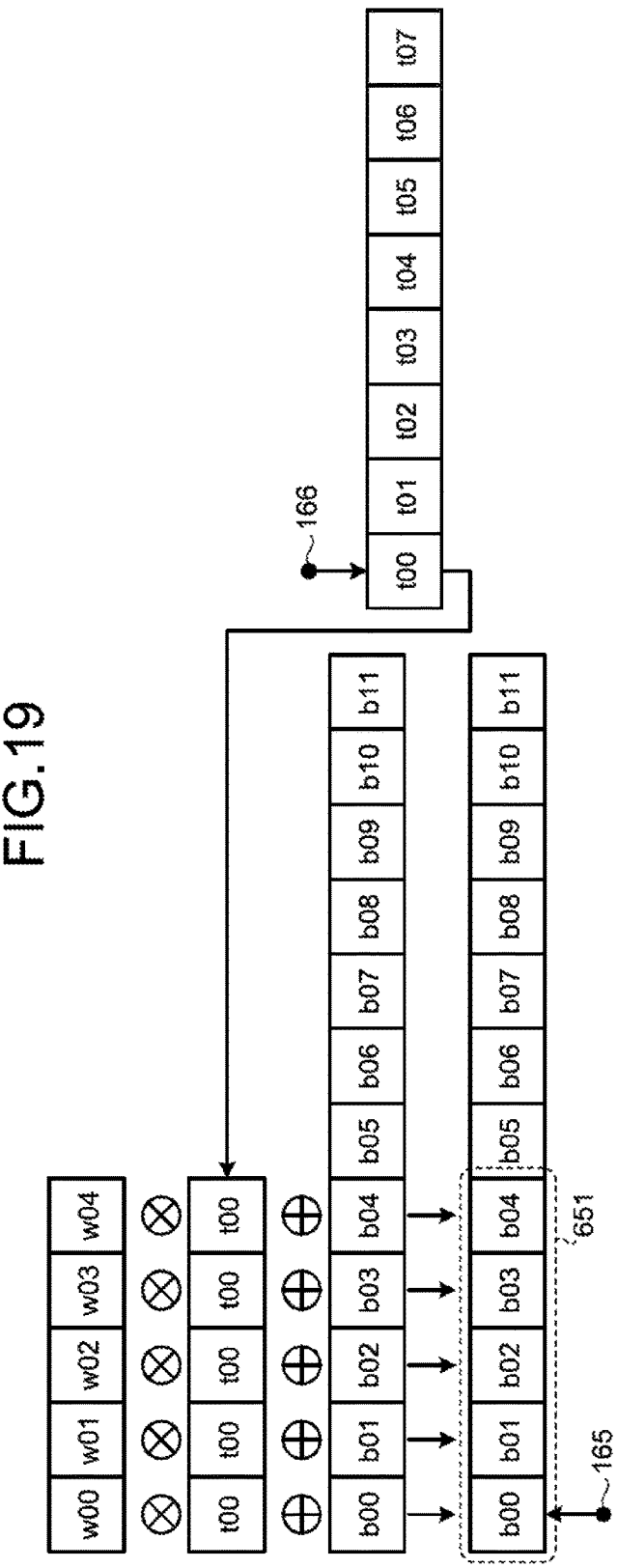
FIG. 19 is a schematic diagram illustrating a first state in the convolution backward bottom difference operation.
Figure 20:
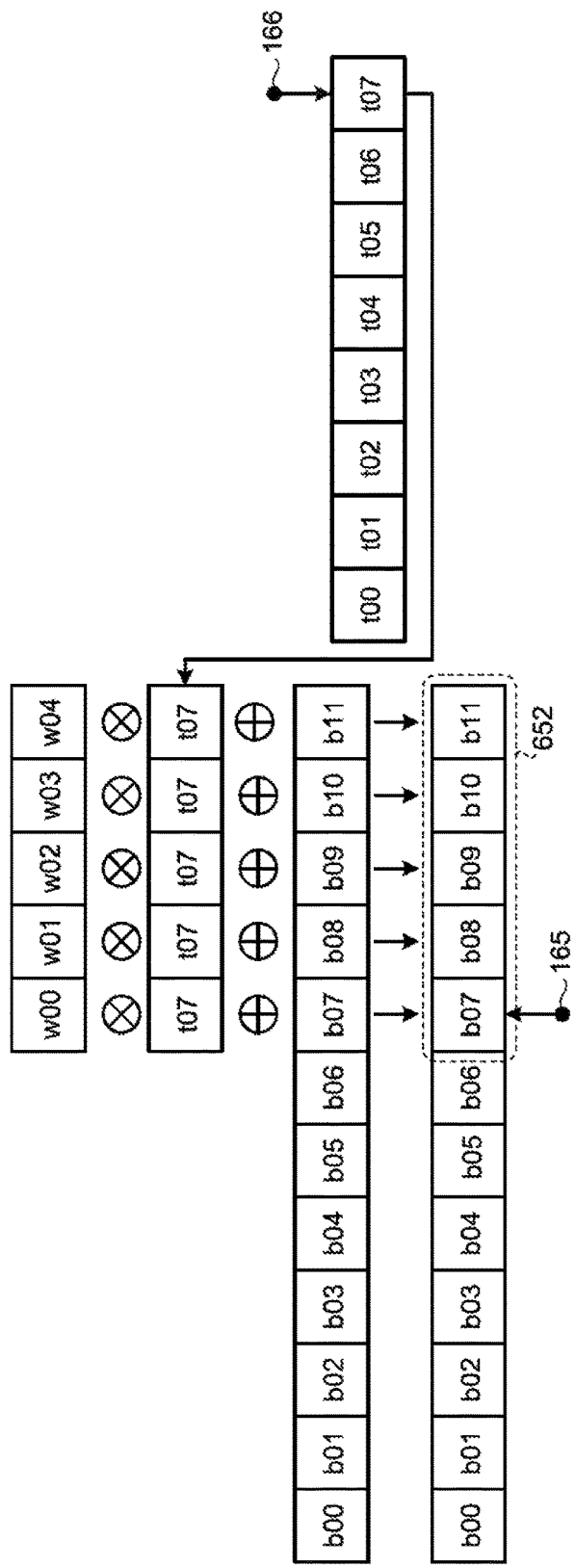
FIG. 20 is a schematic diagram illustrating the state of performing the last bottom difference product-sum operation on the bottom data by an amount corresponding to a single row.
Figure 21:
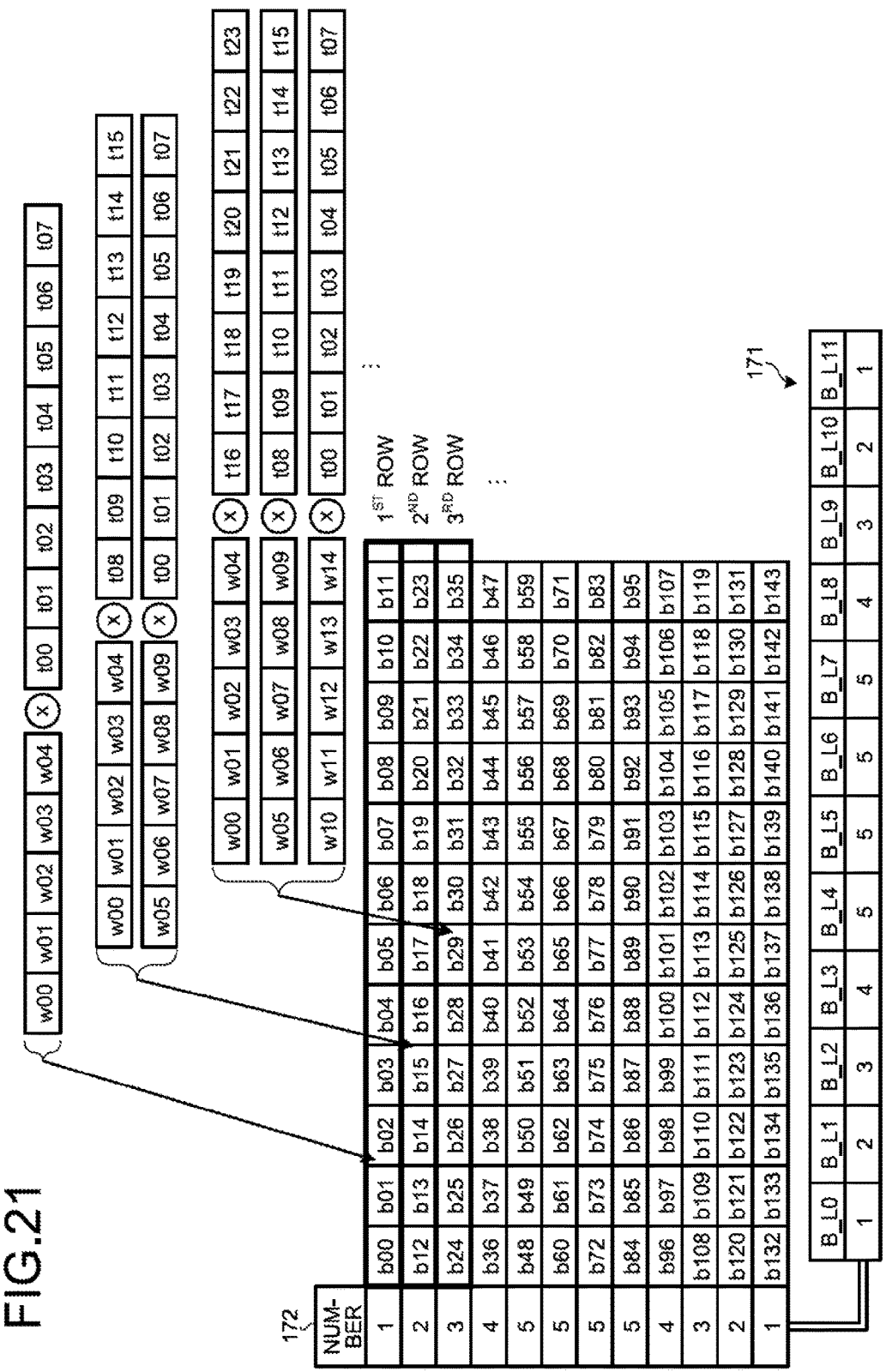
FIG. 21 is a schematic diagram illustrating the element data used in the bottom data by an amount corresponding to a single row.

In the following, the bottom difference product-sum operation performed by the arithmetic unit 50 will be described in detail with reference to FIGS. 19 to 21. FIG. 19 is a schematic diagram illustrating a first state in the convolution backward bottom difference operation. FIG. 20 is a schematic diagram illustrating the state of performing the last bottom difference product-sum operation on the bottom data by an amount corresponding to a single row. FIG. 21 is a schematic diagram illustrating the element data used in the bottom data by an amount corresponding to a single row. Here, a description will be given of a case in which the bottom data 201 and the weight data 202 are used and the number of strides is 1. Namely, the top difference data 203 includes the element data t00 to t63 arranged in eight rows and eight columns.

First, when the convolution backward bottom difference operation is started, the pieces of the element data t00 to t07 in the top difference data 203 are stored in the register file 410. Furthermore, the pieces of the element data w00 to w04 in the weight data 202 are stored in the register file 420.

The pointer control unit 16 sets a top pointer 165 stored in the register file 430 to the first element data b00 stored in the register file 430. Furthermore, the pointer control unit 16 sets the pointer 166 stored in the register file 410 to the top element data t00 in the top difference data 203 in the register file 410.

The arithmetic unit 50 acquires the element data too specified by the pointer 166 in the register file 410. Furthermore, the arithmetic unit 50 acquires the element data w00 to w04 stored in the register file 420. Furthermore, the arithmetic unit 50 acquires, from the position of the top pointer 165 in the register file 430, the pieces of the element data b00 to b04 that are present in the portion enclosed by a dotted line 651 and the number of which corresponds to the number of kernels. Here, the initial value of the element data b00 to b04 is zero. Then, the arithmetic unit 50 multiplies each of the element data w00 to w04 by the element data t00. Then, the arithmetic unit 50 adds the multiplication results to the respective values of the element data b00 to b04 in the register file 430 and stores the obtained values in the positions indicated by the element data b00 to b04 in the register file 430.

Thereafter, the pointer control unit 16 repeats the moving of the top pointer 165 by an amount corresponding to the number of strides seven times and obtains the state illustrated in FIG. 20. Furthermore, the pointer control unit 16 repeats the moving of a pointer 166 by one at a time seven times and obtains the state illustrated in FIG. 20.

In the state illustrated in FIG. 20, the arithmetic unit 50 acquires the element data t07 indicated by the pointer 166 in the register file 410. Furthermore, the arithmetic unit 50 acquires the element data w00 to w04 stored in the register file 420. Furthermore, the arithmetic unit 50 acquires, from the position of the top pointer 165 in the register file 430, the pieces of the element data b07 to b11 that are present in the portion enclosed by a dotted line 652 and the number of which corresponds to the number of kernels. Here, the initial value of the element data b07 to b11 is zero. Then, the arithmetic unit 50 multiplies each of the element data w00 to w04 by the element data t07. Then, the arithmetic unit 50 adds the multiplication results to the associated values of the element data b07 to b11 in the register file 430 and stores the added values in the positions that indicate the element data b07 to b11 in the register file 430.

If the bottom difference product-sum operation in the state illustrated in FIG. 20 has been completed, the pieces of the element data w05 to w09 in the subsequent row are newly stored in the register file 420.

Then, the pointer control unit 16 initializes the top pointer 165 and sets the top pointer 163 to the first element data b12 stored in the register file 430. Furthermore, the pointer control unit 16 initializes the pointer 166 and sets the pointer 166 to the top element data t00 in the top difference data 203 in the register file 410. Then, the arithmetic unit 50 repeats the same bottom difference operation and sequentially adds the operation results to the position that stores therein the element data and that is specified by the top pointer 165.

In this way, every time a single operation has been completed, the pointer control unit 16 slides the top pointer 165 from the top of the register file 430 by an amount corresponding to the number of strides at a time the number of times corresponding to the number of movements in the column direction of the bottom difference data 205. Furthermore, every time a single operation has been completed, the pointer control unit 16 slides the pointer 166 from the top of the register file 410 by one at a time the number of times corresponding to the maximum number of movements. Then, if the pointer 166 reaches the rear end, the pointer control unit 16 initializes the pointer 166 and returns the pointer 166 to the top.

The arithmetic unit 50 repeats the bottom difference product-sum operation by using the top pointer 165 and the pointer 166 and sequentially obtains the bottom difference data 205.

When the arithmetic unit 50 obtains a single row of the bottom difference data 205, the number of rows of the weight data 202 and the top difference data 203 used for each row and column is different.

FIG. 21 is an example of a case of calculating the top single row of the bottom difference data. When calculating the element data b00 to b11 in the bottom difference data 205, the operation results that are obtained by using the element data 00 to w04 and the element data t00 to t07 and that correspond to a single row are used. Furthermore, for the calculation of the values of the element data b12 to b23 in the bottom difference data 205, the operation results, which are obtained by using the element data 00 to w04 and the element data t08 to t15 and correspond to a single row, and the operation results, which are obtained by using the element data 05 to w09 and the element data t00 to t07 and corresponds to a single row, are used. Furthermore, for the calculation of the values of the element data b24 to 35 in the bottom difference data 205, the operation results corresponding to the three rows illustrated in FIG. 21 are used. The numerals illustrated in a field 172 that is the top column of each row of the bottom difference data 205 illustrated in FIG. 21 is the number of rows used to calculate the element data in the subject row. Here, the respective columns of the bottom difference data 205 are represented by B_L0 to B_L11. Furthermore, the sums of the number of rows that are used to calculate the element data in each of the columns are represented by a table 171. In this way, the number of rows that are used to calculate the element data from the top of the row in the direction of the row is increased once and then decreased toward the rear end.

Figure 22:
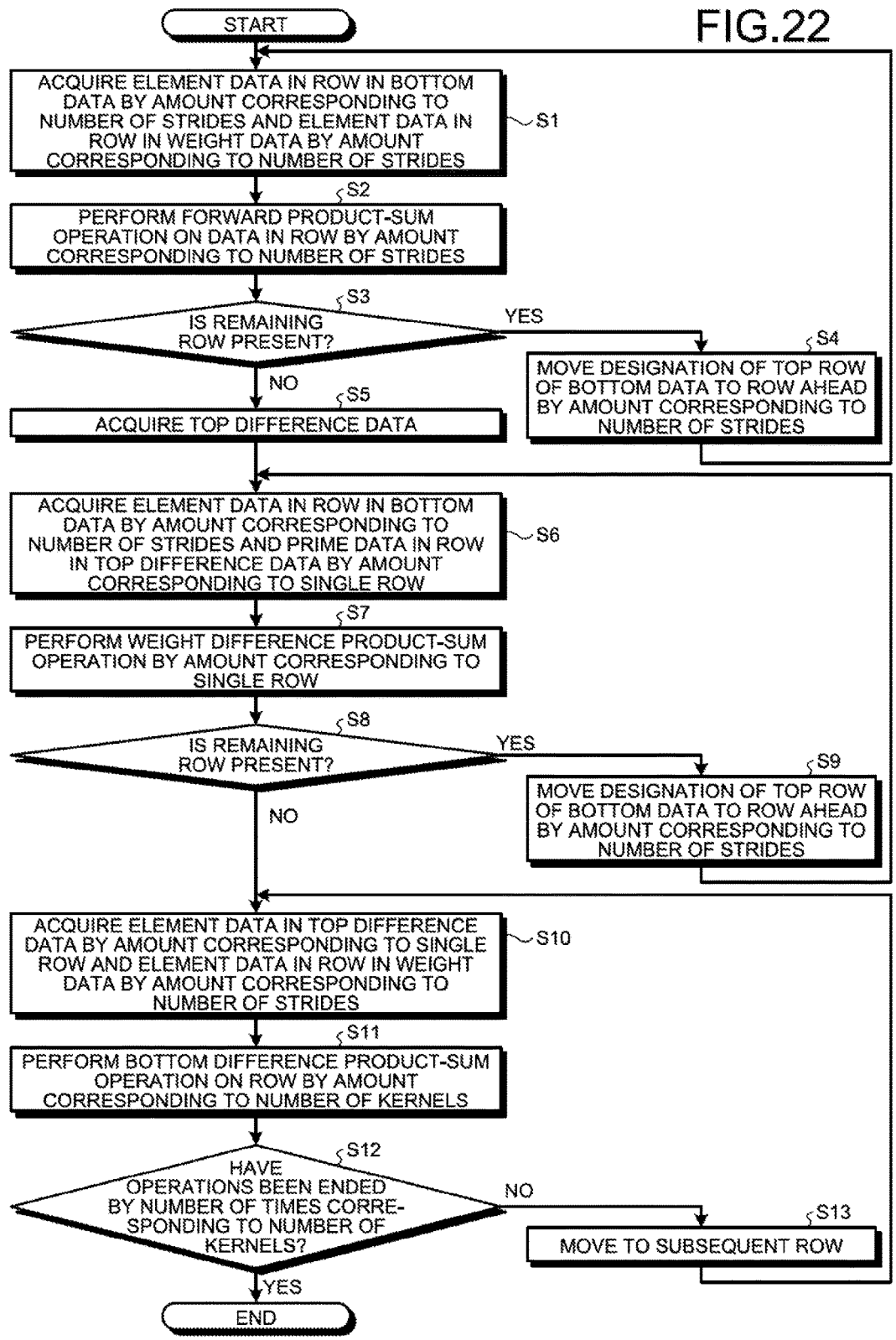
FIG. 22 is a flowchart illustrating the flow of a deep learning process.

In the following, the flow of the overall process of the deep learning performed by using the convolution forward operation and the convolution backward operation will be described with reference to FIG. 22. FIG. 22 is a flowchart illustrating the flow of a deep learning process.

For example, if a description will be given by using the configuration with the reference numerals illustrated in FIG. 4 or the like, the first data control unit 12 acquires, from the designated top row, the element data in the row in the bottom data 201 by an amount corresponding to the number of strides. Furthermore, the second data control unit 13 acquires, from the designated top row, the element data in the row in the weight data 202 by an amount corresponding to the number of strides (Step S1). Then, the first data control unit 12 stores the acquired element data in the register file 410. Furthermore, the second data control unit 13 stores the acquired element data in the register file 420.

The arithmetic unit 50 uses the element data stored in the register files 410 and 420 and performs the forward product-sum operation on the bottom data 201 in the row by an amount corresponding to the number of strides (Step S2).

The arithmetic unit 50 determines whether a remaining row in which the operation has not been performed on the bottom data 201 is present (Step S3). If the remaining row is present (Yes at Step S3), the first data control unit 12 and the second data control unit 13 move the designation of the top row of the bottom data 201 to the row ahead by an amount corresponding to the number of strides (Step S4).

In contrast, the remaining row is not present (No at Step S3), the arithmetic unit 50 ends the calculation of the output data 206. Then, the arithmetic unit 50 acquires the top difference data 203 (Step S5). Here, if the layer is the last layer, the arithmetic unit 50 acquires the top difference data 203 by obtaining a difference between the calculated output data 206 and the expected value 207. Furthermore, if the layer is the other layer, the arithmetic unit 50 acquires the bottom difference data 205 calculated in the immediately subsequent layer as the top difference data 203 in the own layer.

Then, the first data control unit 12 acquires the element data in the row in the bottom data 201 by an amount corresponding to the number of strides from the designated top row. Furthermore, the second data control unit 13 acquires the element data in the top difference data 203 by an amount corresponding to a single row from the designated top row (Step S6). Then, the first data control unit 12 stores the acquired element data in the register file 410. Furthermore, the second data control unit 13 stores the acquired element data in the register file 420.

The arithmetic unit 50 uses the element data stored in the register files 410 and 420 and perform the weight difference product-sum operation on the bottom data 201 by an amount corresponding to a single row (Step S7).

The arithmetic unit 50 determines whether a remaining row in which the operation has not been performed on the bottom data 201 is present (Step S8). If the remaining row is present (Yes at Step S8), the first data control unit 12 moves the designation of the top row of the bottom data 201 to the row ahead by an amount corresponding to the number of strides (Step S9).

In contrast, the remaining row is not present (No at Step S8), the first data control unit 12 acquires the element data in the top difference data 203 from the designated top row by an amount corresponding to a single row. Furthermore, the second data control unit 13 acquires the element data in the row in the weight data 202 from the designated top row by an amount corresponding to the number of strides (Step S10). Then, the first data control unit 12 stores the acquired element data in the register file 410. Furthermore, the second data control unit 13 stores the acquired element data in the register file 420.

The arithmetic unit 50 uses the element data stored in the register files 410 and 420 and perform the bottom difference product-sum operation on the top difference data 203 by an amount corresponding to a single row (Step S11).

The arithmetic unit 50 determines whether the operations have been ended the number of times corresponding to the number of kernels (Step S12). If the operations have not been ended the number of times corresponding to the number of kernels (No at Step S12), the first data control unit 12 moves the designation of the top row of the top difference data 203 to the immediately subsequent row (Step S13).

In contrast, if the operations performed the number of times corresponding to the number of kernels are ended (Yes at Step S12), the arithmetic unit 50 ends the convolution feedback operation, the convolution backward weight difference operation, and the bottom difference operation.

Figure 23:
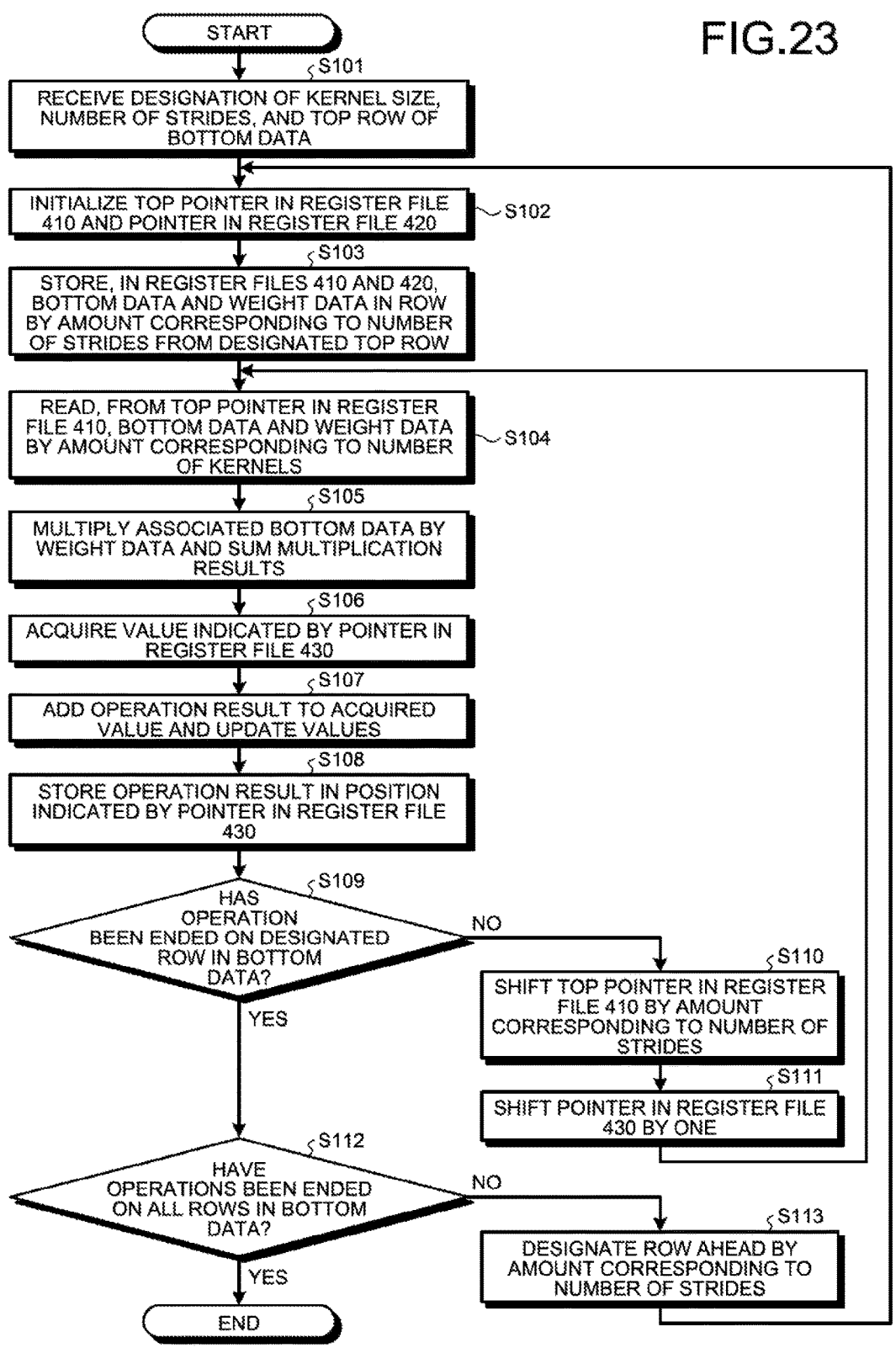
FIG. 23 is a flowchart illustrating the flow of the convolution forward operation process.

In the following, the flow of the convolution forward operation process will be described in detail with reference to FIG. 23. FIG. 23 is a flowchart illustrating the flow of the convolution forward operation process. Here, the convolution feedback arithmetic operation process indicated by the flowchart illustrated in FIG. 23 corresponds to an example of the process, in detail, at Steps S1 to S4 illustrated in FIG. 22.

For example, if a description will be given by using the configuration with the reference numerals illustrated in FIG. 4, the first data control unit 12, the second data control unit 13, the arithmetic unit 50, and the pointer control unit 16 receives the designation of the kernel size (or the number of kernels), the number of strides, and the top row of the bottom data 201 (Step S101).

The pointer control unit 16 initializes the top pointer 161 that is in the register file 410 and that is used to store the bottom data (hereinafter, simply referred to as the register file 410) and the pointer 162 that is in the register file 420 and that is used to store the weight data (hereinafter, simply referred to as the register file 420) (Step S102).

The first data control unit 12 reads, from the memory 11, the element data in the row in the bottom data 201 by an amount corresponding to the number of strides from the designated top row and stores the read element data in the register file 410. Furthermore, the second data control unit 13 reads, from the memory 11, the element data in the row in the bottom data 201 by an amount corresponding to the number of strides from the designated top row and stores the read element data in the register file 420 (Step S103).

The arithmetic unit 50 reads the element data in the bottom data 201 by an amount corresponding to the number of kernels from the top pointer 161 in the register file 410.

Furthermore, the arithmetic unit 50 reads the element data in the weight data 202 from the register file 420 (Step S104).

The arithmetic unit 50 multiplies the associated element data in the bottom data 201 by the element data in the weight data 202 and sums the multiplication results (Step S105).

Then, the arithmetic unit 50 acquires the value indicated by the pointer 162 in the register file 430 that is used to store the operation results (hereinafter, simply referred to as the register file 430) (Step S106).

Then, the arithmetic unit 50 adds the operation result to the acquired value and updates the value (Step S107).

Then, the arithmetic unit 50 stores the addition result in the position indicated by the pointer 162 in the register file 430 that is used to store the operation results (hereinafter, simply referred to as the register file 430) and updates the value indicated by the pointer 162 (Step S108).

Then, the arithmetic unit 50 determines whether the operation to be performed on the designated row in the bottom data 201 has been ended (Step S109). Here, the designated row is the row corresponding to the number of strides from the designated top row.

If the operation to be performed on the designated row in the bottom data 201 has not been ended (No at Step S109), the pointer control unit 16 shifts the top pointer in the register file 410 by an amount corresponding to the number of strides (Step S110).

Furthermore, the pointer control unit 16 shifts the pointer 162 in the register file 430 by one (Step S111). Then, the process returns to Step S104.

In contrast, if the operation to be performed on the designated row in the bottom data 201 has been ended (Yes at Step S109), the arithmetic unit 50 determines whether the operations have been ended on all of the rows in the bottom data 201 (Step S112).

If there is a row in which the operation has not been performed (No at Step S112), the arithmetic unit 50 notifies the first data control unit 12 and the second data control unit 13 the completion of the row portion operation. The first data control unit 12 and the second data control unit 13 designate, as the top row, the row ahead by an amount corresponding to the number of strides from the current top row of each of the bottom data 201 and the weight data 202 (Step S113).

In contrast, if the operation has been ended on all of the rows in the bottom data 201 (Yes at Step S112), the arithmetic unit 50 ends the convolution feedback arithmetic operation process.

Figure 24:
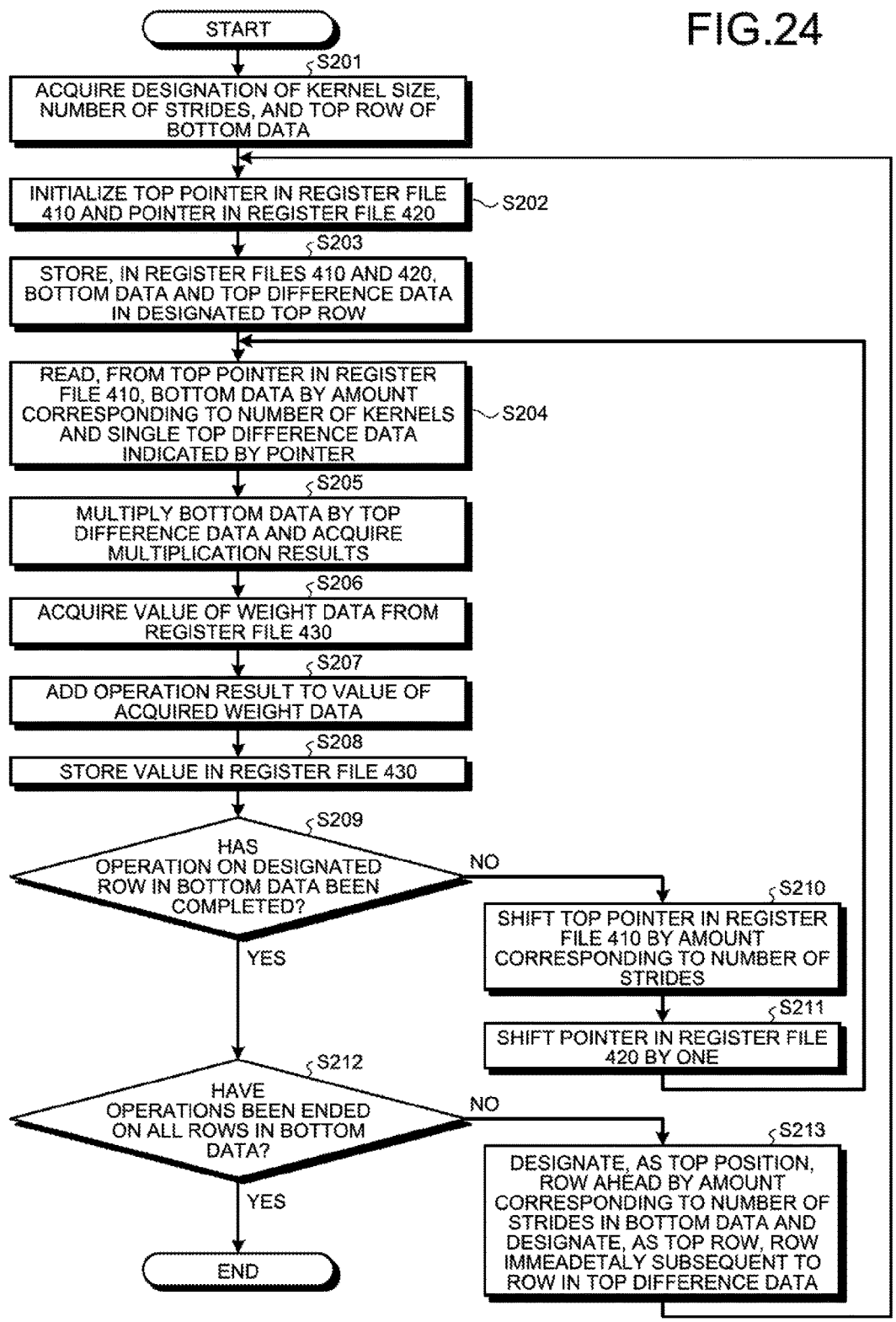
FIG. 24 is a flowchart illustrating the flow of the convolution backward weight difference arithmetic operation process.

In the following, the flow of the convolution backward weight difference arithmetic operation process will be described in detail with reference to FIG. 24. FIG. 24 is a flowchart illustrating the flow of the convolution backward weight difference arithmetic operation process. Here, the convolution backward weight difference arithmetic operation process indicated by the flowchart illustrated in FIG. 24 corresponds to an example of the process in detail at Steps S5 to S9 illustrated in FIG. 22.

For example, if a description will be given by using the configuration with the reference numerals illustrated in FIG. 10, the first data control unit 12, the second data control unit 13, the arithmetic unit 50, and the pointer control unit 16 acquire the designation of the kernel size (or the number of kernels), the number of strides, and the top row of the bottom data 201 (Step S201).

The pointer control unit 16 initializes the top pointer 163 in the register file 410 that is used to store the bottom data (hereinafter, simply referred to as the register file 410) and the pointer 164 in the register file 420 that is used to store the top difference data (hereinafter, simply referred to as the register file 420) (Step S202).

The first data control unit 12 reads the element data in the designated top row in the bottom data 201 from the memory 11 and stores the read element data in the register file 410. Furthermore, the second data control unit 13 reads the element data in the designated top row of the top difference data 203 from the memory 11 and stores the read element data in the register file 420 (Step S203).

The arithmetic unit 50 reads the element data in the bottom data 201 by an amount corresponding to the number of kernels from the top pointer 163 in the register file 410. Furthermore, the arithmetic unit 50 reads the single element data in the top difference data 203 indicated by the pointer 164 in the register file 420 (Step S204).

Then, the arithmetic unit 50 multiplies the respective pieces of the top difference data 203 by the pieces of the read element data in the bottom data 201 and acquires the multiplication results (Step S205).

Then, the arithmetic unit 50 determines whether the first row in which the operation is to be performed corresponds to which number of the row from the top of the bottom data 201. Then, the arithmetic unit 50 decides to store, in the register file 430 that is used to store the operation results (hereinafter, simply referred to as the register file 430), the values of the element data in the same rows as those in the weight data 202 from the top. Then, the arithmetic unit 50 stores zero as the initial value of the weight data 202. Then, the arithmetic unit 50 acquires the value of the weight data 202 from the register file 430 (Step S206).

Then, in the order from the top of the acquired element data in the weight data 202, the arithmetic unit 50 sequentially associates the operation results aligned in the order of the element data in the bottom data 201 used for the addition and then adds the associated values (Step S207).

Then, the arithmetic unit 50 again stores the added values in the positions in which the pieces of the element data that are used for the addition in the register file 430 were stored and then updates the element data (Step S208).

Then, the arithmetic unit 50 determines whether the operation performed on the designated row in the bottom data 201 has been completed (Step S209).

If the operation performed on the designated row in the bottom data 201 has not been completed (No at Step S209), the pointer control unit 16 shifts the top pointer 163 in the register file 410 by an amount corresponding to the number of strides (Step S210).

Furthermore, the pointer control unit 16 shifts the pointer 164 in the register file 420 by one (Step S211). Then, the process returns to Step S204.

In contrast, if the operation to be performed on the designated row in the bottom data 201 has been completed (Yes at Step S209), the arithmetic unit 50 determines whether the operations have been ended on all of the rows in the bottom data 201 (Step S212).

If there is a row in which the operation has not been performed (No at Step S212), the arithmetic unit 50 notifies the first data control unit 12 and the second data control unit 13 of the completion of the row portion operation. The first data control unit 12 designates, as the top row, the row ahead by an amount corresponding to the number of strides from the current top row of the bottom data 201. Furthermore, the second data control unit 13 designates, as the top row, the row immediately subsequent to the current top row of the top difference data 203 (Step S213).

In contrast, if the operation has been ended on all of the rows in the bottom data 201 (Yes at Step S212), the arithmetic unit 50 ends the convolution backward weight difference arithmetic operation process.

Figure 25:
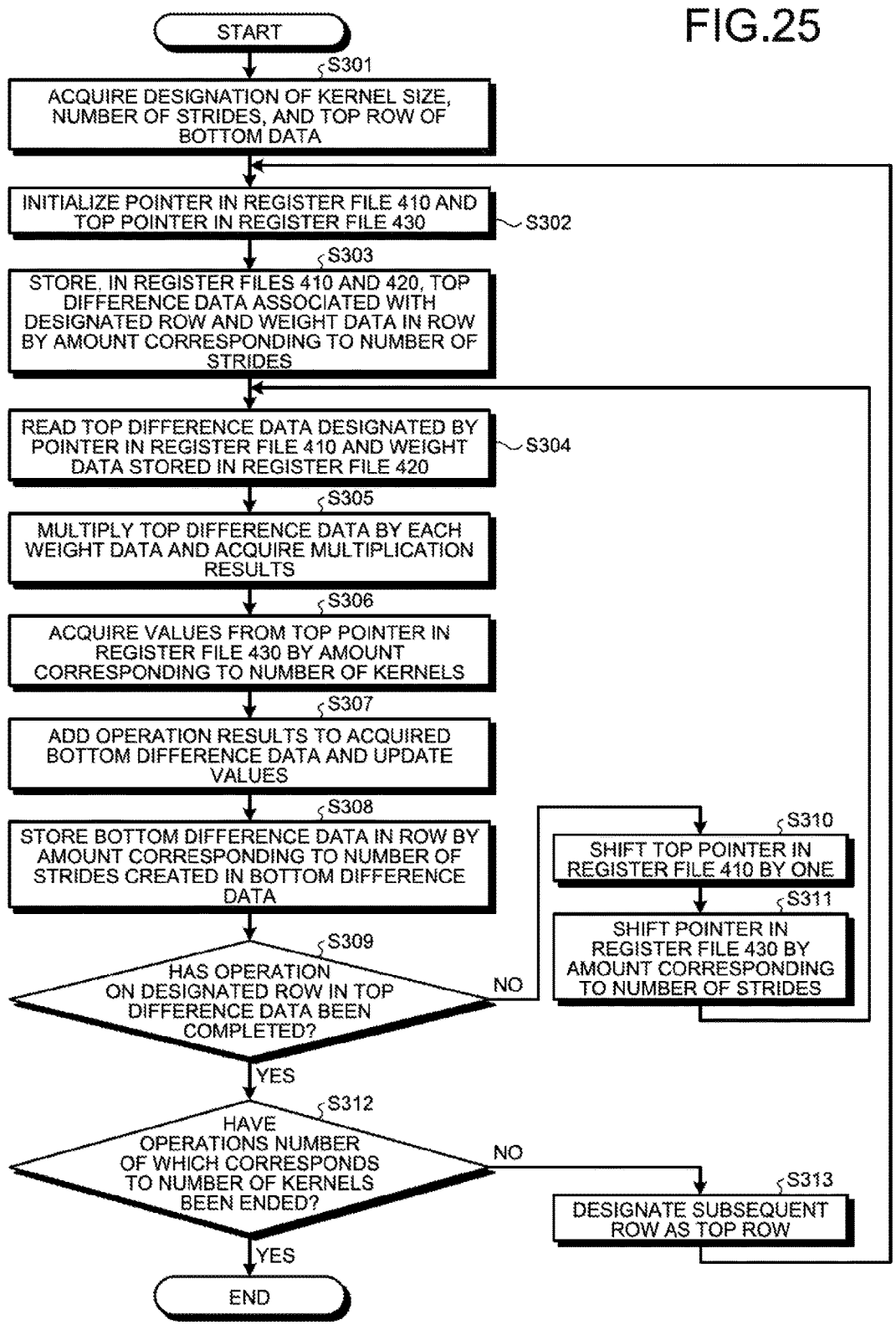
FIG. 25 is a flowchart illustrating the flow of the convolution backward bottom difference arithmetic operation process.

In the following, the flow of the convolution backward bottom difference arithmetic operation process will be described in detail with reference to FIG. 25. FIG. 25 is a flowchart illustrating the flow of the convolution backward bottom difference arithmetic operation process. Here, the convolution backward bottom difference arithmetic operation process indicated by the flowchart illustrated in FIG. 25 corresponds to an example of the processes in detail at Steps S10 to S12 illustrated in FIG. 22.

For example, if a description will be given by using the configuration with the reference numerals illustrated in FIG. 16, the first data control unit 12, the second data control unit 13, the arithmetic unit 50, and the pointer control unit 16 acquires the kernel size (or the number of kernels), the number of strides, and the designation of the top row of the bottom data 201 (Step S301).

The pointer control unit 16 initializes the pointer 166 in the register file 410 and the top pointer 165 in the register file 430 (Step S302).

The first data control unit 12 reads the element data in the designated top row of the top difference data 203 from the memory 11 and stores the read element data in the register file 410. Furthermore, the second data control unit 13 reads the element data in the weight data 202 from the designated top row by an amount corresponding to the number of strides from the memory 11 and stores the read element data in the register file 420 (Step S303).

The arithmetic unit 50 reads the element data in the top difference data 203 designated by the pointer 166 in the register file 410. Furthermore, the arithmetic unit 50 reads the element data in the weight difference data 204 stored in the register file 420 (Step S304).

Then, the arithmetic unit 50 multiplies each of the read element data in the weight difference data 204 by the top difference data 203 and acquires the multiplication results (Step S305).

Then, the arithmetic unit 50 acquires the values of the element data in the bottom difference data 205 from the positions indicated by the top pointer 165 in the register file 430 by an amount corresponding to the number of kernels (Step S306).

Then, in the order from the top of the acquired bottom difference data 205, the arithmetic unit 50 sequentially associates the operation results that are aligned in the order of the pieces of the element data in the used weight data 202 and then adds the associated values (Step S307). At this time, the operation results the number of which corresponds to the number of strides in the bottom difference data 205 are created in the rows.

Then, the arithmetic unit 50 performs an update by storing the pieces of the bottom difference data 205, which are the addition results, in the row by an amount corresponding to the number of strides in the bottom difference data 205 in the positions in which the pieces of the element data that are used for the addition in the register file 430 were stored (Step S308).

Then, the arithmetic unit 50 determines whether the operations have been completed on the designated row in the top difference data 203 (Step S309).

If the operation to be performed on the designated row in the top difference data 203 has not been completed (No at Step S309), the pointer control unit 16 shifts the top pointer 166 in the register file 410 by one (Step S310).

Furthermore, the pointer control unit 16 shifts the top pointer 165 in the register file 430 by an amount corresponding to the number of strides (Step S311). Then, the process returns to Step S304.

In contrast, If the operation to be performed on the designated row in the top difference data 203 has been completed (Yes at Step S309), the arithmetic unit 50 determines whether the operations the number of which corresponds to the number of kernels have been ended (Step S312).

If the operations the number of which corresponds to the number of kernels have been ended have not been performed (No at Step S312), the arithmetic unit 50 notifies the first data control unit 12 and the second data control unit 13 of the completion of the row portion operation. The first data control unit 12 designates, as the top row, the row subsequent to the current top row in the bottom data 201. Furthermore, the second data control unit 13 designates, as the top row, the row subsequent to the current top row of the top difference data 203 (Step S313).

In contrast, if the operations the number of which corresponds to the number of kernels have been ended (Yes at Step S312), the arithmetic unit 50 ends the convolution backward bottom difference arithmetic operation process.

As described above, the arithmetic processing device according to the embodiment correctively performs, for each row, the operation on the pieces of data that are arranged in a matrix used for the operation and performs the operation on the pieces of the data that are arranged in a matrix by using the operation results thereof. Furthermore, because each of the arithmetic units performs the operation in different rows, the data is not used at the same time. Thus, it is possible to avoid the conflict at the time of reading data and, furthermore, there is no need to hold duplication of the data. Furthermore, because the operation is performed while shifting the row to be used, it is possible to reduce the number of times the same row is used and thus it is possible to efficiently use input data. Consequently, it is possible to speed up the arithmetic operation process while suppressing an increase in cost.

[b] Second Embodiment

Figure 26:
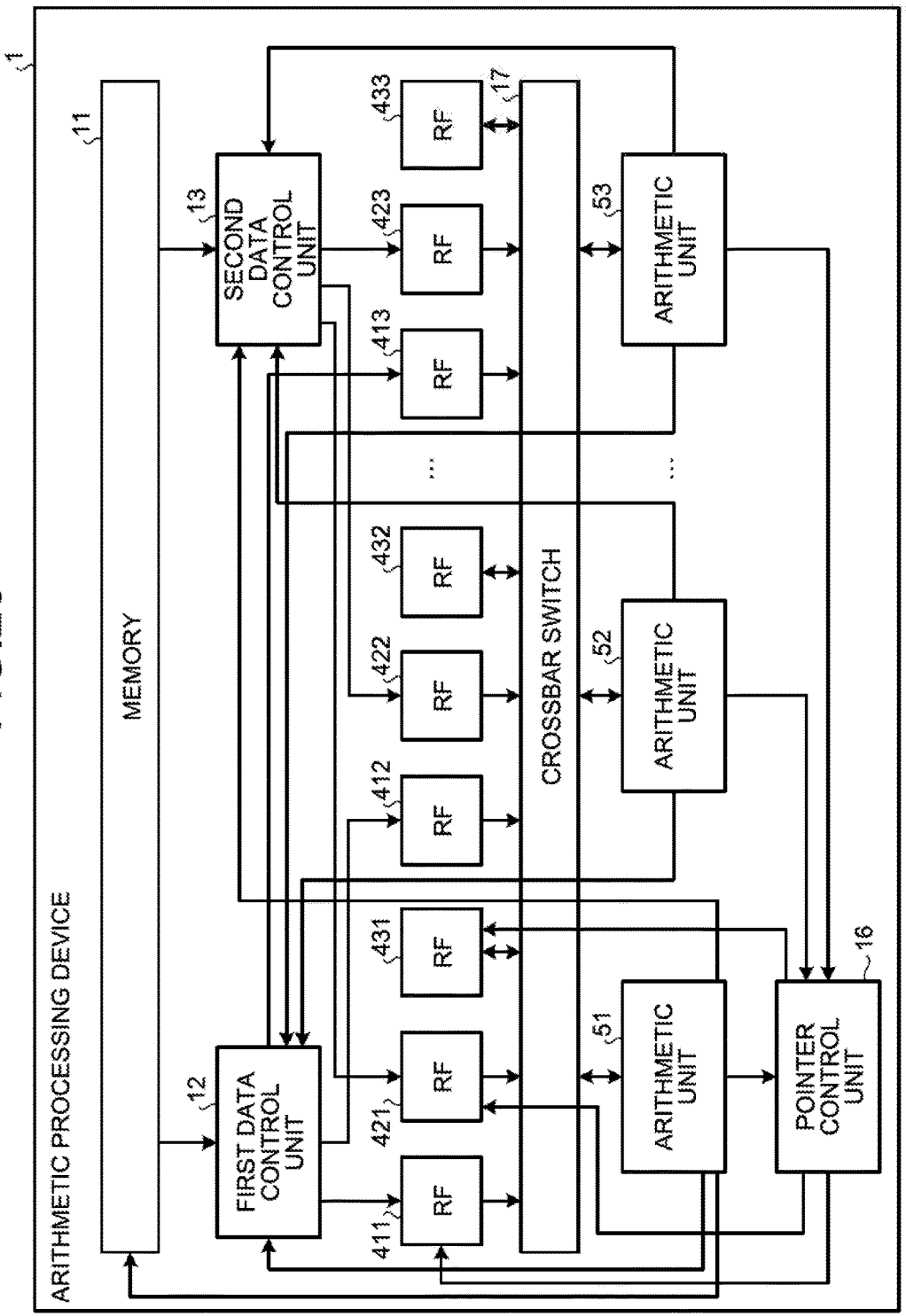
FIG. 26 is a block diagram illustrating an arithmetic processing device according to a second embodiment.

FIG. 26 is a block diagram illustrating an arithmetic processing device according to a second embodiment. In the arithmetic processing device 1 according to the embodiment, in addition to each of the units described in the first embodiment, a crossbar switch 17 is provided between the register files 410, 420, and 430 and the arithmetic unit 50. In a description below, a description of the function of each of the same unit as that described in the first embodiment will be omitted.

The crossbar switch 17 is a switch that switches the paths connecting the register files 411 to 413, 421 to 423, and 431 to 433 and the arithmetic units 51 to 53. For example, the crossbar switch 17 can connect the arithmetic unit 51 to any one of the register files 411 to 413, 421 to 423, and 431 to 433.

If the number of strides is 1 in the convolution forward operation, some of the element data stored in the register files 411 to 413 is used by the other arithmetic unit 50 in the subsequent row portion operation. Thus, if there is the register file 410 that stores therein the element data that can be used in the subsequent operation, the crossbar switch 17 switches the path so as to connect the arithmetic unit 50 that uses the subject element data in the subsequent operation to the subject register file 410.

For example, if data is stored in a manner illustrated in FIG. 5 and the convolution forward operation in which the number of strides is 1 is performed, the arithmetic unit 51 uses, in a state 435, the element data that were stored in the register file 412 in a state 434. Thus, the crossbar switch 17 connects the arithmetic unit 51 to the register file 412 from the state indicated by the state 434 and connects the arithmetic unit 52 to the register file 413. Furthermore, the crossbar switch 17 connects the arithmetic unit 53 to the register file 411. In this case, the first data control unit 12 newly stores the element data b36 to b47 in the register file 411. Consequently, the arithmetic units 51 to 53 can access the same element data as that accessed in a case of a state 436.

If the subsequent operation, i.e., the operation corresponding to the state 436 described in the first embodiment illustrated in FIG. 5 is performed, the crossbar switch 17 connects the arithmetic unit 51 to the register file 413 and connects the arithmetic unit 52 to the register file 411. Furthermore, the crossbar switch 17 connects the arithmetic unit 53 to the register file 412. In this case, the first data control unit 12 newly stores the element data b48 to b59 in the register file 412.

In this way, the crossbar switch 17 sequentially switches, for each operation, the paths so as to connect the arithmetic unit 50 to the register file 410 that stores therein the element data that is used in the subsequent operation. Then, the first data control unit 12 rewrites the data in the register files 410 that store therein the element data that is not used for the operation any more.

Furthermore, if data is stored in a manner illustrated in FIG. 6 and the convolution forward operation in which the number of strides is 2 is performed, the crossbar switch 17 connects the arithmetic unit 51 to the register file 412 from the state indicated by the state 441 and connects the arithmetic unit 52 to the register file 413. Furthermore, the crossbar switch 17 connects the arithmetic unit 53 to the register file 411. In this case, the first data control unit 12 newly stores the element data b72 to b95 in the register file 411. Consequently, the arithmetic units 51 to 53 can access the element data that is in the same state as the state 442.

If the subsequent operation, i.e., the operation corresponding to the state 443 described in the first embodiment illustrated in FIG. 6 is performed, the crossbar switch 17 connects the arithmetic unit 51 to the register file 413 and connects the arithmetic unit 52 to the register file 411. Furthermore, the crossbar switch 17 connects the arithmetic unit 53 to the register file 412. In this case, the first data control unit 12 newly stores the element data b98 to b107 in the register file 412. Furthermore, the arithmetic units 51 and 52 use the half of the element data stored in the register file 410 at the connection destination.

Furthermore, in the convolution backward weight difference operation, in also a case where the number of strides is 1, some of the element data stored in the register files 411 to 413 is used by the other arithmetic unit 50 in the subsequent row portion operation. Thus, if there is the register file 410 that stores therein the element data that can be used in the subsequent operation, the crossbar switch 17 switches the path so as to connect the arithmetic unit 50 that uses the subject element data in the subsequent operation to the subject register file 410.

For example, if data is stored in a manner illustrated in FIG. 11 and the convolution backward weight difference operation in which the number of strides is 1 is performed, the crossbar switch 17 connects the arithmetic unit 51 to the register file 412 from the state indicated by the state 451 and connects the arithmetic unit 52 to the register file 413. Furthermore, the crossbar switch 17 connects the arithmetic unit 53 to the register file 411. In this case, the first data control unit 12 newly stores the element data b36 to b47 in the register file 411. Consequently, the arithmetic units 51 to 53 can access the same element data as that accessed in a case of the state 452.

If the subsequent operation, i.e., the operation corresponding to the state 453 described in the first embodiment illustrated in FIG. 11 is performed, the crossbar switch 17 connects the arithmetic unit 51 to the register file 413 and connects the arithmetic unit 52 to the register file 411. Furthermore, the crossbar switch 17 connects the arithmetic unit 53 to the register file 412. In this case, the first data control unit 12 newly stores the element data b48 to b59 in the register file 412.

In this way, the crossbar switch 17 sequentially switches, for each operation, the paths so as to connect the arithmetic unit 50 to the register file 410 that stores therein the element data that is used in the subsequent operation. Then, the first data control unit 12 rewrites the data in the register files 410 that store therein the element data that is not used for the operation any more.

Furthermore, if data is stored in a manner illustrated in FIG. 12 and the convolution backward weight difference operation in which the number of strides is 2 is performed, the crossbar switch 17 connects the arithmetic unit 51 to the register file 413 from the state indicated by the state 461. Furthermore, the crossbar switch 17 connects the arithmetic units 52 and 53 to the register files 411 and 412, respectively, and newly stores the data.

If the subsequent operation, i.e., the operation corresponding to the state 463 described in the first embodiment illustrated in FIG. 12 is performed, the crossbar switch 17 connects the arithmetic unit 51 to the register file 412 and connects the arithmetic units 52 and 53 to the register files 413 and 411, respectively. The first data control unit 12 newly stores the element data in the register files 413 and 411.

Furthermore, if the number of strides is 1 in the convolution backward bottom difference operation, some of the element data stored in the register files 431 to 433 is used by the other arithmetic unit 50 in the subsequent row portion operation. Thus, if there is the register file 430 that stores therein the element data that can be used in the subsequent operation, the crossbar switch 17 switches the path so as to connect the arithmetic unit 50 that uses the subject element data in the subsequent operation to the subject register file 430.

For example, if data is stored in a manner illustrated in FIG. 17 and convolution backward bottom difference operation in which the number of strides is 1 is performed, the crossbar switch 17 connects the arithmetic unit 51 to the register file 432 from the state indicated by the state 471 and connects the arithmetic unit 52 to the register file 433. Furthermore, the crossbar switch 17 connects the arithmetic unit 53 to the register file 431. In this case, in the register file 431, the pieces of the element data b36 to b47 in the bottom difference data 205 are stored. Consequently, the arithmetic units 51 to 53 can access the same element data as that accessed in a case of the state 472.

If the subsequent operation, i.e., the operation corresponding to the state 472 described in the first embodiment illustrated in FIG. 17 is performed, the crossbar switch 17 connects the arithmetic unit 51 to the register file 433 and connects the arithmetic unit 52 to the register file 431. Furthermore, the crossbar switch 17 connects the arithmetic unit 53 to the register file 432. In this case, the pieces of the element data b48 to b59 in the bottom difference data 205 are stored in the register file 432.

In this way, the crossbar switch 17 sequentially switches, for each operation, the paths so as to connect the arithmetic unit 50 to the register file 430 that is used in the subsequent operation. In a case of the convolution backward bottom difference operation, in also a case where the number of strides is 2, the crossbar switch 17 similarly performs the same switching process as that performed in a case where the number of strides is 1.

As described above, the arithmetic processing device according to the embodiment can repeatedly use, in a different arithmetic unit due to the crossbar switch, the element data stored in a single register file. Consequently, it is possible to reduce the number of times of rewriting in the register files and it is possible to speed up the arithmetic operation process while suppressing an increase in cost.

[c] Third Embodiment

Figure 27:
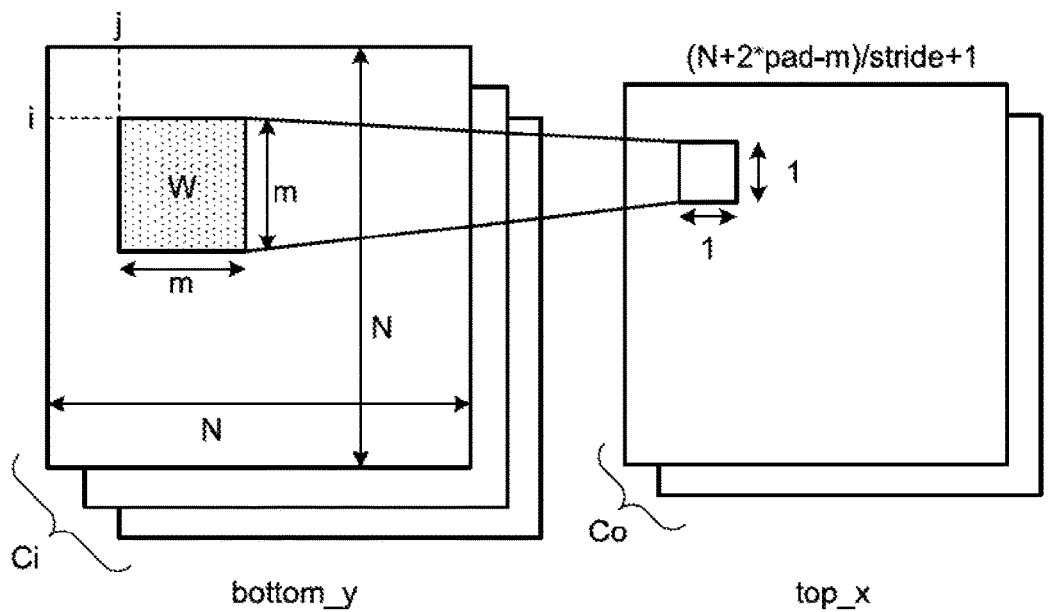
FIG. 27 is a schematic diagram illustrating designation of bottom data and top data performed by an arithmetic processing device according to a third embodiment.

FIG. 27 is a schematic diagram illustrating designation of bottom data and top data performed by the arithmetic processing device according to a third embodiment. In the following, a description will be given of a method of designating the bottom data 201 and the top difference data 203 performed by the plurality of the arithmetic units 50.

For example, in image data with a size of N×N having N pixels that are vertically and horizontally arranged, the arithmetic unit 50 obtains a coordinate point (i, j) at the destination of the movement based on the designated row from the upper left of the image data and the designated number of strides. Then, the arithmetic unit 50 reads the bottom data 201 as the rectangular area that is defined based on the subject coordinate point and the designated kernel size m. The arithmetic unit 50 performs the convolution operation based on the read bottom data 201, adjusts the data to the size of 1×1, and stores the bottom data 201. Consequently, the size (hereinafter, referred to as a top size) of the top difference data 203 that corresponds to the operation result thereof is adjusted to the size of (N+2*pad−m)/number of strides+1 by using the previously set number of pads. Furthermore, if there is a plurality of pieces of the bottom data 201 or the top difference data 203, in order to consecutively perform the operation of all of the pieces of data, the arithmetic unit 50 also performs the operation by designating Ci that is the number of sheets of the bottom data 201 that uses the subject amount of data or by designating Co that is the number of pieces of the calculated top difference data 203.

Figure 28:
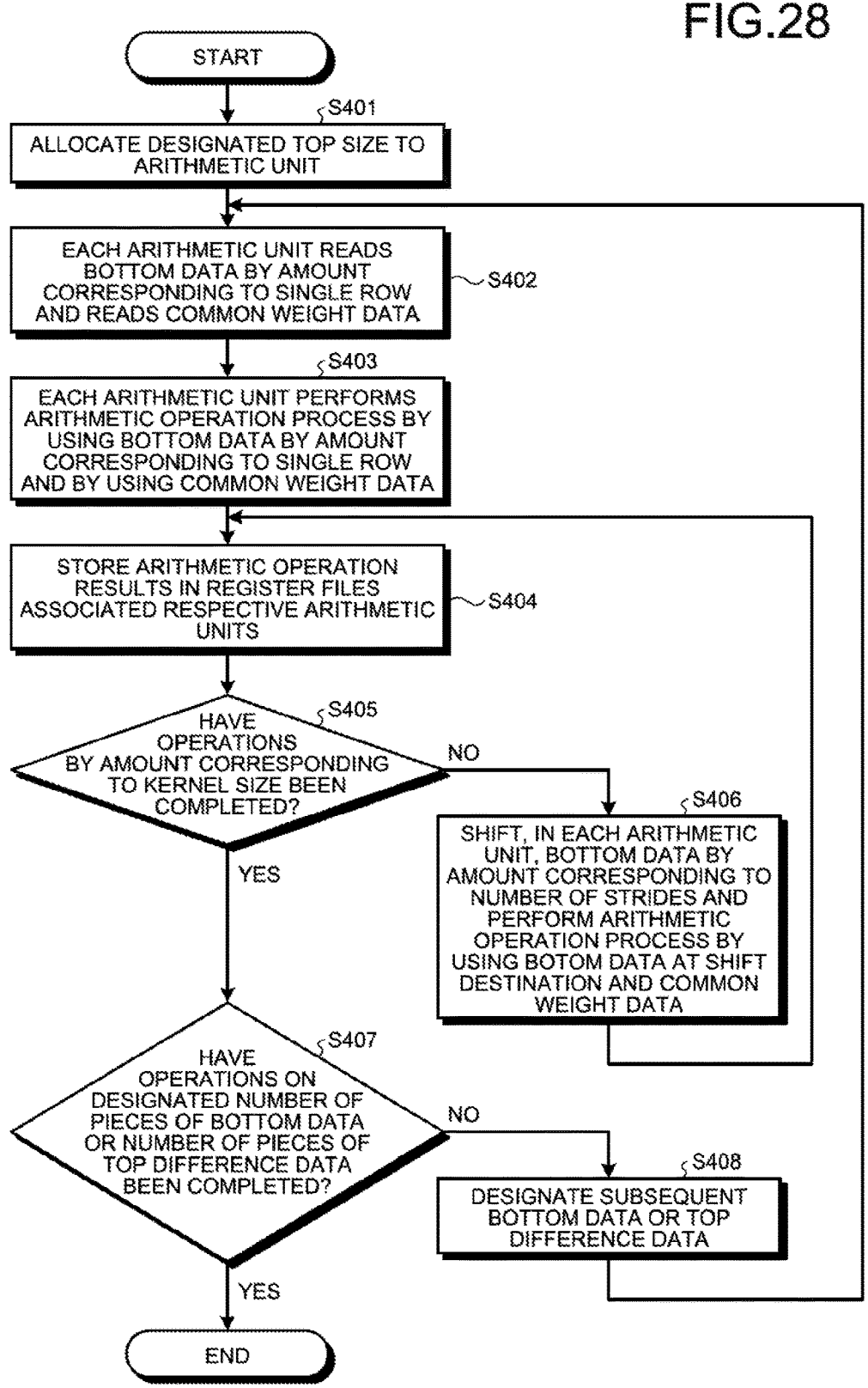
FIG. 28 is a flowchart illustrating the flow of the overall convolution operation when a plurality of arithmetic units is used.

FIG. 28 is a flowchart illustrating the flow of the overall convolution operation when a plurality of arithmetic units is used. First, for the arithmetic unit 50, an amount corresponding to the top size designated in FIG. 28, for example, an amount corresponding to (N+2*pad−m)/number of strides+1, is allocated to be used in the operation (Step S401).

The arithmetic operation process performed by the single arithmetic unit 50 is the same as that described in the first embodiment and the second embodiment. Each of the arithmetic units 50 reads the bottom data 201 in units of rows and the common weight data 202 (Step S402). For example, in a case of the convolution forward operation illustrated in FIG. 4 or in a case of the convolution backward operation illustrated in FIG. 10, the top size is 8 and, in a case where the number of strides is 1, b00 to b11 are read in the first arithmetic unit 50, b12 to b23 are read in the subsequent arithmetic unit 50, and b84 to b95 are read in the eight and the last arithmetic unit 50. In this way, the pieces of the bottom data 201 are read in each of the arithmetic units 50 per row. Furthermore, if the number of strides is equal to or greater than 2, regarding the bottom data 201 given to each of the arithmetic unit 50, an amount corresponding to the number of rows designated by the number of strides is prepared. The weight data is added by an amount corresponding to a single row at a time and is given as the data common to all of the arithmetic units 50.

Then, by using the bottom data 201 and the common weight data 202 which an amount corresponding to a single row, each of the arithmetic units 50 performs the arithmetic operation process (Step S403). Then, each of the arithmetic units 50 stores the result of the subject arithmetic operation process in the associated register files 430 (Step S404).

Then, the arithmetic unit 50 determines whether the operation with an amount corresponding to the kernel size has been ended (Step S405). If the operation with an amount corresponding to the kernel size has not been ended (No at Step S405), the arithmetic unit 50 shifts the row in the bottom data 201 by an amount corresponding to the number of strides and performs the subsequent arithmetic operation process (Step S406). For example, b12 to b23 are added to the first arithmetic unit 5, b24 to b35 are added to the subsequent arithmetic unit 50, and b96 to b107 are added to the eighth and the last arithmetic unit 50. Namely, in each of the arithmetic units 50, the bottom data 201 is read in units of rows. The arithmetic unit 50 reads the element data in the subsequent row in the weight data 202, performs the same arithmetic operation process, adds the result of the subject arithmetic operation process to the operation result obtained the last time (first time in a case of second operation) regarding the second and the subsequent operation, and stores the addition result. For example, if the number of kernels is five, by performing the calculation five times, the arithmetic unit 50 completes the operation performed on the value of the top difference data 203 and acquires the subject operation result. Furthermore, in particular, regarding Steps S11 to S16 corresponding to the arithmetic operation process performed by each of the arithmetic units 50, the flow of the process in the convolution forward operation in detail is the same as that illustrated in FIG. 23, the flow of the process in the convolution backward weight difference operation in detail is the same as that illustrated in FIG. 24, and the flow of the process in convolution backward bottom difference operation in detail is the same as that illustrated in FIG. 25.

Furthermore, If the operation with an amount corresponding to the kernel size has been ended (Yes at Step S405) the arithmetic unit 50 determines whether the operations performed on the designated number of pieces of the bottom data 201 or the operations performed on the number of sheets of the top difference data 203 have been completed (Step S407).

If the operations on the designated number of pieces of the bottom data 201 or the number of pieces of the top difference data 203 have not been completed (No at Step S407), the arithmetic unit 50 designates the subsequent bottom data 201 or the top difference data 203 (Step S408). Then, the process returns to Step S12.

In contrast, if the operations on the designated number of pieces of the bottom data 201 or the number of pieces of the top difference data 203 have been completed (Yes at Step S407), the arithmetic unit 50 ends the arithmetic operation process. For example, if the Ci is 20, by repeating the same calculation 20 times, the arithmetic unit 50 similarly completes the calculation performed on the value of the top difference data 203 and can acquire the operation results.

Figure 29:
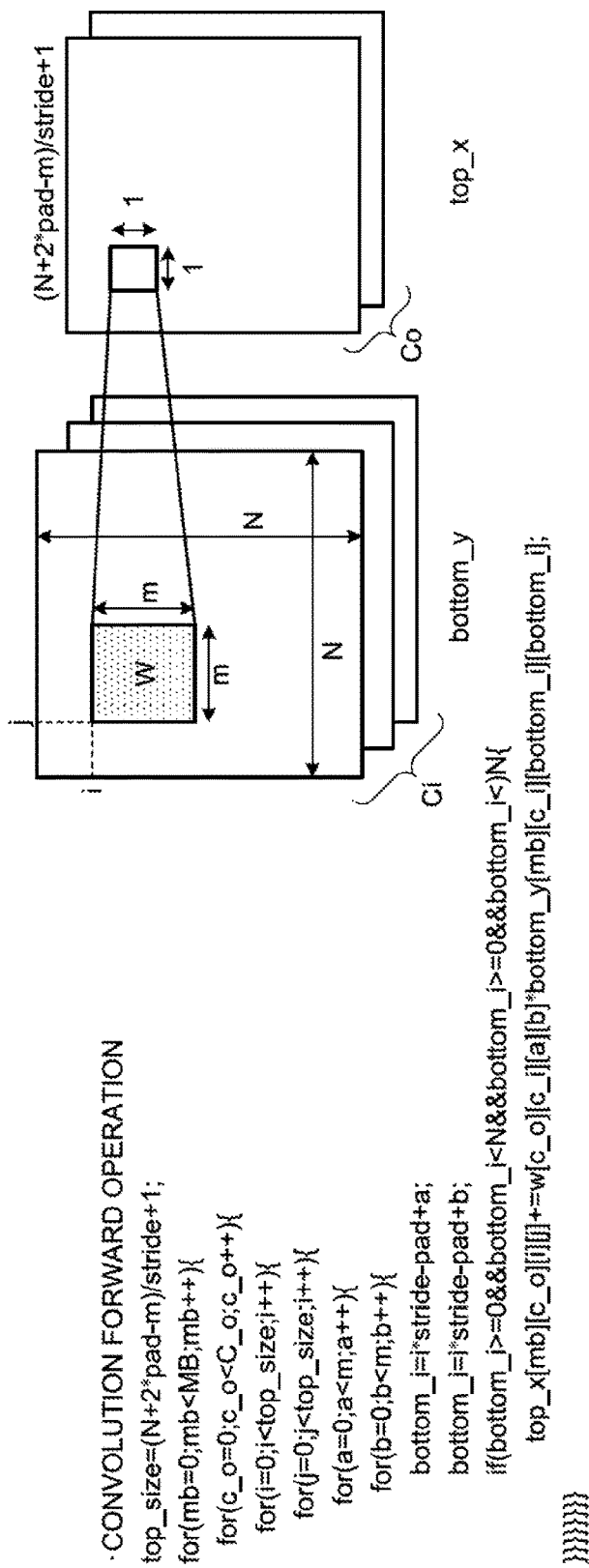
FIG. 29 is a schematic diagram illustrating a description example of a program of the convolution forward operation by using a plurality of the arithmetic units.

FIG. 29 is a schematic diagram illustrating a description example of a program of the convolution forward operation by using a plurality of the arithmetic units. In the convolution forward operation, as illustrated in FIG. 29, the operation performed by using the bottom data 201 (bottom_y) and the top difference data 203 (top_x) can be represented by the multiplication and the addition. The convolution forward operation is performed by designating the number of pieces of data Ci in the bottom data 201, the number of pieces of data Co in the top difference data 203, the number of batches mb, the number of strides W, and the number of pads of pad that corresponds to the parameter for adjusting the top size. Here, the adjustment of the top size corresponds to the padding to the top size.

Figure 30:
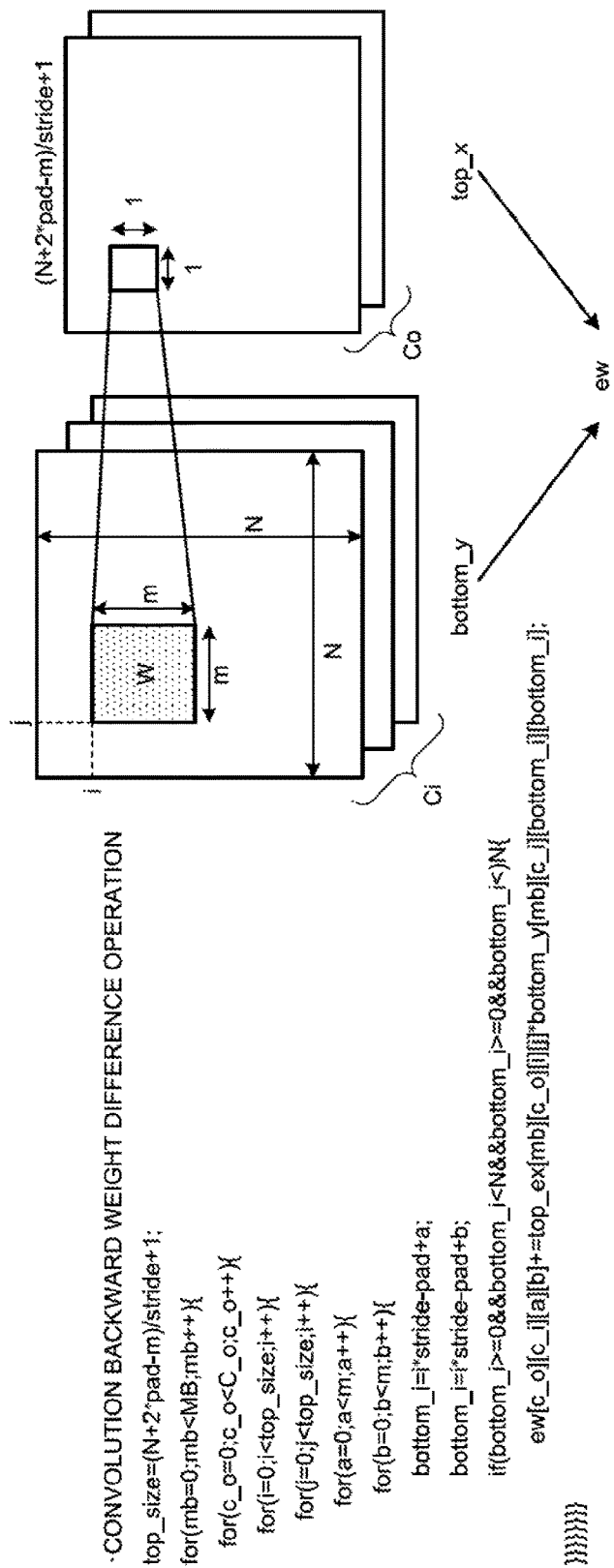
FIG. 30 is a schematic diagram illustrating a description example of a program of a convolution backward weight difference operation in a case of using the plurality of the arithmetic units.

FIG. 30 is a schematic diagram illustrating a description example of a program of a convolution backward weight difference operation in a case of using the plurality of the arithmetic units. In the convolution backward weight difference operation, as illustrated in FIG. 30, the operation performed by using the bottom data 201 (bottom_y) and the top difference data 203 (top_x) can be represented by the multiplication and the addition. The convolution backward weight difference operation is performed by designating the number of pieces of data Ci in the bottom data 201, the number of pieces of data Co in the top difference data 203, the number of batches mb, the number of strides W, and the number of pads of pad that corresponds to the parameter for adjusting the top size. Here, the adjustment of the top size corresponds to the padding to the top size. The ew is a function which includes Co and Ci as parameter.

Figure 31:
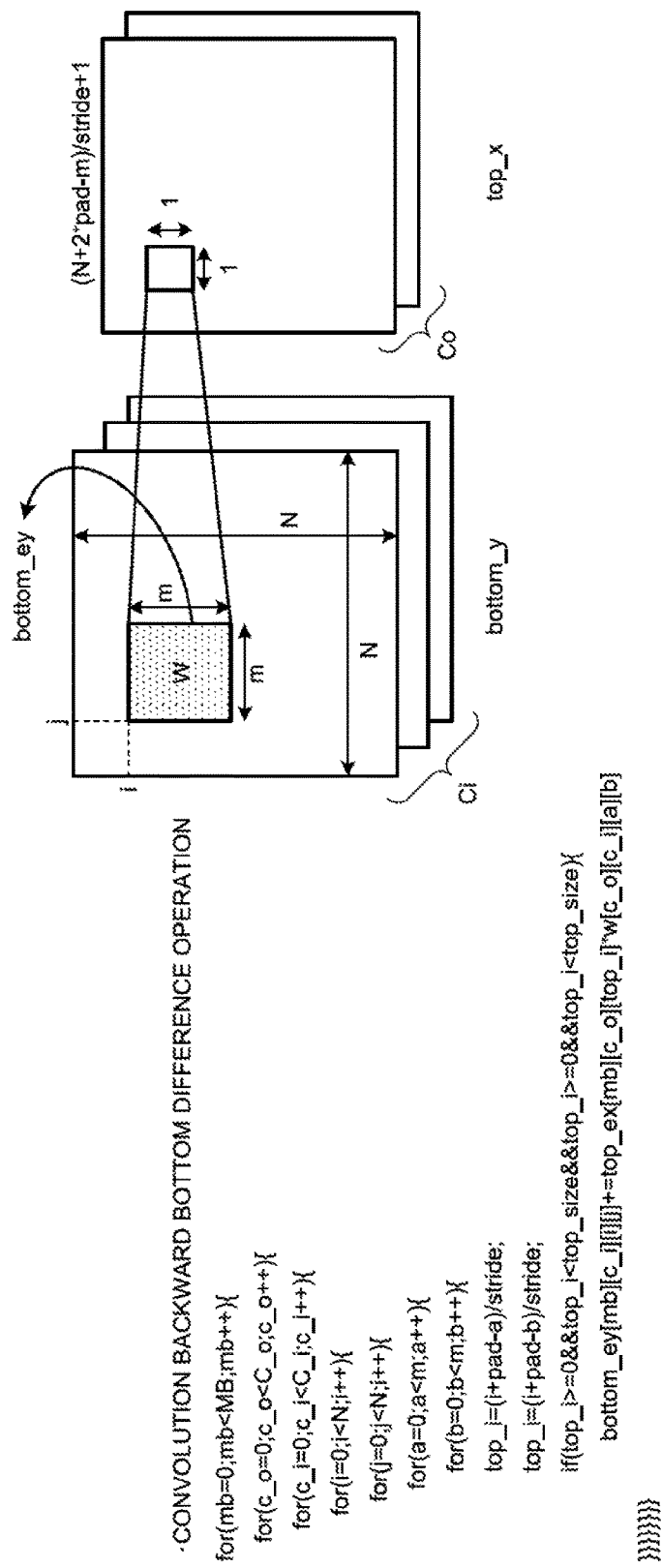
FIG. 31 is a schematic diagram illustrating a description example of a program of the convolution backward bottom difference operation in a case of using the plurality of the arithmetic units.

FIG. 31 is a schematic diagram illustrating a description example of a program of a convolution backward bottom difference operation in a case of using the plurality of the arithmetic units. In the convolution backward bottom difference (bottom_ey) operation, as illustrated in FIG. 31, the operation using the bottom data 201 (bottom_y) and the top difference data 203 (top_x) can be represented by the multiplication and the addition. The convolution backward bottom difference operation is performed by designating the number of pieces of data Ci in the bottom data 201, the number of pieces of data Co in the top data 203, the number of batches mb, the number of strides W, and the number of pads represented by pad corresponding to the parameter that is used to adjust the top size. Here, the adjustment of the top size corresponds to the padding to the top size.

Hardware Configuration

Figure 32:
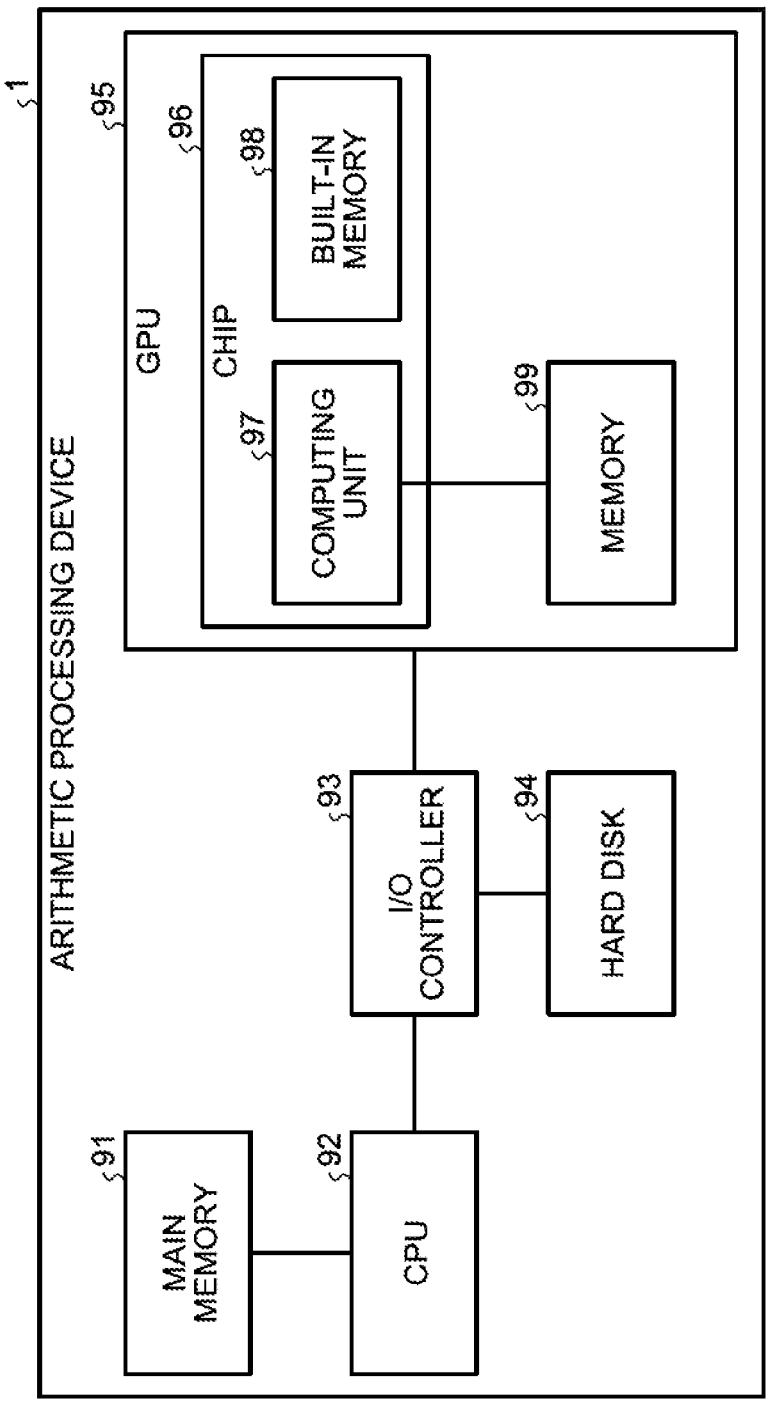
FIG. 32 is a block diagram illustrating the hardware configuration of the arithmetic processing device.

FIG. 32 is a block diagram illustrating the hardware configuration of the arithmetic processing device. As illustrated in FIG. 32, the arithmetic processing device 1 includes a main memory 91, a central processing unit (CPU) 92, an input/output (I/O) controller 93, a hard disk 94, and a GPU 95. Furthermore, the GPU 95 includes a chip 96 and a memory 99. Furthermore, a computing unit 97 and a built-in memory 98 are mounted on the chip 96.

As an example, in the CPU 92, software that manages a neural network is operated and the bottom data 201 and the weight data 202 used by the software are stored in the main memory 91. Then, the software that manages the neural network requests the GPU 95 to perform the operation. At this time, in order to perform the operation by using the resources on the GPU 95, the bottom data 201 and the weight data 202 are moved to the memory 99.

The computing unit 97 implements the function of the arithmetic units 50. Furthermore, the memory 99 implements the function of the memory 11. Then, the built-in memory 98 implements the function of the register files 410, 420, and 430. In this case, the computing unit 97 implements the function of the first data control unit 12, the second data control unit 13, and the pointer control unit 16. For example, the memory 99 stores therein various kinds of programs including the programs for implementing the function of the arithmetic units 50, the first data control unit 12, the second data control unit 13, and the pointer control unit 16. Then, by reading various kinds of programs from the memory 99 and executing the programs, the computing unit 97 can implement the function of the arithmetic units 50, the first data control unit 12, the second data control unit 13, and the pointer control unit 16. In this way, each of the functions described in the embodiments above can be implemented by the GPU 95.

Furthermore, as another example, the software that manages the neural network running on the CPU 92 may also request another core in the CPU 92 to perform the operation. In this case, the CPU 92 implements the function of the arithmetic units 50. Furthermore, the hard disk 94 implements the function of the memory 11. Then, the main memory 91 implements the function of the register files 410 to 430. The hard disk 94 sends and receives data to and from the CPU 92 via the I/O controller 93. In this case, the CPU 92 implements the function of the first data control unit 12, the second data control unit 13, and the pointer control unit 16. For example, the hard disk 94 stores therein various kinds of programs including the programs for implementing the function of the arithmetic units 50, the first data control unit 12, the second data control unit 13, and the pointer control unit 16. Then, by reading the various kinds of programs from the hard disk 94 and executing the programs, the CPU 92 can implement the function of the arithmetic units 50, the first data control unit 12, the second data control unit 13, and the pointer control unit 16. In this way, each of the functions described in the embodiments can be implemented by using the CPU 92 other than the GPU 95 included in the arithmetic processing device 1.

According to an aspect of an embodiment of the arithmetic processing device and control method performed by the arithmetic processing device disclosed in the present invention, an advantage is provided in that it is possible to improve the speed of the arithmetic operation process while suppressing an increase in cost.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing device comprising:
   a processor, a memory and a product-sum calculator, the memory stores first data and second data each of which has element data that forms a matrix;
   the product-sum calculator performs a row portion operation by performing, by sequentially shifting a predetermined position from a top by a predetermined number at a time, an operation that arranges, in an order of an arrangement in the first data, element data included in a first predetermined row that has a predetermined number of rows, that acquires first element data that corresponds to the element data arranged from the predetermined position to a number of columns of the second data, that multiplies each of the pieces of the acquired first element data by an associated pieces of the element data included in a second predetermined row that has the predetermined number of rows, and that sums multiplication results, and performs, by using results of the row portion operations, a convolution operation that is performed by shifting, by using the second data as weight data, arrangement positions of the second data in the first data by a predetermined number at a time, and
   the processor performs an image recognition by using a result of the convolution operation.

2. The arithmetic processing device according to claim 1, further comprising:
   a first operation purpose storage unit;
   a second operation purpose storage unit;
   a first data control unit that acquires the element data included in the first predetermined row from the first data stored in the memory and that stores the acquired element data in the first operation purpose storage unit; and
   a second data control unit that acquires the element data included in the second predetermined row from the second data in the memory and that stores the acquired element data in the second operation purpose storage unit, wherein
   the product-sum calculator performs the operation based on the element data stored in the first operation purpose storage unit and the second operation purpose storage unit and instructs, after the end of the row portion operations, the first data control unit and the second data control unit to acquire the element data in another row and store the acquired element data.

3. The arithmetic processing device according to claim 2, wherein
   a plurality of the product-sum calculator, the first operation purpose storage units, and the second operation purpose storage units are arranged, and
   the arithmetic processing device further comprises a switch that switches connection paths among the product-sum calculator, the first operation purpose storage units, and the second operation purpose storage units.

4. An arithmetic processing device comprising:
   a processor, a memory and a product-sum calculator,
   the memory stores first data and second data each of which has element data that forms a matrix, the second data being a difference between an output expected value and calculation data that is calculated in a convolution operation that is performed by shifting, by a predetermined number at a time, arrangement positions of weight data arranged in the first data;
   the product-sum calculator uses a single row in the first data as a first predetermined row, uses a single row in the second data as a second predetermined row, repeats, for each of the first predetermined row and the second predetermined row, by using the element data included in the first predetermined row and the element data included in the second predetermined row, a row portion operation based on the number of columns of the second data, and performs an operation that calculates a difference between the weight data and a weight expected value by using the first data and the second data, and
   the processor performs an image recognition by using a result of the operation.

5. An arithmetic processing device comprising:

a processor, a memory and a product-sum calculator, the memory stores first data and second data each of which has element data that forms a matrix, the second data being a difference between an output expected value and calculation data that is calculated in a convolution operation that is performed by shifting, by a predetermined number at a time, arrangement positions of weight data arranged in the first data, the first data being a difference between an output expected value and calculation data that is calculated in a convolution operation that is performed by using the second data as weight data and by shifting arrangement positions of the second data in input data by a predetermined number at a time;

the product-sum calculator uses, in a specific layer in one of a plurality of layers arranged in order, a single row in the first data as the first predetermined row, uses, in a specific layer, a single row in the second data as the second predetermined row, repeats, for each of the first predetermined row and the second predetermined row, by using the element data included in the first predetermined row and the element data included in the second predetermined row, a row portion operation based on the number of columns of the second data, and that performs an operation that calculates, for each of the predetermined number by using the first data and the second data, a difference between an output expected value and output data in a layer that is immediately previous to the specific layer, and the processor performs an image recognition by using a result of the operation.

* * * * *